(12) United States Patent
Tsuchiya et al.

(10) Patent No.: US 7,691,588 B2
(45) Date of Patent: Apr. 6, 2010

(54) LIGAND HAVING AGONISTIC ACTIVITY TO MUTATED RECEPTOR

(75) Inventors: Masayuki Tsuchiya, Shizuoka (JP); Yuichi Hirata, Ibaraki (JP)

(73) Assignee: Chugai Seiyaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/548,727

(22) PCT Filed: Mar. 12, 2004

(86) PCT No.: PCT/JP2004/003334

§ 371 (c)(1),
(2), (4) Date: Sep. 9, 2005

(87) PCT Pub. No.: WO2004/081048

PCT Pub. Date: Sep. 23, 2004

(65) Prior Publication Data

US 2006/0189794 A1 Aug. 24, 2006

(30) Foreign Application Priority Data

Mar. 13, 2003 (JP) ............................. 2003-067832

(51) Int. Cl.
*G01N 33/53* (2006.01)
*G01N 33/574* (2006.01)
*G01N 33/576* (2006.01)
*C12P 21/08* (2006.01)
*C07K 16/00* (2006.01)

(52) U.S. Cl. .................... 435/7.2; 435/7.1; 435/7.21; 435/7.24; 530/387.3; 530/388.15; 530/388.1; 530/388.22; 530/388.2

(58) Field of Classification Search ........................ None
See application file for complete search history.

(56) References Cited

U.S. PATENT DOCUMENTS

| | | | |
|---|---|---|---|
| 4,946,778 A | 8/1990 | Ladner et al. | |
| 5,789,554 A | 8/1998 | Leung et al. | |
| 5,837,242 A | 11/1998 | Holliger et al. | |
| 5,837,821 A * | 11/1998 | Wu ........................ | 530/387.3 |
| 5,840,344 A | 11/1998 | Fukushima | |
| 5,877,291 A | 3/1999 | Mezes et al. | |
| 5,885,574 A | 3/1999 | Elliott | |
| 6,126,980 A | 10/2000 | Smith et al. | |
| 6,183,744 B1 | 2/2001 | Goldenberg | |
| 6,323,000 B2 | 11/2001 | Briggs et al. | |
| 6,342,220 B1 | 1/2002 | Adams et al. | |
| 6,368,596 B1 | 4/2002 | Ghetie et al. | |
| 6,579,692 B1 | 6/2003 | Fukushima | |
| 6,683,157 B2 | 1/2004 | Briggs et al. | |
| 6,699,686 B1 * | 3/2004 | Brocard et al. ............ | 435/69.1 |
| 6,719,972 B1 | 4/2004 | Gribben et al. | |
| 6,759,043 B2 | 7/2004 | Fukushima | |
| 7,115,373 B2 | 10/2006 | Hashida et al. | |
| 7,262,278 B2 | 8/2007 | Tawara et al. | |
| 7,456,260 B2 | 11/2008 | Rybak et al. | |
| 2001/0006796 A1 | 7/2001 | Briggs et al. | |
| 2002/0028178 A1 | 3/2002 | Hanna et al. | |
| 2002/0193571 A1 | 12/2002 | Carter et al. | |
| 2002/0197706 A1 * | 12/2002 | Nadkarni et al. ......... | 435/254.2 |
| 2003/0073161 A1 | 4/2003 | Briggs et al. | |
| 2003/0082612 A1 * | 5/2003 | Snodgrass et al. .............. | 435/6 |
| 2003/0147894 A1 | 8/2003 | Fukushima et al. | |
| 2003/0148409 A1 | 8/2003 | Rossi et al. | |
| 2003/0157100 A1 | 8/2003 | Fukushima et al. | |
| 2003/0157577 A1 | 8/2003 | Fukushima et al. | |
| 2003/0202975 A1 | 10/2003 | Tedder | |
| 2003/0211108 A1 | 11/2003 | Fukushima et al. | |
| 2004/0001828 A1 | 1/2004 | Tuscano et al. | |
| 2004/0058393 A1 | 3/2004 | Fukishima et al. | |
| 2004/0073013 A1 | 4/2004 | Fukushima et al. | |
| 2004/0091475 A1 | 5/2004 | Tsuchiya et al. | |
| 2004/0242847 A1 | 12/2004 | Fukushima et al. | |
| 2005/0130224 A1 | 6/2005 | Saito et al. | |
| 2006/0222643 A1 | 10/2006 | Tsunoda et al. | |
| 2006/0275301 A1 | 12/2006 | Ozaki et al. | |
| 2007/0003556 A1 | 1/2007 | Tsuchiya et al. | |

(Continued)

FOREIGN PATENT DOCUMENTS

| | | |
|---|---|---|
| EP | 0 721 015 | 7/1996 |
| EP | 1 035 132 | 9/2000 |
| EP | 1 327 680 A1 | 7/2003 |
| EP | 1 327 681 | 7/2003 |
| EP | 1369431 A1 | 12/2003 |
| EP | 1 396 500 | 3/2004 |
| EP | 1561759 | 8/2005 |
| EP | 1712565 | 10/2006 |
| EP | 1757686 | 2/2007 |
| EP | 1 262 548 | 8/2008 |

(Continued)

OTHER PUBLICATIONS

Pietri-Rouxel et al. 1997. Eur J Biochem. 247:1174-1179.*
www.nlm.nih.gov/medlineplus/druginfo/medmaster/a682792.html, downloaded Jul. 19, 2007.*
Kong et al. 1993. J. Biol Chem 268:23055-23058.*

(Continued)

*Primary Examiner*—Manjunath N Rao
*Assistant Examiner*—Shulamith H Shafer
(74) *Attorney, Agent, or Firm*—Fish & Richardson P.C.

(57) ABSTRACT

The present inventors used antibody engineering techniques to prepare functional antibodies that correspond to individual mutations in causative genes of diseases, and discovered that such antibodies enable the treatment of the diseases. Specifically, the inventors succeeded in preparing ligands, particularly minibodies, which have agonistic activity to receptors that have almost completely lost responsiveness to their natural ligands because of gene mutations (for example, a thrombopoietin (TPO) receptor whose reactivity to TPO has been markedly impaired), and which can transduce signals by interacting with these mutant receptors at levels comparable to normal.

26 Claims, 14 Drawing Sheets

U.S. PATENT DOCUMENTS

| | | |
|---|---|---|
| 2007/0280951 A1 | 12/2007 | Kimura et al. |
| 2007/0281327 A1 | 12/2007 | Nakano et al. |
| 2008/0009038 A1 | 1/2008 | Ohtomo et al. |
| 2008/0206229 A1 | 8/2008 | Ono et al. |
| 2008/0248037 A1 | 10/2008 | Li et al. |
| 2008/0274110 A1 | 11/2008 | Ozaki et al. |
| 2009/0022687 A1 | 1/2009 | Matsumoto et al. |
| 2009/0028854 A1 | 1/2009 | Igawa et al. |
| 2009/0117097 A1 | 5/2009 | Igawa et al. |

FOREIGN PATENT DOCUMENTS

| | | |
|---|---|---|
| JP | 7503622 | 4/1995 |
| JP | 7236475 | 9/1995 |
| JP | 10-505231 | 5/1998 |
| JP | 11-500916 | 1/1999 |
| JP | 11-092500 | 4/1999 |
| JP | 2000-95800 | 4/2000 |
| JP | 2001-506135 | 5/2001 |
| JP | 2001-513999 | 9/2001 |
| JP | 2001-518930 | 10/2001 |
| JP | 2002-544173 | 12/2002 |
| JP | 2004-0866862 | 3/2004 |
| WO | WO 91/16928 | 11/1991 |
| WO | WO 92/19759 | 11/1992 |
| WO | WO 94/13806 | 6/1994 |
| WO | WO 96/04925 | 2/1996 |
| WO | WO 96/26648 | 9/1996 |
| WO | WO 96/36360 | 11/1996 |
| WO | WO 97/01633 | 1/1997 |
| WO | WO 97/32601 | 9/1997 |
| WO | WO 98/44001 | 8/1998 |
| WO | WO 98/41641 | 9/1998 |
| WO | WO 98/42378 | 10/1998 |
| WO | WO 99/02567 | 1/1999 |
| WO | WO 99/03495 | 1/1999 |
| WO | WO 99/12973 | 3/1999 |
| WO | WO 99/17364 | 4/1999 |
| WO | WO0023593 | * 4/2000 |
| WO | WO 00/53634 | 9/2000 |
| WO | WO 00/67795 | 11/2000 |
| WO | WO 00/75191 | 12/2000 |
| WO | WO 01/64713 | 9/2001 |
| WO | WO 01/66737 | 9/2001 |
| WO | WO 01/74388 | 10/2001 |
| WO | WO 01/77342 | 10/2001 |
| WO | WO 01/79494 | 10/2001 |
| WO | WO 01/87337 | 11/2001 |
| WO | WO 01/97858 | 12/2001 |
| WO | WO 02/04021 | 1/2002 |
| WO | WO 02/22212 | 3/2002 |
| WO | WO 02/33073 | 4/2002 |
| WO | WO 02/078612 | 10/2002 |
| WO | WO 02/094880 | 11/2002 |
| WO | WO 02/097033 | 12/2002 |
| WO | WO 03/033654 | 4/2003 |
| WO | WO 03/104425 | 12/2003 |
| WO | WO 03/107218 | 12/2003 |
| WO | WO 2004/003019 | 1/2004 |
| WO | WO 2004/033499 | 4/2004 |
| WO | WO 2004/087763 | 10/2004 |
| WO | WO 2005/056602 | 6/2005 |
| WO | WO 2005/056603 | 6/2005 |
| WO | WO 2005/056604 | 6/2005 |
| WO | WO 2005/056605 | 6/2005 |
| WO | WO 2005/056798 | 6/2005 |
| WO | WO 2005/100560 | 10/2005 |

OTHER PUBLICATIONS

Boger et al. 2001. Bioorganic and Medicinal Chemistry 9:557-562.*
Milligan 2004. Mol Pharm. 66:1-7.*

Brinkmann et al., "FTY720: targeting G-protein-coupled receptors for sphingosine 1-phosphate in transplantation and autoimmunity," *Curr. Opin. Immunol.*, 14:569-575 (2002).

Bruenke et al., "A recombinant bispecific single-chain Fv antibody against HLA class II and FcγRIII (CD16) triggers effective lysis of lymphoma cells," *Br. J. Haematol.*, 125:167-179 (2004).

Co et al., "A Humanized Antibody Specific for the Platelet Integrin gpIIb/IIIa," *J. Immunol.*, 152:2968-2976 (1994).

De Felice et al., "Differential regulatory role of monomorphic and polymorphic determinants of histocompatibility leukocyte antigen class I antigens in monoclonal antibody OKT3-induced T cell proliferation," *J. Immunol.*, 139:2683-2689 (1987).

DeNardo et al., "Anti-HLA-DR/anti-DOTA Diabody Construction in a Modular Gene Design Platform: Bispecific Antibodies for Pretargeted Radioimmunotherapy," *Cancer Biother. Radiopharm.*, 16:525-535 (2001).

Deng et al., "An Agonist Murine Monoclonal Antibody to the Human c-Mpl Receptor Stimulates Megakaryocytopoiesis," *Blood*, 92:1981-1988 (1998).

Ebert et al., "Expression of Metallothionein II in Intestinal Metaplasia, Dysplasia, and Gastric Cancer," *Cancer Res.*, 60:1995-2001 (2000).

Elliott et al., "Activation of the Erythropoietin (EPO) Receptor by Bivalent Anti-EPO Receptor Antibodies," *J. Biol. Chem.*, 271:24691-24697 (1996).

Goel et al., "$^{99m}$Tc-Labeled Divalent and Tetravalent CC49 Single-Chain Fv's: Novel Imaging Agents for Rapid In Vivo Localization of Human Colon Carcinoma," *J. Nucl. Med.*, 42:1519-1527 (2001).

Goel et al., "Genetically Engineered Tetravalent Single-Chain Fv of the Pancarcinoma Monoclonal Antibody CC49: Improved Biodistribution and Potential for Therapeutic Application," *Cancer Res.*, 60:6964-6971 (2000).

Hudson et al., "High avidity scFv multimers; diabodies and triabodies," *J. Immunol. Methods*, 231:177-189 (1999).

Kikuchi et al., "A bivalent single-chain Fv fragment against CD47 induces apoptosis for leukemic cells," *Biochem. Biophys. Res. Commun.*, 315:912-918 (2004).

Kipriyanov et al., "Effect of Domain Order on the Activity of Bacterially Produced Bispecific Single-chain Fv Antibodies," *J. Mol. Biol.*, 330:99-111 (2003).

Clark, "CD22, a B Cell-Specific Receptor, Mediates Adhesion and Signal Transduction," *J. Immunol.*, 150:4715-4718 (1993).

Daniel et al., "Induction of Apoptosis in Human Lymphocytes by Human Anti-HLA Class I Antibodies," *Transplantation*, 75:1380-1386 (2003).

Fayen et al., "Negative signaling by anti-HLA class I antibodies is dependent upon two triggering events," *Int. Immunol.*, 10:1347-1358 (1998).

Funaro et al., "Monoclonal antibodies and therapy of human cancers," *Biotechnol. Adv.*, 18:385-401 (2000).

Genestier et al., "Antibodies to HLA Class 1 α1 Domain Trigger Apoptosis of CD40-Activated Human B Lymphocytes," *Blood*, 90:726-735 (1997).

Genestier et al., "Caspase-dependent Ceramide Production in Fas- and HLA Class I-mediated Peripheral T Cell Apoptosis," *J. Biol. Chem.*, 273:5060-5066 (1998).

Genestier et al., "Fas-Independent Apoptosis of Activated T Cells Induced by Antibodies to the HLA Class I α1 Domain," *Blood*, 90:3629-3639 (1997).

Genestier et al., "T cell sensitivity to HLA class I-mediated apoptosis is dependent on interleukin-2 and interleukin-4," *Eur. J. Immunol.*, 27:495-499 (1997).

Ghetie et al., "Homodimerization of tumor-reactive monoclonal antibodies markedly increases their ability to induce growth arrest or apoptosis of tumor cells," *Proc. Natl. Acad. Sci. USA*, 94:7509-7514 (1997).

Goto et al., "A Novel Membrane Antigen Selectively Expressed on Terminally Differentiated Human B Cells," *Blood*, 84:1922-1930 (1994).

Holliger et al., "'Diabodies': Small bivalent and bispecific antibody fragments," *Proc. Natl. Acad. Sci. USA*, 90:6444-6448 (1993).

Hu et al., "Minibody: A Novel Engineered Anti-Carcinoembryonic Antigen Antibody Fragment (Single-Chain Fv-C$_H$3) Which Exhibits Rapid, High-Level Targeting of Xenografts," *Cancer Res.*, 56:3055-3061 (1996).

Kimura et al., "2D7 diabody bound to the α2 domain of HLA class I efficiently induces caspase-independent cell death against malignant and activated lymphoid cells," *Biochem. Biophys. Res. Commun.*, 325:1201-1209 (2004).

Kreitman et al., "Cytotoxic Activity of Disulfide-stabilized Recombinant Immunotoxin RFB4(dsFv)-PE38 (BL22) toward Fresh Malignant Cells from Patients with B-Cell Leukemias," *Clin. Cancer Res.*, 6:1476-1487 (2000).

Kulkarni et al., "Construction of a Single-Chain Antibody Derived From 5H7, A Monoclonal Antibody Specific for a Death Signaling Domain of Human Class I Major Histocompatibility Complex," *Transplant. Proc.*, 30:1081 (1998), 1st page only.

Kulkarni et al., "Programmed Cell Death Signaling Via Cell-surface Expression of a Single-chain Antibody Transgene," *Transplantation*, 69:1209-1217 (2000).

Lebrun et al., "Antibodies to the Extracellular Receptor Domain Restore the Hormone-insensitive Kinase and Conformation of the Mutant Insulin Receptor Valine 382," *J. Biol. Chem.*, 268:11272-11277 (1993).

Li et al., "The Epitope Specificity and Tissue Reactivity of Four Murine Monoclonal Anti-CD22 Antibodies," *Cell. Immunol.*, 118:85-99 (1989).

Matsuoka et al., "A Novel Type of Cell Death of Lymphocytes Induced by a Monoclonal Antibody without Participation of Complement," *J. Exp. Med.*, 181:2007-2015 (1995).

Nishii, "CD22 antibody therapy," *Current Therapy*, 20:47-50 (2001) (English translation included).

Ohtomo et al., "Molecular Cloning and Characterization of a Surface Antigen Preferentially Overexpressed on Multiple Myeloma Cells," *Biochem. Biophys. Res. Commun.*, 258:583-591 (1999).

Oka, "Development of Novel Immunotoxin Using Recombinant Alpha-Sarcin and Its Application Treatment of Hematopoietic Tumor," *Sankyo Seimei Kagaku Kenkyu Shinko Zaidan Kenkyu Hokokushu*, 12:46-56 (1998) (concise English explanation included).

Ono et al., "The humanized anti-HM1.24 antibody effectively kills multiple myeloma cells by human effector cell-mediated cytotoxicity," *Mol. Immunol.*, 36:387-395 (1999).

Orita et al., "A novel therapeutic approach for thrombocytopenia by minibody agonist of the thrombopoietin receptor," *Blood*, 105:562-566 (2005).

Ozaki et al., "Humanized Anti-HM1.24 Antibody Mediates Myeloma Cell Cytotoxicity That Is Enhanced by Cytokine Stimulation of Effector Cells," *Blood*, 93:3922-3930 (1999).

Ozaki et al., "Immunotherapy of Multiple Myeloma With a Monoclonal Antibody Directed Against a Plasma Cell-Specific Antigen, HM1.24," *Blood*, 90:3179-3186 (1997).

Pettersen et al., "The TCR-Binding Region of the HLA Class I α$_2$ Domain Signals Rapid Fas-Independent Cell Death: A Direct Pathway for T Cell-Mediated Killing of Target Cells?" *J. Immunol.*, 160:4343-4352 (1998).

Plückthun et al., "New protein engineering approaches to multivalent and bispecific antibody fragments," *Immunotechnology*, 3:83-105 (1997).

Sato et al., "CD22 Is Both a Positive and Negative Regulator of B Lymphocyte Antigen Receptor Signal Transduction: Altered Signaling in CD22-Deficient Mice," *Immunity*, 5:551-562 (1996).

Tedder et al., "CD22, a B Lymphocyte-Specific Adhesion Molecule That Regulates Antigen Receptor Signaling," *Annu. Rev. Immunol.*, 15:481-504 (1997).

Thilenius et al., "Agonist antibody and Fas ligand mediate different sensitivity to death in the signaling pathways of Fas and cytoplasmic mutants," *Eur. J. Immunol.*, 27:1108-1114 (1997).

Woodle et al., "Anti-Human Class I α3 Domain-Specific Monoclonal Antibody Induces Programmed Cell Death in Murine Cells Expressing Human Class I MHC Transgenes," *Transplant. Proc.*, 30:1059-1060 (1998).

Woodle et al., "Anti-Human Class I MHC Antibodies Induce Apoptosis by a Pathway That Is Distinct from the Fas Antigen-Mediated Pathway," *J. Immunol.*, 158:2156-2164 (1997).

Woodle et al., "Class I MHC Mediates Programmed Cell Death in Human Lymphoid Cells," *Transplantation*, 64:140-146 (1997).

Ballmaier et al., "c-mpl mutations are the cause of congenital amegakaryocytic thrombocytopenia", Blood, 97:139-46 (2001).

Burrone et al., "Stimulation of HLA-A,B,C by IFN-alpha. The derivation of Molt 4 variants and the differential expression of HLA-A,B,C subsets", The EMBO Journal 4(11):2855-2860, 1985.

Cangemi et al., "IFN-alpha mediates the up-regulatioon of HLA class I on melanoma cells without switching proteasome to immunoproteasome", International Immunology 15(12):1415-1421, 2005.

DeJonge et al., "In vivo retargeting of T cell effector function by recombinant bispecific single chain Fv (anti-DC3 × anti-idiottype) induces long term survival of the murine BCL1 lymphoma model", J. Immunol. 161(3):1454-1461, 1998.

Kriangkum et al., "Bispecific and bifunctional single chain recombinant antibodies", Biomol. Eng., 18(2):31-40, 2001.

Kumar et al., "The second PDZ domain of INAD is a type I domain involved in binding to eye protein kinase C. Mutational analysis and naturally occurring variants", J. Biol. Chem. 276(27):24971-2497, 2001.

Ledbetter et al., Agonistic Activity of a CD40-Specific Single-Chain Fv Constructed from the Variable Regions of mAb G28-5, Critical Reviews in Immunology, vol. 17, pp. 427-435, 1997.

Mack et al. "A snall bispecific antibody construct expressed as a functional single-chain molecule with high tumor cell cytotoxicity", Proc. Natl. Acad. Sci. USA, 92(15):7021-7025, 1995.

Mallender et al., "Construction, expression and activity of a bivalent bispecific single-chain antibody", J. Biol. Chem. 269(1):199-206, 1994.

Sal-man et al., "Arginine mutations within a transmembrane domain of Tar, an *Escherichia coli* aspartate receptor, can drive monodimer dissociation and heterodimer association n vivo", Biochem. J. 385(1):29-36, 2005.

Reff et al., "A review of modifications to recombinant antibodies: attempt to increase efficacy in oncology applications", Critical Reviews in Oncology and Hematology, 40:25-35, 2001.

Casset et al., "A peptide mimetic of an anti-CD4 monoclonal antibody by rational design", Biochemical and Biophysical Research Communications 307:198-205, 2003.

Chen et al., "Selection and analysis of an optimized anti-VEGF antibody: Crystal structure of an affinity-matured Fab in complex with antigen", Journal of Molecular Biology 293:865-881, 1999.

De Pascalis et al., "Grafting of 'abbreviated' complementary-determining regions containing specificity-determining residues essential for ligand contact to engineer a less immunogenic humanized monoclonal antibody", Journal of Immunology 169:3076-3084, 2002.

Holm et al., "Functional mapping and single chain construction of the anti-cytokeratin 8 monoclonal antibody TS1", Molecular Immunology 44:1075-1084, 2007.

Kortt et al., "Dimeric and trimeric antibodies: high avidity scFvs for cancer targeting," Biomol. Eng., 18:95-108 (2001).

MacCallum et al., "Antibody-antigen interactions: Contact analysis and binding site topography", Journal of Molecular Biology 262:732-745, 1996.

Matsuoka et al., "A Monoclonal Antibody to the α2 Domain of Murine Major Histocompatibility Complex Class I that Specifically Kills Activated Lymphocytes and Blocks Liver Damage in the Concanavalin A Hepatitis Model," J. Exp. Med., 198:497-503 (2003).

Ozaki et al., "A Recombinant HLA Class I-Specific Single Chain Fv Diabody Induces Cell Death in Human Lymphoid Malignancies," Blood, 102:933a, Abstract No. 3474 (2003).

Rossi et al., "Development of New Multivalent-bispecific Agents for Pretargeting Tumor Localization and Therapy," Clin. Cancer Res., 9:3886s-3896s (2003).

Rudikoff et al., "Single amino acid substitution altering antigen-binding specificity", Proc. Natl. Acad. Sci. USA, 79:1979-1983, 1982.

Scheurle et al., "Cancer Gene Discovery Using Digital Differential Display," Cancer Res., 60:4037-4043 (2000).

Skolnick et al., "From genes to protein structure and function: novel applications of computational approaches in the genomic era", Trends in Biotechnology 18:34-39, 2000.

Smith et al., "Inhibition of T Cell Activation by a Monoclonal Antibody Reactive Against the α3 Domain of Human MHC Class I Molecules," J. Immunol., 153:1054-1067 (1994).

Tahtis et al., "Biodistribution Properties of 111Indium-labeled C-Functionalized trans-Cyclohexyl Diethylenetriaminepentaacetic Acid Humanized 3S193 Diabody and F(ab')2 Constructs in a Breast Carcinoma Xenograft Model," Clin. Cancer Res., 7:1061-1072 (2001).

Vajdos et al., "Comprehensive functional maps of the antigen-binding site of an anti-ErbB2 antibody obtained with shotgun scanning mutagenesis", Journal of Molecular Biology 320:415-428, 2002.

Wu et al., "Humanization of a murine monoclonal antibody by simultaneous optimization of framework and CDR residues", Journal of Molecular Biology 294:151-162, 1999.

Wu et al., "Tumor localization of anti-CEA single-chain Fvs: improved targeting by non-covalent dimers," Immunotechnology, 2:21-36 (1996).

Xiong et al., "Efficient inhibition of human B-cell lymphoma xenografts with an anti-CD20 X anti-CD3 bispecific diabody," Cancer Lett., 177:29-39 (2002).

Xu et al., "Insight into hepatocellular carcinogenesis at transcriptome level by comparing gene expression profiles of hepatocellular carcinoma with those of corresponding noncancerous liver," Proc. Natl. Acad. Sci. USA, 98:15089-15094 (2001).

Sackstein, "The lymphocyte homing receptors: gatekeepers of the multistep paradigm," Current Opinion in Hematology, 12:444-450 (2005).

USPTO Restriction Requirement in U.S. Appl. No. 10/582,176, mailed Oct. 19, 2009, 6 pages.

USPTO Interview Summary in U.S. Appl. No. 10/582,413, mailed Oct. 27, 2009, 4 pages.

Avent et al., "Monoclonal antibodies that recognize different membrane proteins that are deficient in Rhnull human erythrocytes. One group of antibodies reacts with a variety of cells and tissues whereas the other group is erythroid-specific," Biochem. J., 251:499-505 (1988).

Bartley et al., "Identification and Cloning of a Megakaryocyte Growth and Development Factor That is a Ligand for the Cytokine Receptor Mpl," Cell, 77:1117-1124 (1994).

Bazil et al., "Apoptosis of human hematopoietic progenitor cells induced by crosslinking of surface CD43, the major sialoglycoprotein of leukocytes," Blood, 86:502-511 (1995).

Bazzoni et al., "Chimeric tumor necrosis factor receptors with constitutive signaling activity," Proc. Natl. Acad. Sci. USA, 92(12):5376-5580 (1995).

Berger et al., "Inhibition of intractable nucleases with ribonucleoside-vanadyl complexes: isolation of messenger ribonucleic acid from resting lymphocytes," Biochemistry, 18(23):5143-5149 (1979).

Bodmer et al., "Trail Receptor-2 Signals Apoptosis Through FADD and Caspase-8," Nat. Cell Biol., 2:241-243 (2000).

Bowie et al., "Deciphering the Message in Protein Sequences: Tolerance to Amino Acid Substitutions," Science, 247:1306-1310 (1990).

Brown et al., "Integrin-associated protein: a 50-kD plasma membrane antigen physically and functionally associated with integrins," J. Cell Biology, 111(6 Pt 1):2785-2794 (1990).

Brown et al., "Integrin-associated protein (CD47) and its ligands," Trends Cell Biology, 11(3):130-135 (2001).

Buchsbaum et al., "Antitumor Efficacy of TRA-8 Anti-DR5 Monoclonal Antibody Alone or in Combination with Chemotherapy and/or Radiation Therapy in a Human Breast Cancer Model," Clin. Cancer Res., 9:3731-3741 (2003).

Burgess et al., "Possible dissociation of the heparin-binding and mitogenic activities of heparin-binding (acidic fibroblast) growth factor-1 from its receptor-binding activities by site-directed mutagenesis of a single lysine residue," J. Cell Biol., 111:2129-2138 (1990).

Burthem et al., "Hairy cell interactions with extracellular matrix: expression of specific integrin receptors and their role in the cell's response to specific adhesive proteins," Blood, 84(3):873-882 (1994).

Caldas et al., "Humanization of the anti-CD18 antibody 6.7: an unexpected effect of a framework residue in binding to antigen," Mol. Immunol., 39:941-952 (2003).

Chien et al., "Significant structural and functional change of an antigen-binding site by a distant amino acid substitution: Proposal of a structural mechanism," Proc. Nat. Acad. Sci. USA, 86:5532-5536 (1989).

Chirgwin et al., "Isolation of biologically active ribonucleic acid from sources enriched in ribonuclease," Biochemistry, 18(24):5294-5299 (1979).

Chuntharapai et al. "Isotype-Dependent Inhibition of Tumor Growth In Vivo by Monoclonal Antibodies to Death Receptor 4," J. Immunol., 166:4891-4898 (2001).

Cochlovius et al., "Cure of Burkitt's Lymphoma in Severe Combined Immunodeficiency Mice by T Cells, Tetravalent CD3 x CD19 Tandem Diabody and CD28 Costimulation," Cancer Res., 60:4336-4341 (2000).

Cooper et al., "Transendothelial migration of neutrophils involves integrin-associated protein (CD47)," Proc. Natl. Acad. Sci. USA, 92:3978-3982 (1995).

Daniel et al., "Pathway of apoptosis induced in Jurkat T Lymphoblasts by anti-HLA Class I antibodies," Human Immunology, 65(3):189-199 (2004).

De Leon et al., "High resolution human leukocyte antigen (HLA) class I and class II allele typing in Mexican mestizo women with sporadic breast cancer: case-control study," BMC Cancer, 9(48):1-9 (2009).

Degli-Esposti et al., "Cloning and Characterization of TRAIL-R3, a Novel Member of the Emerging TRAIL Receptor Family," J. Exp. Med., 186:1165-1170 (1997).

De Sauvage et al., "Stimulation of Megakaryocytopoiesis and Thrombopoiesis by the c-Mpl Ligand," Nature, 369:533-538 (1994).

Desplancq et al., "Multimerization behaviour of single chain Fv variants for the tumour-binding antibody B72.3," Protein Engineering, 7(8):1027-1033 (1994).

Dillman, "Monoclonal antibodies for treating cancer," Ann. Int. Med., 11(7):592-603 (1989).

Dorai et al., "Mammalian cell expression of single-chain Fv (sFv) antibody proteins and their C-terminal fusions with interleukin-2 and other effector domains," Biotechnology, 12(9):890-897 (1994).

Emery et al., "Osteoprotegerin Is a Receptor for the Cytotoxic Ligand TRAIL," J. Biol. Chem., 273: 14363-14367 (1998).

Felgenhauer et al. "Nucleotide Sequences of the cDNAs Encoding the V-Regions of H- and L-Chains of a Human Monoclonal Antibody Specific to HIV-1—gp41," Nucleic Acids Research, 18(16):4927 (1990).

Fujimoto et al., "50-kD integrin-associated protein does not detectably influence several functions of glycoprotein IIb-IIIa complex in human platelets," Blood, 86(6):2174-2182 (1995).

Fukushima et al., "Enhanced hematopoiesis in vivo and in vitro by splenic stromal cells derived from the mouse with recombinant granulocyte colony-stimulating factor," Blood, 80(8):1914-1922 (1992).

Fukushima et al., "Apoptosis of Bone Marrow Cells Via Integrin Associated Protein by the Novel Monoclonal Antibody," Blood, 94(10):479A (1999).

Galfre et al., "Preparation of monoclonal antibodies: strategies and procedures," Methods in Enzymology, 73:3-46 (1981).

Galfre et al., "Rat x rat hybrid myelomas and a monoclonal anti-Fd portion of mouse IgG," Nature, 277:131-133 (1979).

Giusti et al., "Somatic diversification of S107 from an antiphosphocholine to an anti-DNA autoantibody is due to a single base change in its heavy chain variable region," Proc. Natl. Acad. Sci. USA, 84:2926-2930 (1987).

Goding, "Monoclonal Antibodies: Principles and Practice," Academic Press, second Ed., 125:129 (1986).

Greenspan et at., "Defining epitopes: It's not as easy as it seems," Nature Biotechnology, 17:936-937 (1999).

Grell et al., "TR60 and TR80 tumor necrosis factor (TNF)-receptors can independently mediate cytolysis," *Lymphokine and Cytokine Research*, 12(3):143-148 (1993).

Griffith et al., "Functional Analysis of TRAIL Receptors Using Monoclonal Antibodies," *J. Immunol.*, 162:2597-2605 (1999).

Güssow and Seemann, "Humanization of Monoclonal Antibodies," *Methods in Enzymology*, 203:99-121 (1991).

Holliger el at., "Specific Killing of Lymphoma Cells by Cytotoxic T-Cells Mediated by a Bispecific Diabody," *Protein Engineering*, 9(3):299-305 (1996).

Hopp et al., "A Short Polypeptide Marker Sequence Useful for Recombinant Protein Identification and Purification," *Biotechnology*, 6:1204-1210 (1988).

Horan et al., "Dimerization of the extracellular domain of granuloycte-colony stimulating factor receptor by ligand binding: a monovalent ligand induces 2:2 complexes," *Biochemistry*, 35:4886-4896 (1996).

Huston et al., "Protein Engineering of Antibody Binding Sites: Recovery of Specific Activity in an Anti-Digoxin Single-Chain Fv Analogue Produced in *Escherichia coli*," *Proc. Natl. Acad. Sci. USA*, 85:5879-5883 (1988).

Itoh et al., "The Polypeptide Encoded by the cDNA for Human Cell Surface Antigen Fas Can Mediate Apoptosis," *Cell*, 66:233-243 (1991).

Jiang et al., "A Novel Peptide Isolated from a Phage Display Peptide Library with Trastuzumab Can Mimic Antigen Epitope of HER-2," *J. Biol. Chem.*, 280(6):4656-4662 (2005).

Jones et al., "Rapid PCR-Cloning of Full-Length Mouse Immunoglobulin Variable Regions," *Biotechnology*, 9:88-89 (1991).

Kearney, et al., "A New Mouse Myeloma Cell Line That Has Lost immunoglobulin Expression But Permits The Construction of Antibody-Secreting Hybrid Cells Lines," *The Journal of Immunology*, 123(4):1548-1550 (1979).

Keen et al., "The use of serum-free medium for the production of functionally active humanized monoclonal antibody from NSO mouse myeloma cells engineered using glutamine synthetase as a selectable marker," *Cytotechnology*, 18(3):207-217 (Abstract) (1994).

Kipriyanov et al., "Bispecific CD3 x CD19 diabody for T cell-mediated lysis of malignant human B cells," *In. J. Cancer*, 77:763-772 (1998).

Kohler, et al., "Derivation of specific antibody-producing tissue culture and tumor lines by cell fusion," *Eur. J. Immunol.*, 6:511-519 (1976).

Kortt et al., "Recombinant anti-sialidase single-chain variable fragment antibody: Characterization, formation of dimmer and higher-molecular-mass multimers and the solution of the crystal structure of the single-chain variable fragment/sialidase complex," *Eur. J. Biochem.*, 221:151-157 (1994).

Kortt et al., "Single-chain Fv fragments of anti-neuraminidase antibody NC10 containing five- and ten- residue linkers form dimmers and with zero-residue linker a trimer," *Protein Engineering*, 10(4):423433 (1997).

Kozak, M., "At Least Six Nucleotides Preceding the AUG Initiator Codon Enhance Translation in Mammalian Cells," *J. Mol. Biol.*, 196:947-950 (1987).

Larrick, et al., "Polymerase Chain Reaction Using Mixed Primers: Cloning of Human Monoclonal Antibody Variable Region Genes From Single Hybridoma Cells," *Biotechnology*, 7:934-938 (1989).

Law et al., "Observations On the Effect of a Folic-Acid Antagonist On Transplantable Lymphoid Leukemias in Mice," *Journal of the National Cancer Institute*, 10:179-193 (1949).

Lazar et al., "Transforming growth factor a: mutation of aspartic acid 47 and leucine 48 results in different biological activities," *Molecular and Cellular Biology*, 8:1247-1252 (1988).

Lei et al., "Characterization of the *Erwinia carotovora* pelB Gene and Its Product Pectate Lyase," *Journal of Bacteriology*, 4379-4383 (1987).

Lin et al., "Structure-function relationships in glucagon: properties of highly purified des-His-1-, monoiodo-, and (des-Asn-28, Thr-29)(homoserine lactone-27)-glucagon," *Biochemistry*, 14:1559-1563 (1975).

Lindberg et al., "Molecular Cloning of Integrin-Associated Protein: An Immunoglobulin Family Member with Multiple Membrane-Spanning Domains Implicated in $\alpha_v\beta_3$-Dependent Ligand Binding," *The Journal of Cell Biology*, 123(2):485-496, The Rockefeller University Press (1993).

Lindberg et al., "Rh-Related Antigen CD47 is the Signal-Transducer Integrin-Associated Protein," *J. Biol. Chem.*, 269:1567-1570 (1994).

Margulies et al., "Somatic Cell Hybridization of Mouse Myeloma Cells," *Cell*, 8:405-415 (1976).

Mariuzza et al., "The structural basis of antigen-antibody recognition," *Annu. Rev. Biophys. Biophys. Chem.*, 16:139-159 (1987).

Mariuzza et al., "The Structural Basis of Antigen-Antibody Recognition," *Ann. Rev. Biophys. Chem.*, 16:139-159 (1987).

Marsters et al., "A Novel Receptor for Apo2L/TRAIL Contains a Truncated Death Domain," *Curr. Biol.*, 7:1003-1006 (1997).

Mateo et at al., "Induction of Apoptosis in B-Cells From Chronic Lymphocytic Leukemia (B-CLLs) by CD47," *FASEB Journal*, 12(5):A1082 (1998).

Mawby et al., "Isolation and characterization of CD47 glycoprotein: a multispanning membrane protein which is the same as integrin-associated protein (IAP) and the ovarian tumor marker OA3," *Biochem. J.*, 304:525-530 (1994).

Methia et al., "Oligodeoxynucleotides Antisense to the Proto-Oncogene *c-Mpl* Specifically Inhibit In Vitro Megakaryocytopoiesis," *Blood*, 82(5):1395-1401 (1993).

Milili et al., "The VDJ Repertoire Expressed in Human preB Cells Reflects the Selection of *Bona Fide* Heavy Chains," *Eur. J. Immunol.*, 26:63-69 (1996).

Mizushima et al., "pEF-BOS, a Powerful Mammalian Expression Vector," *Nucleic Acids Research*, 18(17):5322 (1990).

Moore et al., "Kinetics and thermodynamics of dimer formation and dissociation for a recombinant humanized monoclonal antibody to vascular endothelial growth factor," *Biochemistry*, 38:13960-13967 (1999).

Mori et al., "Human normal hepatocytes are suspectible to apoptosis signal mediated by both TRAIL-R1 and TRAIL-R2," *Cell Death and Differentiation*, 11:203-207 (2004).

Mulligan et al., "Synthesis of Rabbit β-Globin in Cultured Monkey Kidney Cells Following Infection with a SV40 β-Globin Recombinant Genome," *Nature*, 277:108-114 (1979).

Nakayama et al., "Thrombocytosis in preterm infants: a possible involvement of thrombopoietin receptor gene expression," *Journal of Molecular Medicine*, 83:316-320 (2005).

Ngo et al., "Computational Complexity, Protein Structure Prediction, and the Levinthal Paradox," *The Protein Folding Problem and Tertiary Structure Prediction*, Merz, Jr. et al. Editors, Birkhauser Boston, 433-506 (1994).

Ohtsuka et al., "Synergistic induction of tumor cell apoptosis by death receptor antibody and chemotherapy agent through JNK/p38 and mitochondrial death pathway," *Oncogene*, 22:2034-2044 (2003).

Pan et al., "An Antagonist Decoy Receptor and a Death Domain-Containing Receptor for TRAIL," *Science*, 277:815-818 (1997).

Pan et al., "The Receptor for the Cytotoxic Ligand TRAIL," *Science*, 276:111-113 (1997).

Paul, *Fundamental Immunology*, Raven Press, NY, Chapter 8, p. 242 (1993).

Petterson et al., "CD47 Signals T Cell Death," *J. Immunol.*, 7031-7040 (1999).

Petterson, "CD47 and death signaling in the immune system," *Apoptosis*, 5:299-306 (2000).

Reinhold et al., "In vivo expression of alternatively spliced forms of integrin-associated protein (CD47)," *J. Cell Science*, 108:3419-3425 (1995).

Riechmann et al., "Reshaping Human Antibodies for Therapy," *Nature*, 332:323-327 (1988).

Reiter et al., "Engineering interchain disulfide bonds into conserved framework regions of Fv fragments: improved biochemical characteristics of recombinant immunotoxins containing disulfide-stabilized Fv," *Protein Engineering*, 7(5):697-704 (1994).

Reiter et al., "Stabilization of the Fv Fragments in Recombinant Immunotoxins by Disulfide Bonds Engineered into Conserved Framework Regions," *Biochemistry*, 33:5451-5459 (1994).

Roue et al. "Mitochondrial dysfunction in CD47-mediated caspase-independent cell death: ROS production in the absence of cytochrome c and AIF release," *Biochimie.*, 85:741-746 (2003).

Rozsnyay et al., "Phenylarsine oxide (PAO) blocks antigen receptor-induced calcium response and tyrosine phosphorylation of a distinct group of proteins," *Immunology Lett.*, 37(2-3):197-205 (1993).

Sato et al., "Reshaping a Human Antibody to Inhibit the Interleukin 6-Dependent Tumor Cell Growth," *Cancer Research*, 53:851-856 (1993).

Schickel, et al., "Gene for Integrin-Associated Protein (IAP, CD47): Physical Mapping, Genomic Structure, and Expression Studies in Skeletal Muscle," *Biochem. Cell. Biol.*, 80(2):169-176 (2002).

Schwartz et al., "A superactive insulin: [B10-aspartic acid]insulin(human)," *Proc. Natl. Acad. Sci. U.S.A.*, 84:6408-6411 (1987).

Schwartz et al., "A 50-kDa Integrin-associated Protein Is Required for Integrin-regulated Calcium Entry in endothelial Cells," *J. Biol. Chem.*, 268(27):19931-19934 (1993).

Schmidt et al., "A bivalent single-chain antibody-toxin specific for ErbB-2 and the EGF receptor," *Int. J. Cancer*, 65(4):538-546 (1996).

Sheridan et al., "Control of TRAIL-Induced Apoptosis by a Family of Signaling and Decoy Receptors," *Science*, 277:818-821 (1997).

Shigeta et al., "Sperm-immobilizing monoclonal antibody to human seminal plasma antigens," *Clin. Exp. Immunol.*, 42:458-462 (1980).

Shulman et al., "A better cell line for making hybridomas secreting specific antibodies," *Nature*, 276:269-270 (1978).

Souyri, M., "Mpl: from an acute myeloproliferative virus to the isolation of the long sought thrombopoietin," *Seminars in Hematology*, 35(3):222-231 (1998).

Spaargaren et al., "Antibody-induced Dimerization Activates the Epidermal Growth Factor Receptor Tyrosine Kinase," *The J. Biol. Chem.*, 266(3):1733-1739 (1981).

Stancovski et al., "Mechanistic aspects of the opposing effects of monoclonal antibodies to the ERBB2 receptor on tumor growth," *Proc. Natl. Acad. Sci. USA*, 88:8691-8695 (1991).

Trowbridge, I.S., "Interspecies Spleen-Myeloma Hybrid Producing Monoclonal Antibodies Against Mouse Lymphocyte Surface Glycoprotein, T200," *J. Exp. Med.*, 148:313-323 (1978).

Van Geelen et al., "Differential modulation of the TRAIL receptors and the CD95 receptor in colon carcinoma cell lines," *Br. J. Cancer*, 89(2):363-373 (2003).

Verma et al., "Antibody engineering: Comparison of bacterial, yeast, insect and mammalian expression systems," *Journal of Immunological Methods*, 216:165-181(1998).

Walczak et al., "TRAIL-R2: A Novel Apoptosis-Mediating Receptor for TRAIL," *EMBO J.*, 16:5386-5397 (1997).

Wells, "Perspectives in Biochemistry," *Biochemistry*, 29(37):8509-8517 (1990).

Wiley et al., "Identification and Characterization of a New Member of the TNF Family that Induces Apoptosis," *Immunity*, 3:673-682 (1995).

Winkler et al., "Changing the Antigen Binding Specificity by Single Point Mutations of an Anti-p24 (HIV-1) Antibody," *J. Immunol.*, 265:4505-4514 (2000).

Xie et al., "Direct Demonstration of MuSK Involvement in Acetylcholine Receptor Clustering Through Identification of Agonist ScFv," *Nature Biotechnology*, 15(8):768-771 (1997).

Yanabu et al., "Tyrosine phosphorylation and p72syk activation by an anti-glycoprotein Ib monoclonal antibody," *Blood*, 89(5):1590-1598 (1997).

Yarden et al., "Self-phosphorylation of epidermal growth factor receptor: evidence for a model of intermolecular allosteric activation," *Biochemistry*, 26(5):1434-1442 (1987).

Yelton et al., "Fusion of Mouse Myeloma and Spleen Cells," *Current Topics in Microbiology and Immunology*, 81:1-7 (1978).

USPTO Restriction Requirement in U.S. Appl. No. 10/530,696, mailed Oct. 19, 2006, 8 pages.

Fish & Richardson P.C., Response to Restriction Requirement dated Oct. 19, 2006, in U.S. Appl. No. 10/530,696, filed Nov. 16, 2006, 1 page.

USPTO Non-Final Office Action in U.S. Appl. No. 10/530,696, mailed Dec. 21, 2006, 19 pages.

Fish & Richardson P.C., Amendment in Reply to Office Action dated Dec. 21, 2006 in U.S. Appl. No. 10/530,696, filed Apr. 23, 2007, 16 pages.

USPTO Final Office Action in U.S. Appl. No. 10/530,696, mailed Aug. 8, 2007, 13 pages.

USPTO Interview Summary in U.S. Appl. No. 10/530,696, mailed Nov. 26, 2007, 3 pages.

Fish & Richardson P.C., Amendment in Reply to Office Action dated Dec. 21, 2006 in U.S. Appl. No. 10/530,696, filed Dec. 6, 2007, 12 pages.

USPTO Advisory Action in U.S. Appl. No. 10/530,696, mailed Dec. 14, 2007, 4 pages.

USPTO Non-Final Office Action in U.S. Appl. No. 10/530,696, mailed Feb. 5, 2008, 9 pages.

Fish & Richardson, Amendment in Reply to Office Action dated Feb. 5, 2008 in U.S. Appl. No. 10/530,696, filed Aug. 5, 2008, 7 pages.

USPTO Non-Final Office Action in U.S. Appl. No. 10/530,696, mailed Nov. 17, 2008, 18 pages.

Fish & Richardson, Amendment in Reply to Office Action dated Nov. 17, 2008 in U.S. Appl. No. 10/530,696, filed Feb. 17, 2009, 14 pages.

Japanese Patent Office, International Search Report for App. Ser. No. PCT/JP2003/013063, mailed Nov. 18, 2003, 2 pages.

Japanese Patent Office, International Preliminary Report on Patentability for App. Ser. No. PCT/JP2003/013063, dated Feb. 6, 2004, 4 pages.

European Search Report for App. Ser. No. EP 03 75 1456, dated Apr. 4, 2006, 2 pages.

USPTO Final Office Action in U.S. Appl. No. 10/530,696, mailed Jun. 8, 2009, 10 pages.

USPTO Restriction Requirement in U.S. Appl. No. 10/550,934, mailed Nov. 21, 2007, 7 pages.

Fish & Richardson P.C., Response to Restriction Requirement dated Nov. 21, 2007 in U.S. Appl. No. 10/550,934, filed Apr. 16, 2008, 2 pages.

USPTO Non-Final Office Action in U.S. Appl. No. 10/550,934, mailed Jun. 12, 2008, 27 pages.

Fish & Richardson P.C., Amendment in Reply to Office Action dated Jun. 12, 2008 in U.S. Appl. No. 10/550,934, filed Dec. 12, 2008, 45 pages.

USPTO Final Office Action in U.S. Appl. No. 10/550,934, mailed Mar. 16, 2009, 19 pages.

Japanese Patent Office, International Search Report for App. Ser. No. PCT/JP2004/004696, mailed Jul. 27, 2004, 5 pages.

Japanese Patent Office, International Preliminary Report on Patentability for App. Ser. No. PCT/JP2004/004696, dated Feb. 9, 2005, 10 pages.

European Search Report for App. Ser. No. EP 04 72 4770, dated Mar. 31, 2006, 4 pages.

USPTO Restriction Requirement in U.S. Appl. No. 10/551,504, mailed Jun. 27, 2008, 6 pages.

Fish & Richardson P.C., Response to Restriction Requirement dated Jun. 27, 2008 in U.S. Appl. No. 10/551,504, filed Sep. 29, 2008, 13 pages.

USPTO Restriction Requirement in U.S. Appl. No. 10/551,504, mailed Dec. 16, 2008, 5 pages.

Fish & Richardson P.C., Response to Restriction Requirement dated Dec. 16, 2008 in U.S. Appl. No. 10/551,504, filed Dec. 23, 2008, 14 pages.

USPTO Non-Final Office Action in U.S. Appl. No. 10/551,504, mailed Apr. 15, 2009, 35 pages.

Japanese Patent Office, International Search Report for App. Ser. No. PCT/JP2004/018506, mailed Mar. 22, 2005, 3 pages.

International Preliminary Report on Patentability for App. Ser. No. PCT/JP2004/018506, 8 pages.

European Search Report for App. Ser. No. EP 04 82 0316, dated Jul. 17, 2008, 3 pages.

Japanese Patent Office, International Search Report for App. Ser. No. PCT/JP2004/018499, mailed Jan. 18, 2005, 2 pages.

Japanese Patent Office, International Preliminary Report on Patentability for App. Ser. No. PCT/JP2004/018499, dated Jan. 26, 2006, 5 pages.

USPTO Restriction Requirement in U.S. Appl. No. 10/582,413, mailed Jan. 4, 2008, 8 pages.

Fish & Richardson P.C., Response to Restriction Requirement dated Jan. 4, 2008 in U.S. Appl. No. 10/582,413, filed Feb. 4, 2008, 2 pages.
USPTO Non-Final Office Action in U.S. Appl. No. 10/582,413, mailed Mar. 31, 2008, 17 pages.
Fish & Richardson P.C., Amendment in Reply to Action dated Mar. 31, 2008 in U.S. Appl. No. 10/582,413, filed Jun. 30, 2008, 20 pages.
USPTO Interview Summary in U.S. Appl. No. 10/582,413, mailed Jun. 30, 2008, 2 pages.
USPTO Notice of Informal or Non-Responsive Amendment in in U.S. Appl. No. 10/582,413, mailed Oct. 20, 2008, 3 pages.
USPTO Interview Summary in U.S. Appl. No. 10/582,413, mailed Nov. 12, 2008, 4 pages.
Fish & Richardson P.C., Amendment in Reply to Notice of Informal or Non-Responsive Amendment dated Oct. 20, 2008 in U.S. Appl. No. 10/582,413, filed Nov. 17, 2008, 10 pages.
USPTO Interview Summary in U.S. Appl. No. 10/582,413, mailed Nov. 25, 2008, 4 pages.
USPTO Interview Summary in U.S. Appl. No. 10/582,413, mailed Dec. 24, 2008, 4 pages.
USPTO Restriction Requirement in U.S. Appl. No. 10/582,413, mailed Mar. 11, 2009, 8 pages.
Fish & Richardson P.C., Response to Restriction Requirement dated Mar. 11, 2009 in U.S. Appl. No. 10/582,413, filed Apr. 8, 2009, 8 pages.
Japanese Patent Office, International Search Report for App. Ser. No. PCT/JP2004/018493, mailed Mar. 22, 2005, 2 pages.
Japanese Patent Office, International Preliminary Report on Patentability for App. Ser. No. PCT/JP2004/018493, dated Dec. 20, 2005, 7 pages.
European Search Report for App. Ser. No. EP 04 82 0305, dated Oct. 6, 2008, 3 pages.
USPTO Restriction Requirement in U.S. Appl. No. 10/582,304, mailed Nov. 20, 2008, 7 pages.
Fish & Richardson P.C., Response to Restriction Requirement dated Nov. 20, 2008 in U.S. Appl. No. 10/582,304, filed Dec. 16, 2008, 3 pages.
USPTO Non-Final Office Action in U.S. Appl. No. 10/582,304, mailed Apr. 1, 2009, 38 pages.
Japanese Patent Office, International Search Report for App. Ser. No. PCT/JP2004/018501, mailed Mar. 29, 2005, 2 pages.
International Preliminary Report on Patentability for App. Ser. No. PCT/JP2004/018501, dated Nov. 4, 2005, 7 pages.
European Search Report for App. Ser. No. EP 04 82 0311, dated Jan. 28, 2009, 4 pages.
Japanese Patent Office, International Search Report for App. Ser. No. PCT/JP2004/005152, mailed Jul. 20, 2004, 2 pages.
Japanese Patent Office, International Preliminary Report on Patentability for App. Ser. No. PCT/JP2004/005152, dated Feb. 14, 2005, 6 pages.
European Search Report for App. Ser. No. EP 04 72 6750, dated Feb. 4, 2008, 3 pages.
USPTO Non-Final Office Action in U.S. Appl. No. 11/547,747, mailed Jun. 1, 2009, 41 pages.
Japanese Patent Office, International Search Report for App. Ser. No. PCT/JP2006/309890, mailed Jul. 18, 2006, 2 pages.
International Preliminary Report on Patentability for App. Ser. No. PCT/JP2006/309890, dated Nov. 19, 2007, 5 pages.
USPTO Restriction Requirement in U.S. Appl. No. 10/582,654, mailed May 26, 2009, 9 pages.
USPTO Restriction Requirement in U.S. Appl. No. 10/399,518, mailed Nov. 25, 2005, 9 pages.
Foley & Lardner LLP, Response to Restriction Requirement dated Nov. 25, 2005 in U.S. Appl. No. 10/399,518, filed Dec. 23, 2005, 3 pages.
USPTO Non-Final Office Action in U.S. Appl. No. 10/399,518, mailed Mar. 27, 2006, 38 pages.
Foley & Lardner LLP, Amendment in Reply to Action dated Mar. 27, 2006 in U.S. Appl. No. 10/399,518, filed Sep. 26, 2006, 26 pages.
Foley & Lardner LLP, Supplemental Amendment in Reply to Action dated Mar. 27, 2006 in U.S. Appl. No. 10/399,518, filed Oct. 11, 2006, 11 pages.
Foley & Lardner LLP, Supplemental Amendment in Reply to Action dated Mar. 27, 2006 in U.S. Appl. No. 10/399,518, filed Oct. 13, 2006, 11 pages.
USPTO Non-Final Office Action in U.S. Appl. No. 10/399,518, mailed Dec. 28, 2006, 29 pages.
Foley & Lardner LLP, Amendment in Reply to Action dated Dec. 28, 2006 in U.S. Appl. No. 10/399,518, filed May 3, 2007, 22 pages.
USPTO Final Office Action in U.S. Appl. No. 10/399,518, mailed Jun. 7, 2007, 13 pages.
Foley & Lardner LLP, Amendment in Reply to Action dated Jun. 7, 2007 in U.S. Appl. No. 10/399,518, filed Sep. 7, 2007, 9 pages.
Advisory Action in U.S. Appl. No. 10/399,518, mailed Sep. 27, 2007, 5 pages.
Interview Summary in U.S. Appl. No. 10/399,518, mailed Nov. 13, 2007, 3 pages.
USPTO Non-Final Office Action in U.S. Appl. No. 10/399,518, mailed Jan. 31, 2008, 14 pages.
Foley & Lardner LLP, Amendment in Reply to Action dated Jan. 31, 2008 in U.S. Appl. No. 10/399,518, filed Apr. 30, 2008, 7 pages.
USPTO Final Office Action in U.S. Appl. No. 10/399,518, mailed Aug. 4, 2008, 8 pages.
Advisory Action in U.S. Appl. No. 10/399,518, mailed Nov. 7, 2008, 4 pages.
Foley & Lardner LLP, Amendment in Reply to Action dated Nov. 7, 2008 in U.S. Appl. No. 10/399,518, filed Oct. 23, 2008, 8 pages.
USPTO Non-Final Office Action in U.S. Appl. No. 10/399,518, mailed Feb. 17, 2009, 12 pages.
Foley & Lardner LLP, Amendment in Reply to Action dated Feb. 17, 2009 in U.S. Appl. No. 10/399,518, filed May 18, 2009, 26 pages.
USPTO Final Office Action in U.S. Appl. No. 10/582,413, mailed Jun. 25, 2009, 28 pages.
Beresford et al., "Binding Characteristics and Tumor Targeting of a Covalently Linked Divalent CC49 Single-Chain Antibody," *Int. J. Cancer*, 81:911-917 (1999).
Caron et al., "Engineered Humanized Dimeric Forms of IgG Are More Effective Antibodies," *J. Exp. Med.*, 176:1191-1195 (1992).
Japanese Patent Office, International Search Report for App. Ser. No. PCT/JP2004/003334, mailed Jun. 15, 2004, 3 pages.
Japanese Patent Office, International Preliminary Report on Patentability for App. Ser. No. PCT/JP2004/003334, dated May 2, 2005, 6 pages.
Fish & Richardson P.C., Amendment in Reply to Office Action dated Apr. 1, 2009 in U.S. Appl. No. 10/582,304, filed Jun. 30, 2009, 15 pages.
USPTO Restriction Requirement in U.S. Appl. No. 11/913,229, mailed Jul. 8, 2009, 6 pages.
Fish & Richardson P.C., Response to Restriction Requirement dated Jul. 8, 2009 in U.S. Appl. No. 11/913,229, filed Aug. 4, 2009, 1 page.
European Search Report for App. Ser. No. EP 06 74 6578, dated Jun. 25, 2009, 2 pages.
Arndt et al., "Factors Influencing the Dimer to Monomer Transition of an Antibody Single-Chain Fv Fragment," *Biochemistry*, 37:12918-12926 (1998).
Dufner et al., "Harnessing phage and ribosome display for antibody optimization," *Trends Biotechnol.*, 24(11):523-529 (2006).
Ichikawa et al., "Tumoricidal activity of a novel anti-human DR5 monoclonal antibody without hepatocyte cytotoxicity," *Nat. Med.*, 7:954-960 (2001).
Kumar et al., "Molecular cloning and expression of the Fabs of human autoantibodies in *Escherichia coli*," *The Journal of Biological Chemistry*, 275(41):35129-35136 (2000).
Mateo et al., "CD47 ligation induces caspase-independent cell death in chronic lymphocytic leukemia," *Nat. Med.*, 5(11):1277-1284 (1999).
Paul, *Fundamental Immunology*, 3rd Edition, Raven Press, NY, Chapter 8, pp. 292-295 (1993).
Smith-Gill et al., "Contributions of immunoglobulin heavy and light chains to antibody specificity for lysozyme and two haptens," *The Journal of Immunology*, 139:4135-4144 (1987).
Song et al., "Light chain of natural antibody plays a dominant role in protein antigen binding," *Biochemical and Biophysical Research Communications*, 268:390-394 (2000).

Wakelee et al., "Phase I and pharmacokinetic study of lexatumumab (HGS-ETR2) given every 2 weeks in patients with advanced solid tumors," *Ann. Oncol.* On-line publication (Jul. 24, 2009).

Ward et al., "Binding activities of a repertoire of single immunoglobulin variable domains secreted from *Escherichia coli*," *Nature*, 341:544-546 (1989).

Whitlow et al., "Multivalent Fvs: characterization of single-chain Fv oligomers and preparation of a bispecific Fv," *Protein Eng.*, 7(8):1017-1026 (1994).

Yagita et al., "TRAIL and its receptors as targets for cancer therapy," *Cancer Sci.*, 95:777-783 (2004).

Fish & Richardson P.C., Amendment in Reply to Action dated Mar. 16, 2009 in U.S. Appl. No. 10/550,934, filed Sep. 10, 2009, 75 pages.

Fish & Richardson P.C., Amendment in Reply to Action dated Apr. 15, 2009 in U.S. Appl. No. 10/551,504, filed Aug. 14, 2009, 19 pages.

USPTO Non-Final Office Action in U.S. Appl. No. 10/582,304, mailed Sep. 15, 2009, 22 pages.

Klarquist Sparkman, LLP Response to Restriction Requirement dated May 26, 2009 in U.S. Appl. No. 10/582,654, filed Jun. 23, 2009, 2 pages.

USPTO Office Action in U.S. Appl. No. 10/582,654, mailed Sep. 1, 2009, 36 pages.

USPTO Final Office Action in U.S. Appl. No. 10/399,518, mailed Sep. 11, 2009, 24 pages.

USPTO Restriction Requirement in U.S. Appl. No. 10/257,864, mailed Feb. 1, 2006, 14 pages.

Borden et al., "Lymphokines and Cytokines as Cancer Treatment," Cancer, 65:800-814 (1990).

Byers, "What Can Randomized Controlled Trials Tell us About Nutrition and Cancer Prevention?," CA Cancer J. Clin., 49:353-361 (1999).

Granziero et al., "Adoptive immunotherapy prevents prostate cancer in a transgenic animal model," Eur. J. Immunol., 29:1127-1138 (1999).

Fish & Richardson P.C., Response to Restriction Requirement dated Oct. 19, 2009 in U.S. Appl. No. 10/582,176, filed Nov. 4, 2009, 1 page.

USPTO Non-Final Office Action in U.S. Appl. No. 11/913,229, mailed Nov. 3, 2009, 40 pages.

Abe et al., "Surrogate thrombopoietin," *Immunology Letters*, 61:73-78 (1998).

CAPLUS Accession No. 2005:547624, 2 pages (2008).

McInnes and Schett, "Cytokines in the pathogenesis of rheumatoid arthritis," *Nature Reviews/Immunology*, 7:429-442 (2007).

Palacios et al., "IL-3-dependent mouse clones that express B-220 surface antigen, contain Ig genes in germ-line configuration, and generate B lymphocytes in vivo," *Cell*, 41:272-734 (1985).

Scott, "The Problem with Potency," *Nature Biotechnology*, 23(9):1037-1039 (2005).

Seikomoto et al., "A Single-Chain Fv Diabody Against Human Leukocyte Antigen-A Molecules Specifically Induces Myeloma Cell Death in the Bone Marrow Environment," *Cancer Res.*, 67(3):1184-1192 (2007).

Sekimoto et al., "Eradication of Human Myeloma Cells by a Recombinant HLA Class I-Specific Single Chain Fv Diabody," *Blood*, 102:932a, XP009106629 (Abstract #3469) (Nov. 2003) [Abstract of the American Society of Hematology 45$^{th}$ Annual Meeting, Dec. 6-9, 2003, San Diego, California].

Sekimoto et al., "A Recombinant HLA Class I-Specific Single Chain Fv Diabody Induces Cell Death in Human Lymphoid Malignancies," *Blood*, 102:933a, XP002987122 (Abstract #3474) (Nov. 2003) [Abstract of the American Society of Hematology 45th Annual Meeting, Dec. 6-9, 2003, San Diego, California].

Souyri et al., "A putative truncated cytokine receptor gene transduced by the myeloproliferative leukemia virus immortalizes hematopoietic progenitors," *Cell*, 63:1137-1147 (1990).

Stein et al., "Characterization of humanized IgG4 anti-HLA-DR monoclonal antibody that lacks effector cell functions but retains direct antilymphoma activity and increases the potency of rituximab," *Blood*, 108(8):2736-2744 (2006).

\* cited by examiner

*Content truncated due to length constraints.*

LIGAND HAVING AGONISTIC ACTIVITY TO MUTATED RECEPTOR

CROSS-REFERENCE TO RELATED APPLICATIONS

This application is the National Stage of International Application No. PCT/JP2004/003334, filed Mar. 12, 2004, which claims the benefit of Japanese Patent Application Ser. No. 2003-067832, filed on Mar. 13, 2003. The contents of both applications are hereby incorporated by reference in their entireties.

TECHNICAL FIELD

The present invention relates to ligands having agonistic activity to mutant receptors, and pharmaceutical compositions comprising the ligands as active ingredients.

BACKGROUND ART

In recent years, the causative genes of various diseases have been identified in quick succession, and a variety of therapeutic methods for such diseases have been studied and established. Of these methods, the most intensively studied are mostly therapeutic methods for complementing enzyme gene deficiencies. It has been reported that enzyme replacement therapy using "Cerezyme" (Genzyme) is effective for patients with Gaucher's disease, in which β-glucocerebrosidase is deficient, and that enzyme replacement therapy using "Aldurazyme" (Genzyme) is effective for patients with mucopolysaccharidosis, in which α-L-iduronidase is deficient. Previously attempted gene therapies include introducing the adenosine deaminase (ADA) gene to patients with ADA deficiency, and introducing the coagulation factor IX gene to patients with hemophilia B. In addition to enzyme deficiencies, a large number of genetic diseases are known, such as genetic diseases of cytokines and their receptors. Some patients with type II diabetes mellitus, which accounts for approximately 90% of diabetes mellitus cases, have been reported to have insulin receptor deletions or mutations. Such deletions and mutations are assumed to cause the disease. Furthermore, some patients with thrombocytopenia have been reported to have thrombopoietin receptor deletions and mutations, and the failure of TPO signaling can be thought to cause the disease. To date, no fundamental therapeutic methods have been available for such genetic diseases, and the establishment of such therapeutic methods is expected.

Congenital amegakaryocytic thrombocytopenia (CAMT) is a rare disorder that causes thrombocytopenia in infancy and pancytopenia in later childhood. It has been revealed that TPO, a thrombopoietic growth factor, is present in CAMT patients at a high concentration in sera, but that platelets and hematopoietic precursor cells lack TPO responsiveness. Most of these patients have been found to carry point mutations in their thrombopoietin receptor (c-MPL) gene. It has also been reported that such mutations result in frame shift or insertion of a termination codon, leading to patients who have a total loss of thrombopoietin receptor function and patients who have a homozygous or heterozygous amino acid substitution in the extracellular domain of the receptor (see Non-patent Document 1). Bone marrow transplant is the only currently available therapeutic method for treating such patients.

[Non-Patent Document 1]

Matthias Ballmaier, Manuela Germeshausen, Harald Schulze, Klara Cherkaoui, Sabine Lang, Annika Gaudig, Stephanie Krukemeier, Martin Eilers, Gabriele Strausz, and Karl Welte, "BLOOD", vol. 97, No. 1, pp. 139 (Jan. 1, 2001).

DISCLOSURE OF THE INVENTION

The present invention was achieved in view of the circumstances described above. An objective of the present invention is to provide ligands having agonistic activity to mutant receptors.

The present inventors studied intensively to achieve the objective described above. By using antibody engineering techniques, the inventors prepared functional antibodies corresponding to each of the mutations in the causative genes of the diseases described above, discovering that these antibodies were useful to treat such diseases. Specifically, the inventors succeeded in preparing minibodies, each of which has agonistic activity to a mutant receptor that has almost completely lost responsiveness to its natural ligand due to gene mutation (for example, a thrombopoietin (TPO) receptor whose responsiveness to TPO is mostly lost), and which can transduce signals at levels comparable to normal levels when reacted with such a mutant receptor.

Diseases caused by gene mutations can be treated by using such antibodies or modified products thereof. Alternatively, such diseases can be treated by gene therapy using genes capable of expressing the antibodies or modified products thereof.

CAMT patients, who were previously difficult to treat, can now be treated using ligands having agonistic activity, such as the antibodies of the present invention or the genes encoding them.

In addition, the methods of the present invention are applicable to various other diseases caused by mutations in genes encoding receptors on cell membranes. Thus, the present invention can provide new therapeutic methods for these diseases.

Specifically, the present invention relates to ligands having agonistic activity to mutant receptors, more specifically provides:

[1] a ligand having agonistic activity to a mutant receptor;

[2] the ligand of [1], where the ligand is an antibody;

[3] the ligand of [1] or [2], where the ligand has greater agonistic activity to the mutant receptor than the natural ligand;

[4]. the ligand of any one of [1] to [3], where the mutant receptor is a receptor resulting from a mutation(s) in the amino acid sequence;

[5] the ligand of any one of [1] to [4], where the mutant receptor has lost responsiveness to the natural ligand;

[6] the ligand of any one of [1] to [5], where the mutant receptor causes a disease;

[7] the ligand of any one of [1] to [6], where the mutant receptor is a mutant thrombopoietin receptor;

[8] the ligand of [2], where the antibody is a minibody;

[9] the ligand of [8], where the minibody is a diabody;

[10] the ligand of [8], where the minibody is sc(Fv)2;

[11] a method for transducing a signal to a mutant receptor by binding a ligand;

[12] the method of [11], where the ligand is an antibody;

[13] the method of [11] or [12], where the mutant receptor results from an amino acid mutation(s);

[14] the method of any one of [11] to [13], where the mutant receptor has lost responsiveness to the natural ligand;

[15] the method of any one of [11] to [14], where the mutant receptor is associated with disease onset;

[16] the method of any one of [11] to [15], where the mutant receptor is a mutant thrombopoietin receptor;

[17] a method for treating a disease caused by a mutant receptor, by binding a ligand to the mutant receptor;

[18] the method of [17], where the ligand is an antibody;

[19] a method of screening for a ligand having agonistic activity to a mutant receptor, where the method comprises the steps of,
   (a) contacting a test substance with the mutant receptor,
   (b) detecting a signal in the mutant receptor, and
   (c) selecting a ligand having agonistic activity;

[20] a method of screening for a ligand having agonistic activity to a mutant receptor, where the method comprises the steps of,
   (a) determining agonistic activity to a normal receptor,
   (b) determining agonistic activity to the mutant receptor, and
   (c) selecting a ligand having greater agonistic activity to the mutant receptor than the normal receptor;

[21] a method of screening for a ligand having agonistic activity to normal and mutant receptors, where the method comprises the steps of,
   (a) determining agonistic activity to the normal receptor,
   (b) determining agonistic activity to the mutant receptor, and
   (c) selecting a ligand having agonistic activity to both normal and mutant receptors;

[22] the method of any one of [19] to [21], where the ligand is an antibody;

[23] a substance obtained by the method of any one of [19] to [22];

[24] a therapeutic agent for a disease caused by a mutant receptor, where the agent comprises a ligand of the mutant receptor;

[25] the therapeutic agent of [24], where the ligand is the ligand of any one of [1] to [9];

[26] the therapeutic agent of [24], where the ligand is an antibody;

[27] the therapeutic agent of any one of [24] to [26], where the mutant receptor results from an amino acid mutation(s);

[28] the therapeutic agent of any one of [24] to [27], where the mutant receptor has lost responsiveness to the natural ligand;

[29] the therapeutic agent of any one of [24] to [28], where the mutant receptor is a mutant thrombopoietin receptor; and,

[30] the therapeutic agent of any one of [24] to [29], where the disease is congenital amegakaryocytic thrombocytopenia.

The present invention provides ligands having agonistic activity to mutant receptors.

Mutant receptors of the present invention are usually receptors that exist at a frequency of less than 50%, preferably less than 20%, more preferably less than 10%, and even more preferably less than 1%. The frequency is generally calculated using randomly selected subjects. However, the frequency may vary depending on country, area, sex, and such. Therefore, the frequency may also be calculated, for example, within a selected country or area such as Japan, the United States, or Europe, or be calculated for one sex. When there are two or more mutation sites in a receptor, the frequency may be calculated for multiple mutation sites or for any one of the mutation sites. Mutant receptors are preferably evaluated using frequency, as described above. However, mutant receptors can also be evaluated, for example, by their signal transducing ability. Specifically, for example, when two different receptors are present, the one with stronger transducing signals upon natural ligand-binding may be used as a non-mutant receptor, and the other with weaker transducing signals may be used as a mutant receptor.

Preferred mutant receptors of the present invention include, but are not limited to, receptors resulting from amino acid mutations (receptors with mutated amino acid sequences); however, any type of mutation is acceptable, as long as the mutated receptor influences responsiveness to natural ligands, or the conformation, sugar chain structure, or spatial relationship or angles when a receptor exists as a multimer, and so on. Mutations in the amino acid sequence include amino acid substitutions, deletions, insertions, and additions. The receptors of the present invention have preferably lost responsiveness to the natural ligands.

Herein, "ligand" refers to a substance that specifically binds to a functional protein. The type of ligand is not limited. Such ligands include low-molecular-weight compounds, proteins, and peptides. In the present invention, functional proteins are preferably receptors. In the present invention, ligands preferably have agonistic activity. The present invention also provides methods for transducing signals to a mutant receptor by binding a ligand of the present invention. Such ligands for use in the methods of the present invention are preferably non-natural ligands, and not natural ligands.

In the present invention, it is preferred to target a mutant receptor whose responsiveness to a natural ligand is different from that of a non-mutant receptor. A "mutant receptor whose responsiveness to a natural ligand is different from that of a non-mutant receptor" refers to a mutant receptor that exhibits agonistic activity and signaling activity that differs from the activities of the non-mutant receptor when the mutant and non-mutant receptors bind to the same natural ligand under the same conditions. In general, agonistic activity and signaling activity in mutant receptors is impaired compared with non-mutant receptors (the mutants have lost their responsiveness to natural ligands).

The receptors include receptors belonging to the hematopoietic growth factor receptor family, the cytokine receptor family, the tyrosine kinase receptor family, the serine/threonine kinase receptor family, the TNF receptor family, the G protein-coupled receptor family, the GPI-anchored receptor family, the tyrosine phosphatase receptor family, the adhesion factor family, and the hormone receptor family. There are many documents that describe receptors belonging to these receptor families, and their characteristics; for example Cooke B A, King R J B, van der Molen H J Eds. New Comprehensive Biochemistry Vol.18B "Hormones and their Actions Part II" pp. 1-46 (1988) Elsevier Science Publishers BV, New York, USA; Patthy L. (1990) Cell, 61: 13-14; Ullrich A. et al. (1990) Cell, 61: 203-212; Massagul J. (1992) Cell, 69: 1067-1070; Miyajima A. et al. (1992) Annu. Rev. Immunol., 10: 295-331; Taga T. and Kishimoto T. (1992) FASEB J., 7: 3387-3396; Fantl W I. et al. (1993) Annu. Rev. Biochem., 62: 453-481; Smith C A., et al. (1994) Cell, 76: 959-962; Flower D R. (1999) Biochim. Biophys. Acta, 1422: 207-234; Cell Technology: supplementary vol. Handbook series "Handbook for Adhesion factors" M. Miyasaka Ed. (1994) Shujunnsha, Tokyo, Japan, and so on. Specific receptors belonging to the families listed above include: human and mouse erythropoietin (EPO) receptors, human and mouse granulocyte-colony stimulating factor (G-CSF) receptors, human and mouse thrombopoietin (TPO) receptors, human and mouse insulin receptors, human and mouse Flt-3 ligand receptors, human and mouse platelet-derived growth factor (PDGF) receptors, human and mouse interferon (IFN)-α and -β receptors, human and mouse leptin receptors, human and mouse growth hormone (GH) receptors, human and mouse interleukin (IL)-10 receptors, human and mouse insulin-like growth factor (IGF)-I receptors, human and mouse leukemia inhibitory factor (LIF) receptors, and human and mouse ciliary neurotrophic factor (CNTF) receptors (hEPOR: Simon, S. et al. (1990) Blood 76, 31-35; mEPOR: D'Andrea, AD. Et al. (1989) Cell 57, 277-285; hG-CSFR: Fukunaga, R. et al. (1990) Proc. Natl. Acad. Sci. USA. 87, 8702-8706; mG-CSFR: Fukunaga, R. et al. (1990) Cell 61, 341-350; hTPOR: Vigon, I. et al. (1992) 89, 5640-5644; mTPOR: Skoda, R C. Et al. (1993) 12, 2645-2653; hInsR: Ullrich, A. et al. (1985) Nature 313, 756-761; hFlt-3: Small, D. et al. (1994) Proc. Natl. Acad. Sci. USA. 91, 459-463; hPDGFR: Gronwald, R G K. Et al. (1988) Proc. Natl. acad. Sci. USA. 85, 3435-3439; hIFN α/β R: Uze, G. et al. (1990) Cell 60, 225-234, and Novick, D. et al. (1994) Cell 77, 391-400).

In one embodiment, the mutant receptors of the present invention comprise receptors associated with disease onset. The phrase "mutant receptors associated with disease onset" means that the loss of responsiveness to a natural ligand is part of the reason that disease onset is triggered. In the present invention, a mutant receptor is not necessarily the sole factor triggering disease onset, and may be a contributing factor. Many reports have been previously published describing the association of mutant receptors with disease onset; however, in addition to previously reported associations, associations of mutant receptors and disease onset can also be identified by methods of statistical analysis (for example, correlation analyses). Correlation analyses, also called "case control studies", are well known to those skilled in the art (for example, Nishimura, Y., 1991, "Statistical analysis of polymorphisms", Saishin Igaku, 46:909-923; Oka, A. et al., 1990, Hum. Mol. Genetics 8, 2165-2170; Ota, M. et al., 1999, Am. J. Hum. Genet. 64, 1406-1410; Ozawa, A. et al., 1999, Tissue Antigens 53, 263-268). For example, the correlation between a mutant receptor and a disease can be studied by determining the frequency of the mutant receptor in patients and in healthy subjects, and examining whether the patient population has a higher mutant receptor frequency. Typically, differences in the frequency are evaluated using the x-test. x is obtained by the equation $x^2=\Sigma(observed\ value-expected\ value)^2/expected\ value$. A p value is obtained from the $x^2$ value thus determined. Whether a mutant receptor correlates with a disease can be determined based on this p value. For example, when $p<0.05$, a mutant receptor is considered to correlate with a disease.

There are many reports on mutant receptors known to be involved in disease onset. Such mutant receptors specifically include: mutant thrombopoietin (TPO) receptors, mutant insulin receptors, mutant erythropoietin receptors, mutant growth hormone receptors, mutant common γ chain receptors (common receptor of IL-2, IL-4, IL-7, IL-15, and IL-21), mutant androgen receptors (Glutamine Repeats and Neurodegenerative Disease: Molecular Aspects (2001), 261-267, Oxford University press), mutant receptors for proopiomelanocortin (POMC) and melanocortin (Journal of Clinical Endocrinology and Metabolism (2001), 86(4), 1442-1446), mutant ryanodine receptors (Human Mutation (2000), 15(5), 410-417), mutant thyroid-stimulation hormone receptors (Trends in Endocrinology and Metabolism (1998), 9(4), 133-140), and mutant thyrotropin receptors (European Journal of Medical Research (1996), 1(10), 460-464). In the present invention, particularly preferred mutant receptors are mutant thrombopoietin receptors.

Herein, a "natural ligand" refers to a ligand in the body, and is preferably a ligand with the most influence on non-mutant receptor signaling. Normally, the natural ligands of the present invention do not comprise antibodies.

"Agonistic activity" refers to the activity of inducing a change in a certain physiological activity, caused by transducing signals into cells upon the binding of a ligand to a receptor. The physiological activity includes, but is not limited to, growth-promoting activity, survival activity, differentiation activity, transcription activity, membrane transport activity, binding activity, proteolytic activity, phosphorylation/dephosphorylation activity, oxidation/reduction activity, transfer activity, nucleolytic activity, and dehydration activity.

In the present invention, any detection indicator may be used to assay physiological activities, as long as it can measure quantitative and/or qualitative change. For example, it is possible to use cell-free assay indicators, cell-based assay indicators, tissue-based assay indicators, and in vivo assay indicators. Indicators that can be used in cell-free assays include enzymatic reactions and quantitative and/or qualitative changes in proteins, DNAs, or RNAs. Such enzymatic reactions include amino acid transfers, sugar transfers, dehydrations, dehydrogenations, and substrate cleavages. Alternatively, the followings can be used: protein phosphorylations, dephosphorylations, dimerizations, multimerizations, catabolisations, dissociations and such; and DNA or RNA amplifications, cleavages, and extensions. For example, protein phosphorylation downstream of a signal transduction pathway may be used as a detection indicator. As indicators in cell-based assays, changes to cell phenotype, for example, quantitative and/or qualitative changes in products, changes in proliferation activity, morphological changes, or changes in cellular properties can be used. Products include secretory proteins, surface antigens, intracellular proteins, and mRNAs. Morphological changes include changes in process formation and/or process number, changes in cell flatness, changes in the degree of elongation/horizontal to vertical ratio, changes in cell size, changes in intracellular structure, heterogeneity/homogeneity of cell populations, and changes in cell density. Such morphological alterations can be observed under a microscope. Cellular properties to be used include anchorage dependency, cytokine-dependent responsiveness, hormone dependency, drug resistance, cell motility, cell migration activity, pulsatility, and alteration in intracellular substances. Cell motility includes cell infiltration activity and cell migration activity. Changes in intracellular substances include changes in enzyme activity, mRNA levels, levels of intracellular signaling molecules such as $Ca^{2+}$ and cAMP, and intracellular protein levels. Furthermore, changes in the cell proliferation activity induced by receptor stimulation can be used as an indicator. The indicators to be used in tissue-based assays include functional changes for the tissue in use. Indicators that can be used for in vivo assays include changes in tissue weight, changes in the blood system (for example, changes in the number of hemocytes, protein contents, or enzyme activities), changes in electrolyte levels, and changes in the circulatory system (for example, changes in blood pressure or heart rate).

The methods for measuring such detection indicators are not particularly limited. For example, luminescence, color development, fluorescence, radioactivity, fluorescence polarization values, surface plasmon resonance signals, time-resolved fluorescence, mass, absorption spectrums, light scattering, and fluorescence resonance energy transfers may be used. These measurement methods are known to those skilled in the art and may be appropriately selected depending on the purpose. For example, absorption spectra can be measured using a conventional photometer, plate reader, or such; luminescence can be measured with a luminometer or such; and fluorescence can be measured with a fluorometer or such. Mass can be determined with a mass spectrometer. Radioactivity can be determined with a measurement device such as a gamma counter, depending on the type of radiation. Fluorescence polarization values can be measured using BEACON (TaKaRa). Surface plasmon resonance signals can be obtained using BIACORE. Time-resolved fluorescence, fluorescence resonance energy transfer, or such can be measured with ARVO or such. Furthermore, a flow cytometer can also be used for measuring. In the present invention, it is possible to use a chimeric receptor comprising an extracellular domain of a mutant receptor and a cytoplasmic domain of another protein. For example, when the cytoplasmic domain of G-CSF receptor, EPO receptor, EGF receptor, or thrombopoietin receptor is used, the cell proliferation activity induced by stimulating the receptor can be used as a detection indicator. In assays using cell proliferation activity as a detection indicator, cell lines that die in the absence of ligands are preferably used to improve detection sensitivity. Cytokine-dependent cell lines are particularly preferred because they can be easily passaged. For example, it is possible to use CTLL-2 cells, which are an IL-2-dependent cell line, and 32D cells, FDC-P1 cells, and Ba/F3 cells, which are IL-3-dependent cell lines. These cell lines will die two or three day after the start of culture when a cytokine such as IL-2 or IL-3 that is essential for cell proliferation, is eliminated from the culture media. It is preferable to use FDC-P1 cells and Ba/F3 cells that express a chimeric receptor comprising the cytoplasmic domain of mouse G-CSF receptor.

The ligands of the present invention that have agonistic activity are not particularly limited, as long as they have agonistic activity to mutant receptors. Such ligands may have agonistic activity to both mutant and non-mutant receptors, or may only have agonistic activity to mutant receptors. When the ligands have agonistic activity to both mutant and non-mutant receptors, they may have greater agonistic activity to the non-mutant receptor, or greater agonistic activity to the mutant receptor. Alternatively, the ligands may have comparable agonistic activity to the non-mutant and mutant receptors. Nonetheless, when the chief purpose is to treat a disease caused by a mutant receptor, it is preferable to use a ligand with greater agonistic activity to the mutant receptor than the non-mutant receptor.

The antibodies of the present invention are not particularly limited, as long as they have agonistic activity, and mouse antibodies, rat antibodies, rabbit antibodies, sheep antibodies, camel antibodies, chimeric antibodies, humanized antibodies, human antibodies, and such can be appropriately used. Such antibodies may be polyclonal or monoclonal antibodies. Monoclonal antibodies are preferred because they can be stably produced as homogeneous antibodies. Both polyclonal and monoclonal antibodies can be prepared by methods known to those skilled in the art.

Hybridomas producing monoclonal antibodies can basically be prepared by the conventional methods described below. Specifically, immunization is carried out by a conventional immunization method, using a desired antigen or cells expressing the desired antigen as a sensitizing antigen. The prepared immunocytes are fused with known parental cells by a conventional cell fusion method. The fused cells are screened for monoclonal antibody-producing cells (hybridomas) by conventional screening methods.

The type of sensitizing antigen to be used is not limited. For example, a full-length protein of a receptor of interest, or a partial peptide thereof (for example, an extracellular domain) can be used. The antigens can be prepared by methods known to those skilled in the art; for example, according to methods using baculovirus (for example, see WO 98/46777). Hybridomas can be prepared, for example, by the method of Milstein et al. (Kohler, G. and Milstein, C., Methods Enzymol., 1981, 73, 3-46.). When an antigen has weak immunogenicity, the antigen may be conjugated with a large immunogenic molecule such as albumin, to achieve immunization. In addition, the present invention may use recombinant antibodies, produced by gene engineering. The genes encoding the antibodies are cloned from hybridomas, inserted into an appropriate vector, and then introduced into a host (see, e.g., Carl, A. K. Borrebaeck, James, W. Larrick, Therapeutic Monoclonal Antibodies, Published in the United Kingdom by Macmillan Publishers Ltd, 1990). Specifically, using a reverse transcriptase, cDNAs encoding the variable regions (V regions) of the antibodies are synthesized from the mRNAs of the hybridomas. DNAs encoding the variable regions of the antibodies of interest are obtained, and ligated with DNAs encoding desired constant regions (C regions) of the antibodies, and these constructs are inserted into expression vectors. Alternatively, DNAs encoding the variable regions of the antibodies may be inserted into expression vectors comprising the DNAs of the antibody C regions. Those cDNAs are inserted into expression vectors such that the genes are expressed under the regulation of an expression regulatory region, for example, an enhancer and promoter. Host cells are then transformed using the expression vectors, and the antibodies can be expressed. The epitopes on the molecules that are recognized by antibodies of the present invention are not limited to particular epitopes. The antibodies may recognize any epitope on the molecules. Typically, the antibodies recognize epitopes in the extracellular domain. In the present invention, recombinant antibodies artificially modified to reduce heterologous antigenicity against humans can be used. Examples of such recombinant antibodies include chimeric antibodies and humanized antibodies. These modified antibodies can be produced using known methods. A chimeric antibody comprises heavy chain and light chain variable regions of an antibody from a nonhuman mammal such as a mouse, and heavy chain and light chain constant regions of a human antibody. Such an antibody can be obtained by (1) ligating a DNA encoding a variable region of a mouse antibody to a DNA encoding a constant region of a human antibody; (2) inserting the resulting construct into an expression vector; and (3) introducing the vector into a host for production of the antibody. A humanized antibody, which is also called a reshaped human antibody, is obtained by transferring a complementarity determining region (CDR) of an antibody of a nonhuman mammal such as a mouse, to the CDR of a human antibody. Conventional genetic recombination techniques for the preparation of such antibodies are known. Specifically, a DNA sequence designed to ligate a CDR of a mouse antibody with the framework regions (FRs) of a human antibody is synthesized by PCR, using several oligonucleotides constructed to comprise overlapping portions at their ends. A humanized antibody can be obtained by (1) ligating the obtained DNA to a DNA that encodes a human antibody constant region; (2) inserting the resulting construct into an expression vector; and (3) introducing the vector into a host to produce the antibody (see European Patent Application No. EP 239,400, and International Patent Application No. WO 96/02576). Human antibody FRs ligated via the CDR are selected where the CDR forms a favorable antigen-binding site. As necessary, amino acids in the framework region of an antibody variable region may be substituted such that the CDR of a reshaped human antibody forms an appropriate antigen-binding site (Sato, K. et al., Cancer Res. (1993) 53, 851-856). Methods for obtaining human antibodies are also known. For example, desired human antibodies with antigen-binding activity can be obtained by (1) sensitizing human lymphocytes with antigens of interest or cells expressing antigens of interest in vitro; and (2) fusing the sensitized lymphocytes with human myeloma cells such as U266 (see Japanese Patent Application Kokoku Publication No. (JP-B) H01-59878 (examined, approved Japanese patent application published for opposition)). Alternatively, the desired human antibodies can also be obtained by using antigens of interest to immunize transgenic (Tg) animals comprising a partial or entire repertoire of human antibody genes (see International Patent Application WO 93/12227, WO 92/03918, WO 94/02602, WO 94/25585, WO 96/34096, and WO 96/33735). Furthermore, techniques to obtain human antibodies by panning with a human antibody library are known. For example, the variable regions of human antibodies are expressed as single chain antibodies (scFvs) on the surface of phages, using a phage display method, and the phages that bind to the antigen can be selected. By analyzing the genes of selected phages, the DNA sequences encoding the variable regions of human antibodies that bind to the antigen can be determined. If the DNA sequences of scFvs that bind to the antigen are identified, appropriate expression vectors comprising these sequences can be constructed to obtain human antibodies. Such methods are already well known (see WO 92/01047, WO 92/20791, WO 93/06213, WO 93/11236, WO 93/19172, WO 95/01438, and WO 95/15388). When the antibody genes are isolated and introduced into appropriate hosts to produce antibodies, hosts and expression vectors can be used in appropriate combinations. Eukaryotic host cells that can be used are animal cells, plant cells, and fungal cells. The animal cells include: (1) mammalian cells such as CHO, COS, myeloma, baby hamster kidney (BHK), HeLa, and Vero cells; (2) amphibian cells such as *Xenopus* oocytes; or (3) insect cells such as sf9, sf21, and Tn5. Known plant cells include cells derived from the *Nicotiana* genus such as *Nicotiana tabacum*, which can be callus-cultured. Known fungal cells include yeasts such as the *Saccharomyces* genus, for example *Saccharomyces cerevisiae*, and filamentous fungi such as the *Aspergillus* genus, for example *Aspergillus niger*. Prokaryotic cells can also be used in production systems that utilize bacterial cells. Known bacterial cells include *E. coli* and *Bacillus subtilis*. The antibodies can be obtained by introducing the antibody genes of interest into these cells by transformation, and then culturing the transformed cells in vitro.

The antibodies may be minibodies or modified products of antibodies, as long as they can bind to antigens. In the present invention, a minibody comprises an antibody fragment obtained by deleting a portion from a whole antibody (for example, whole IgG). There is no limitation on the type of minibody, as long as it has the ability to bind to an antigen. The antibody fragments of the present invention are not particularly limited, as long as they are portions of whole antibodies. The antibody fragments preferably comprise a heavy chain variable region (VH) or a light chain variable region (VL), and particularly preferably comprise both a VH and VL. Specifically, the antibody fragments include Fab, Fab', F(ab')$_2$, Fv, and scFv (single-chain Fv). A preferred antibody fragment is scFv (Huston, J. S. et al., Proc. Natl. Acad. Sci. U.S.A. (1988) 85, 5879-5883; and Plickthun "The Pharmacology of Monoclonal Antibodies" Vol. 113, Eds. Resenburg and Moore, Springer Verlag, New York, pp. 269-315, (1994)). Such an antibody fragment can be prepared by treating an antibody with an enzyme (for example, papain or pepsin) or by inserting a gene construct encoding the antibody fragment into an expression vector and expressing it in appropriate host cells (see, for example, Co, M. S. et al., J. Immunol. (1994) 152, 2968-2976; Better, M. and Horwitz, A. H., Methods Enzymol. (1989) 178, 476-496; Pluckthun, A. and Skerra, A., Methods Enzymol. (1989) 178, 497-515; Lamoyi, E., Methods Enzymol. (1986) 121, 652-663; Rousseaux, J. et al., Methods Enzymol. (1986) 121, 663-669; and Bird, R. E. and Walker, B. W., Trends Biotechnol. (1991) 9, 132-137). The minibodies of the present invention preferably have a smaller molecular weight than whole antibodies. However, the minibodies may form multimers (for example, dimers, trimers, or tetramers), and thus their molecular weights can be greater than those of whole antibodies.

Preferred minibodies of the present invention comprise two or more antibody VHs and two or more antibody VLs, in which each of the variable regions are directly linked, or indirectly linked together via linkers or such. The linkages may be covalent or non-covalent bonds, or comprise both covalent and non-covalent bonds. More preferred minibodies are antibodies comprising two or more VH-VL pairs formed via non-covalent bonding between VH and VL. The distance between the two VH-VL pairs in a minibody is preferably less than that in the whole antibody.

Particularly preferred minibodies of the present invention are diabodies and sc(Fv)2. A diabody is a dimerized fragment in which two variable regions are linked together via a linker or such (for example, scFv) (hereinafter, referred to as "a fragment constituting a diabody"), and which typically comprises two VL and two VH (P. Holliger et al., Proc. Natl. Acad. Sci. USA, 90, 6444-6448 (1993), EP 404097; WO 93/11161; Johnson et al., Methods in Enzymology, 203, 88-98, (1991); Holliger et al., Protein Engineering, 9, 299-305, (1996); Perisic et al., Structure, 2, 1217-1226, (1994); John et al., Protein Engineering, 12(7), 597-604, (1999); Holliger et al., Proc. Natl. Acad. Sci. USA. 90, 6444-6448, (1993); Atwell et al., Mol. Immunol. 33, 1301-1312, (1996)). The links between fragments constituting a diabody may be non-covalent or covalent bonds, and are preferably non-covalent bonds.

Alternatively, two fragments constituting a diabody can be linked together via a linker to form a single-chain diabody (scDiabody). When the fragments constituting the diabody are linked together using a long linker, comprising approximately 20 amino acids, it is possible to link the fragments constituting the diabody in the same chain using a non-covalent bond, forming a dimer.

Fragments constituting diabodies include a VL and VH linked together, a VL and VL linked together, a VH and VH linked together, and the like. A VH and VL linked together is preferred. There is no limitation on the type of linker for linking a variable region and variable region in a fragment constituting a diabody. However, it is preferable to use a linker short enough to prevent formation of a non-covalent bond between variable regions in the same fragment. Those skilled in the art can appropriately select the length of such linkers; however, their length is typically 2 to 14 amino acids, preferably 3 to 9 amino acids, and particularly preferably 4 to 6 amino acids. In these cases, the linker between the VL and VH encoded by the same fragment is short, and thus no non-covalent bonds are formed between VL and VH on the same chain. Thus, a single-chain V region fragment is not formed, and the VL and VH form dimers with other fragments via non-covalent bonds. Further, based on the same principle for producing diabodies, a multimerized antibody such as a trimer or tetramer can be prepared by linking three or more fragments constituting a diabody.

The sc(Fv)2 of the present invention are single-chain minibodies produced by linking two VHs and two VLs with linkers and such (Hudson et al., 1999, J Immunol. Methods 231: 177-189). sc(Fv)2 exhibit a particularly high agonistic activity compared to whole antibodies and other minibodies. sc(Fv)2 can be produced, for example, by linking scFv molecules with a linker.

In a preferable antibody, two VHs and two VLs are arranged in the order of VH, VL, VH, and VL ([VH]-linker-[VL]-linker-[VH]-linker-[VL]), beginning from the N terminus of a single-chain polypeptide.

The order of the two VHs and two VLs is not limited to the above arrangement, and they may be arranged in any order. Examples of arrangements are listed below:
[VL]-linker-[VH]-linker-[VH]-linker-[VL]
[VH]-linker-[VL]-linker-[VL]-linker-[VH]
[VH]-linker-[VH]-linker-[VL]-linker-[VL]
[VL]-linker-[VL]-linker-[VH]-linker-[VH]
[VL]-linker-[VH]-linker-[VL]-linker-[VH]

The linkers for linking the variable regions of an antibody can be arbitrary peptide linkers that can be introduced by genetic engineering, or synthetic linkers (for example, see Protein Engineering, 9(3), 299-305, 1996). However, peptide linkers are preferred in the present invention. There are no limitations as to the length of the peptide linkers. The length can be appropriately selected by those skilled in the art, depending on the purpose, and is typically 1 to 100 amino acids, preferably 3 to 50 amino acids, more preferably 5 to 30 amino acids, and even more preferably 12 to 18 amino acids (for example, 15 amino acids).

For example, such peptide linkers include:

```
Ser

Gly Ser

Gly Gly Ser

Ser Gly Gly

Gly Gly Gly Ser

Ser Gly Gly Gly

Gly Gly Gly Gly Ser

Ser Gly Gly Gly Gly

Gly Gly Gly Gly Gly Ser

Ser Gly Gly Gly Gly Gly

Gly Gly Gly Gly Gly Gly Ser

Ser Gly Gly Gly Gly Gly Gly (Gly Gly Gly Gly Ser)$_n$ (Ser Gly Gly Gly Gly)$_n$
``` where n is an integer of one or larger. The lengths and sequences of peptide linkers can be appropriately selected by those skilled in the art, depending on the purpose.

In an embodiment of the present invention, particularly preferable sc(Fv)2 include the sc(Fv)2 below:
[VH]-peptide linker (15 amino acids)-[VL]-peptide linker (15 amino acids)-[VH]-peptide linker (15 amino acids)-[VL]

Synthetic linkers (chemical cross-linking agents) include cross-linking agents routinely used to cross-link peptides; for example, N-hydroxy succinimide (NHS), disuccinimidyl suberate (DSS), bis(succinimidyl) suberate (BS$^3$), dithiobis (succinimidyl propionate) (DSP), dithiobis(succinimidyl propionate) (DTSSP), ethylene glycol bis(succinimidyl succinate) (EGS), ethylene glycol bis(sulfosuccinimidyl succinate) (sulfo-EGS), disuccinimidyl tartrate (DST), disulfosuccinimidyl tartrate (sulfo-DST), bis[2-(succinimidoxycarbonyloxy)ethyl]sulfone (BSOCOES), and bis[2-(succinimidoxycarbonyloxy)ethyl]sulfone (sulfo-BSOCOES). These cross-linking agents are commercially available.

In general, three linkers are required to link four antibody variable regions together. The linkers to be used may be of the same or different types. In the present invention, a preferable minibody is a diabody, even more preferably, an sc(Fv)2. Such a minibody can be prepared by treating an antibody with an enzyme, for example, papain or pepsin, to generate antibody fragments, or by constructing DNAs encoding those antibody fragments and introducing them into expression vectors, followed by expression in an appropriate host cell (see, for example, Co, M. S. et al., 1994, J. Immunol. 152, 2968-2976; Better, M. and Horwitz, A. H., 1989, Methods Enzymol. 178, 476-496; Pluckthun, A. and Skerra, A., 1989, Methods Enzymol. 178, 497-515; Lamoyi, E., 1986, Methods Enzymol. 121, 652-663; Rousseaux, J. et al., 1986, Methods Enzymol. 121, 663-669; Bird, R. E. and Walker, B. W., 1991, Trends Biotechnol. 9, 132-137).

Antibodies with extremely high agonistic activity can be prepared by converting whole antibodies into minibodies.

Modified antibodies for use include antibodies linked to various molecules, such as polyethylene glycol (PEG). Alternatively, it is also possible to link an antibody to a radioisotope, chemotherapeutic agent, or cytotoxic substance such as a bacterial toxin. Such modified antibodies can be prepared by chemically modifying an obtained antibody. Methods for modifying antibodies have been previously established in the art.

Further, antibodies for use in the present invention may be bispecific antibodies. A bispecific antibody may comprise two antigen-binding sites that each recognizes different epitopes on a certain molecule. Alternatively, one of the antigen-binding sites may recognize a certain molecule, and the other may recognize a radioactive substance, chemotherapeutic agent, or cytotoxic substance such as a bacterium-derived toxin. When such cytotoxic substances are used, tumor cell growth can be suppressed by directly adding the cytotoxic substance to cells that express a certain molecule, and specifically damaging the tumor cells. The bispecific antibodies can be prepared by linking pairs of H and L chains from two types of antibodies, or by fusing hybridomas which produce different monoclonal antibodies to produce a fused cell producing a bispecific antibody. Further, bispecific antibodies can be prepared using genetic engineering techniques.

Antibodies in which sugar chains have been modified can also be used in the present invention. Techniques for modifying antibody sugar chains have been previously reported (for example, WO 00/61739 and WO 02/31140).

An "antibody" of the present invention includes the antibodies described above.

The antibodies expressed or produced as described above can be purified by conventional protein purification methods. The antibodies can be separated and purified, for example, by the combined use of methods appropriately selected from affinity columns such as a protein A column, column chromatography, filtration, ultrafiltration, salting out, dialysis, and so on (Antibodies A Laboratory Manual. Ed Harlow, David Lane, Cold Spring Harbor Laboratory, 1988).

The antigen-binding activity of an antibody can be assayed by conventional methods (Antibodies A Laboratory Manual. Ed Harlow, David Lane, Cold Spring Harbor Laboratory, 1988). For example, an enzyme-linked immunosorbent assay (ELISA), enzyme immunoassay (EIA), radioimmunoassay (RIA), or immunofluorescence method can be used.

The present invention also provides methods of screening for ligands having agonistic activity to mutant receptors. In these methods, first, a test substance (test compound) is contacted with a mutant receptor. The "contact" of a test substance with a mutant receptor is typically achieved by adding the test substance to a culture medium or extract of cells expressing the mutant receptor. The methods for achieving contact are not limited to this method. When the test substance is a protein or such, the "contact" can be achieved by introducing a DNA vector expressing the protein into the cells.

In these methods, the next step comprises detecting signals from the mutant receptor. Signals can be detected by the methods described above.

Next, ligands with agonistic activity are selected based on comparison with cases when a test substance (control) is not contacted. The ligands selected in this way are expected to become therapeutic agents for treating or preventing diseases associated with receptor deficiencies or mutations.

In another embodiment, a screening method of the present invention comprises the first step of contacting a test substance with a normal receptor and measuring agonistic activity. Next, the same test substance is contacted with a mutant receptor, and agonistic activity is measured. Ligands with high agonistic activity to the mutant receptor as compared to a normal receptor are then selected.

In still another embodiment, a screening method of the present invention comprises the first step of contacting a test substance with a normal receptor and measuring the agonistic activity. Next, the same test substance is contacted with a mutant receptor and agonistic activity is measured. Ligands with agonistic activity to both the mutant receptor and normal receptor are then selected.

Measuring agonistic activity in the methods described above can be achieved as described above.

Substances (compounds) obtained by the above-described screening methods of the present invention are also comprised in the present invention.

Since the ligands of the present invention (for example, antibodies) have agonistic activity, they are expected to be effective therapeutic agents for diseases caused by the impaired response of receptors on which the ligands act. Such impaired responses are attributed to receptor deficiencies or mutations. Specifically, the present invention provides therapeutic agents comprising the above-described ligands of the present invention, which are used to treat diseases caused by the mutant receptors. Representative examples of the diseases described above are thrombocytopenia, type II diabetes mellitus, and Laron syndrome.

A preferred example of a disease of the present invention is congenital amegakaryocytic thrombocytopenia (CAMT).

When ligands of the present invention or substances (compounds) obtained by the methods for screening of the present invention are used as pharmaceutical compositions, they can be formulated by methods known to those skilled in the art. As necessary, the ligands or substances can be used orally, for example, as sugar-coated tablets, capsules, elixirs, or microcapsules, or parenterally, as injections of sterile solutions or suspensions comprising water or other pharmaceutically acceptable liquids. For example, the ligands or the substances can be formulated by appropriately combining with pharmaceutically acceptable carriers or solvents, specifically, sterile water or physiological saline, vegetable oils, emulsifiers, suspending agents, surfactants, stabilizers, flavoring agents, excipients, vehicles, preservatives, binding agents, and such, and mixing at a unit dosage and form required by accepted pharmaceutical implementations. In such formulations, the amount of the active ingredient should be within the required range.

Additives in the tablets or capsules can include, for example, binders such as gelatin, corn starch, gum tragacanth, and gum Arabic; excipients such as crystalline cellulose; swelling agents such as corn starch, gelatin, and alginic acid; lubricants such as magnesium stearate; edulcorants such as sucrose, lactose, or saccharin; and flavoring agents such as peppermint, Gaultheria adenothrix oil, and cherry. When the unit dosage form is a capsule, the above-described materials can also comprise a liquid carrier such as oil. A sterile composition for injection can be formulated using a vehicle such as distilled water used for injection, according to standard protocols.

Aqueous solutions used for injections include physiological saline and isotonic solutions comprising glucose or other adjunctive agents such as D-sorbitol, D-mannose, D-mannitol, and sodium chloride. They may also be combined with an appropriate solubilizing agent such as alcohol, specifically, ethanol, polyalcohol such as propylene glycol or polyethylene glycol, or non-ionic detergent such as polysorbate 80™ or HCO-50.

Oil solutions include sesame oils and soybean oils, and can be combined with solubilizing agents such as benzyl benzoate or benzyl alcohol. They may also be formulated with buffers, for example, phosphate buffers or sodium acetate buffers; analgesics, for example, procaine hydrochloride; stabilizers, for example, benzyl alcohol or phenol; or anti-oxidants. The prepared injections are typically aliquoted into appropriate ampules.

The administration may be carried out orally or parenterally, and preferably parenterally. Specifically, injection, intranasal administration, intrapulmonary administration, percutaneous administration, or such can be used. Injections include intravenous injections, intramuscular injections, intraperitoneal injections, and subcutaneous injections. The injection solutions can also be systemically or locally administered. The administration methods can be properly selected according to the patient's age, condition, and such. When the compounds can be encoded by DNA, the DNA can be inserted into a vector for gene therapy, and gene therapy can be carried out. The dosage may be, for example, in the range of 0.0001 to 1,000 mg/kg body weight. Alternatively, the dosage may be, for example, in the range of 0.001 to 100,000 mg/person. However, the dosage is not restricted to the values described above. The dosage and administration methods depend on a patient's weight, age, and condition, and can be appropriately selected by those skilled in the art.

BEST MODE FOR CARRYING OUT THE INVENTION

Herein below, the present invention will be specifically described using Examples, however, it is not to be construed as being limited thereto.

EXAMPLE 1

Establishment of a Ba/F3 Cell Line

Figure 1:
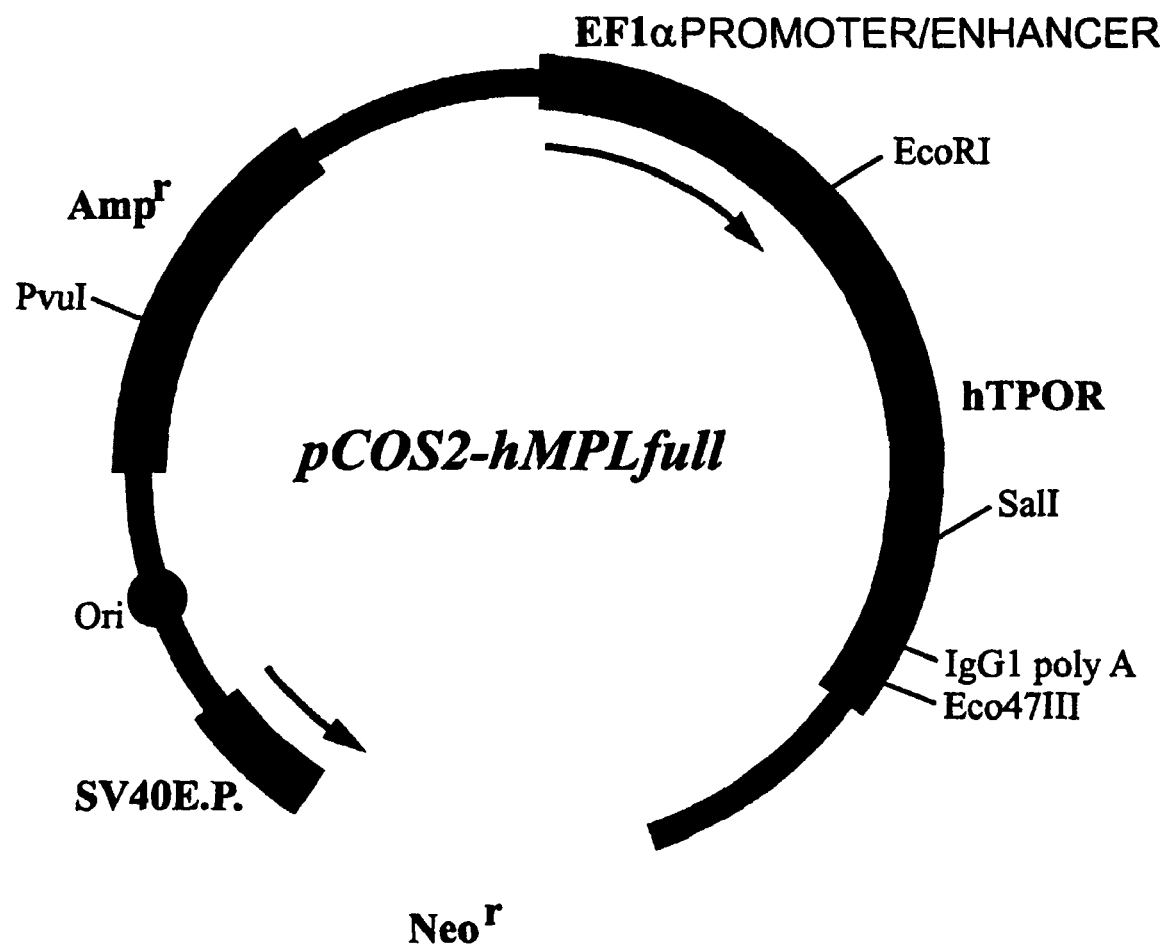
FIG. 1 is a diagram showing the structure of a pCOS2-hMPLfull vector.
Figure 2:
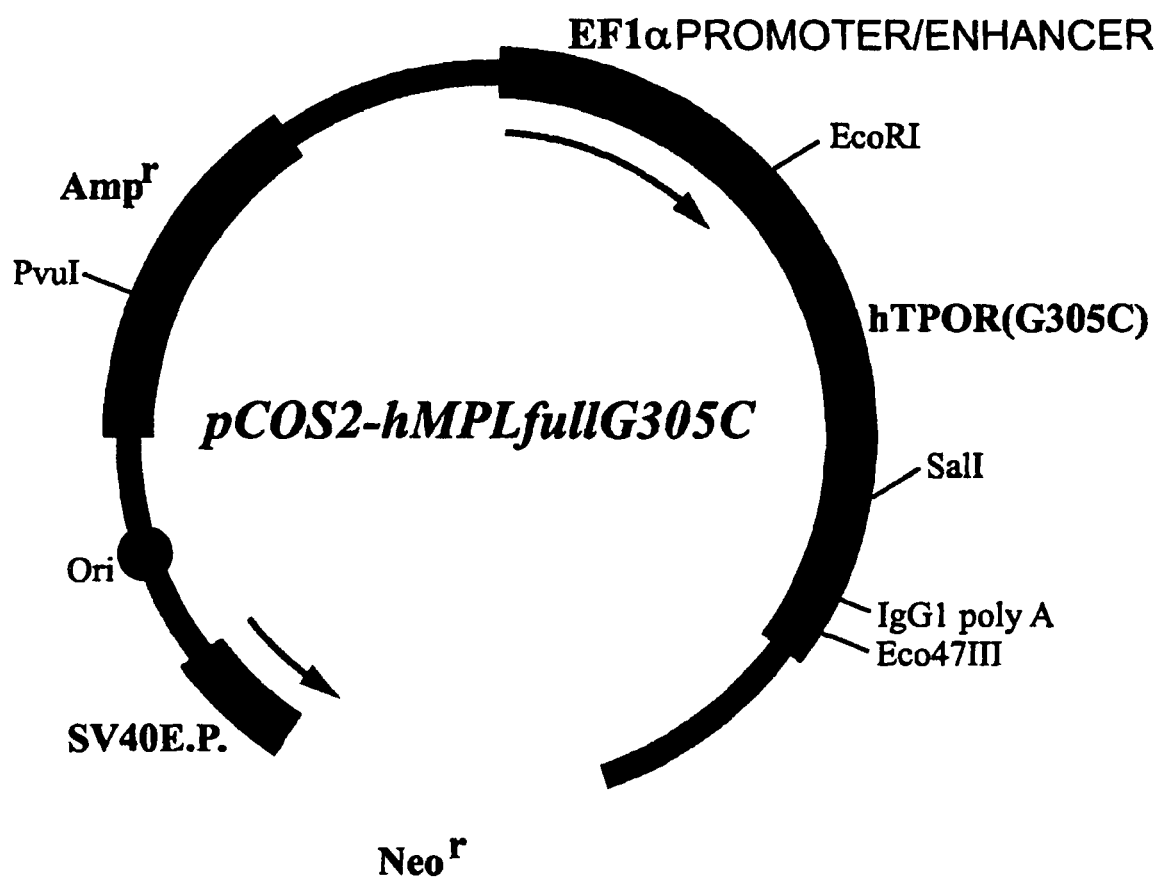
FIG. 2 is a diagram showing the structure of a pCOS2-hMPLfullG305C vector.

Several reports have described CAMT patients carrying the G305C (R102P) mutation in their thrombopoietin receptor gene. In this context, an expression vector for the thrombopoietin receptor gene carrying the G305C (RI 02P) mutation was constructed and introduced into Ba/F3 cells by the method described below. The prepared DNA fragments were: the normal thrombopoietin receptor gene (SEQ ID NO: 1) and the mutant gene in which the C at nucleotide position 305 from the initiation codon has been substituted for G (SEQ ID NO: 3). These DNA fragments were digested with the restriction enzymes EcoRI and SalI, and introduced into the EcoRI-SalI site of the animal cell expression vector pCOS2-Ha to prepare pCOS2-hMPLfull (FIG. 1) and pCOS2-hMPLfullG305C (FIG. 2).

After the plasmids pCOS2-hMPLfull, pCOS2-hMPLfullG305C, and as a negative control pCOS2-Ha were treated with PvuI, 20 μg of each plasmid was transfected into Ba/F3 cells under the conditions described below. The gene was introduced at a cell density of $1\times10^7$ cells/ml in PBS using GENE PULSER II (BIO-RAD) (Gene Pulser Cuvette, 0.4 cm; 0.33 kV; 950 μF). The medium was then changed with RPMI1640 comprising 10% FBS, 1 ng/ml rmIL3 (Pepro tech), 500 μg/ml Geneticin(GIBCO), 100 unit/ml penicillin, and 100 μg/ml streptomycin to select cells. As a result, hMPL-Ba/F3, hMPL(G305C)-Ba/F3, and pCOS2-HA-Ba/F3 cell lines were obtained from the respective vectors described above.

EXAMPLE 2

Preparation of the Extracellular Domain Protein of Thrombopoietin Receptor

Figure 3:
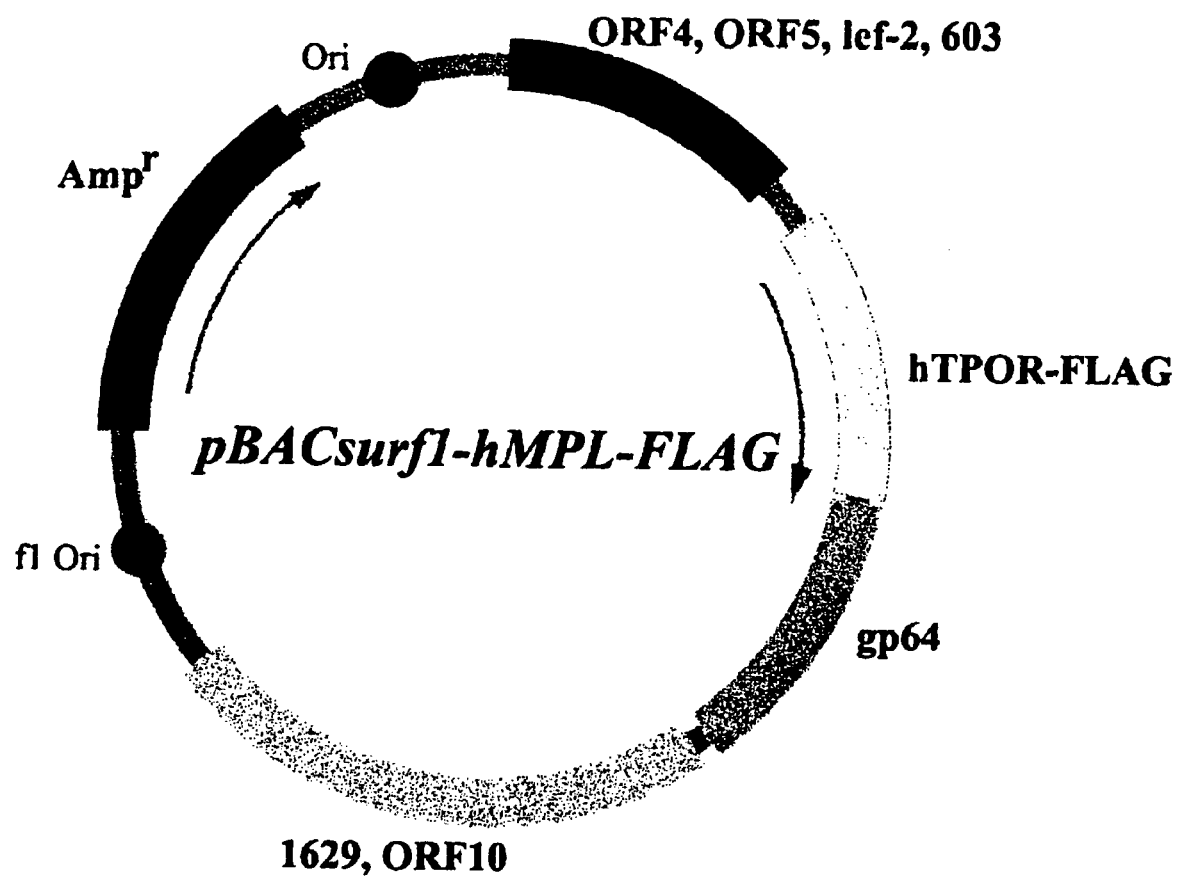
FIG. 3 is a diagram showing the structure of a pBACsurf1-HMPL-FLAG vector.

To prepare the antigen for producing anti-thrombopoietin receptor antibodies, a system for producing and secreting the extracellular domain of human thrombopoietin receptor using the insect cell line Sf9 was constructed as described below. A gene construct comprising FLAG tag placed downstream of the extracellular domain of human thrombopoietin receptor (Gln26-Trp491) was prepared and inserted into the PstI-SmaI site of pBACsurf-1 (Novagen), to construct pBAC-surf1-hMPL-FLAG (FIG. 3). The resulting gene construct (SEQ ID NO: 5) can secrete the extracellular domain of thrombopoietin receptor using a secretory signal sequence derived from baculovirus gp64 protein. 4 μg of the vector was transfected into Sf9 cells using Bac-N-Blue Transfection Kit (Invitrogen), according to the protocol attached to the kit. After three days of culture, the culture supernatants were collected and recombinant viruses were isolated using plaque assays. Stock viral solutions were prepared, and then infected to Sf9 cells. The resulting culture supernatants were collected, and adsorbed to a Q Sepharose Fast Flow column (Pharmacia). The column was eluted with PBS comprising 500 mM NaCl and 0.01% Tween20. The eluate was adsorbed to M2 Affinity Resin (Sigma). The resins were eluted with 100 mM Glycine-HCl (pH 3.5) comprising 0.01% Tween20. Immediately after elution, the eluate was neutralized with 1M Tris-Cl (pH 8.0). The resulting solution was treated by gel filtration chromatography using Superdex 200 26/60 (PBS comprising 0.01% Tween20) to purify the protein.

EXAMPLE 3

Preparation of Anti-thrombopoietin Receptor Diabody

MRL/lpr mice were immunized seven times with the purified protein of the TPOR extracellular domain. The first immunization was carried out using 100 μg of the protein, and subsequent immunizations were each performed using 50 μg of protein. The immunized cells were fused with P3-X63-Ag8-U1 (P3U1) cells by methods commonly used to prepare hybridomas. The hybridomas that produced anti-thrombopoietin receptor antibodies were selected by ELISA assay using the purified protein (VB08B, VB45B, VB033, VB140, and VB157).

Meanwhile, Balb/c mice were immunized a total of 11 times with hMPL-Ba/F3 cells at one-week to five-month intervals. $1.0\times10^7$ cells were intraperitoneally administered to the mice each time. Hybridomas were then prepared by the same method as described above. The hybridomas that produced anti-thrombopoietin receptor antibody were selected (TA136).

The cDNAs for the variable regions of the antibody H and L chains were cloned from each of the hybridomas thus prepared. The cloned cDNAs were sequenced. Based on the nucleotide sequences, genes encoding diabodies were designed with FLAG tag at their C termini (VB08B db, VB45B db, VB033 db, VB140 db, VB157 db, and TA136 db), and inserted into the expression vector pCXND3 for animal cells (pCXND3-VB08B db, pCXND3-VB45B db, pCXND3-VB033 db, pCXND3-VB140 db, pCXND3-VB157 db, pCXND3-TA136 db). Each prepared vector was introduced into COS7 cells, and the culture supernatant was collected after three days of culture. The concentration of diabody in each culture supernatant was determined by BIAcore (Pharmacia) using M2 antibody (Sigma).

EXAMPLE 4

Figure 4:
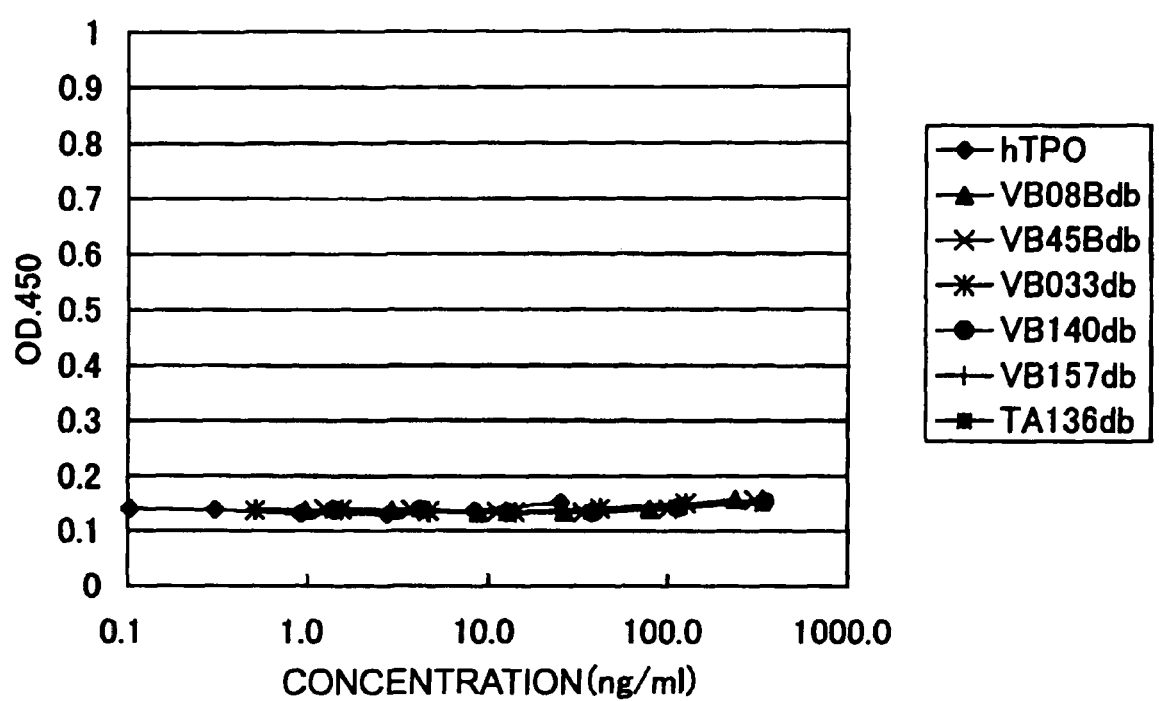
FIG. 4 is a diagram showing the agonistic activity of each of the diabodies and hTPO in pCOS2-HA-Ba/F3. The vertical axis indicates O.D.450/655 nm and the horizontal axis indicates the concentration.
Figure 5:
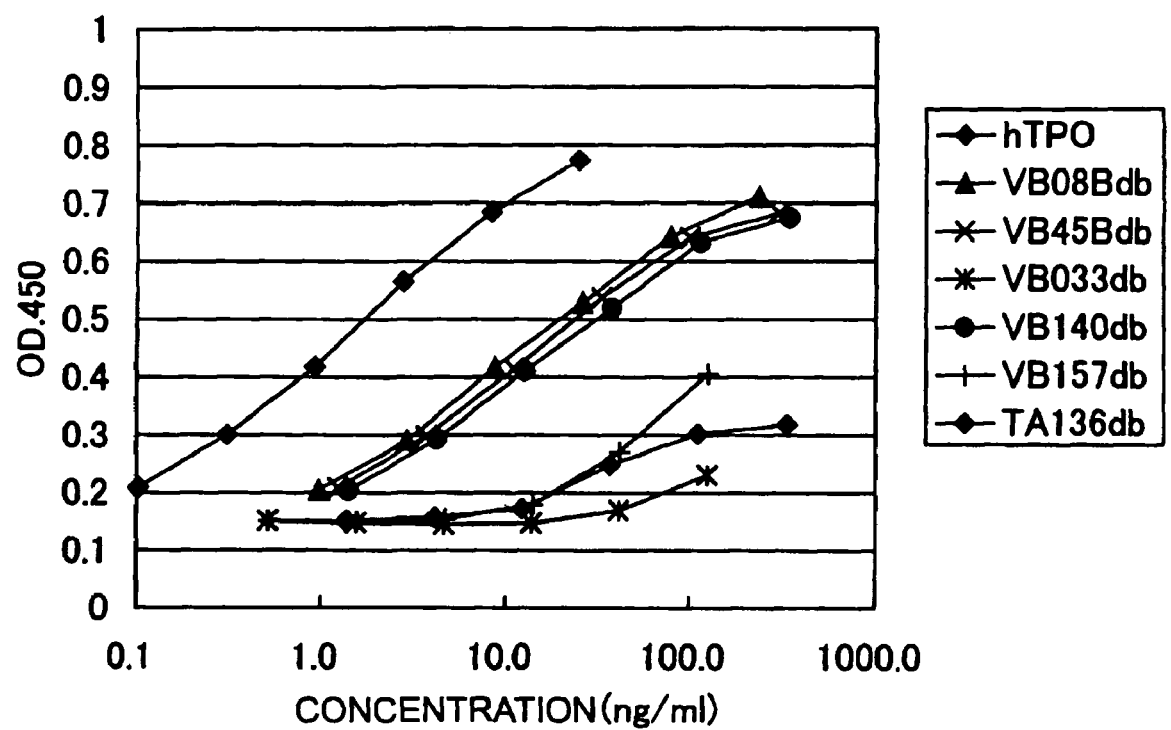
FIG. 5 is a diagram showing the agonistic activity of each of the diabodies and hTPO in hMPL-Ba/F3. The vertical axis indicates O.D.450/655 nm and the horizontal axis indicates the concentration.
Figure 6:
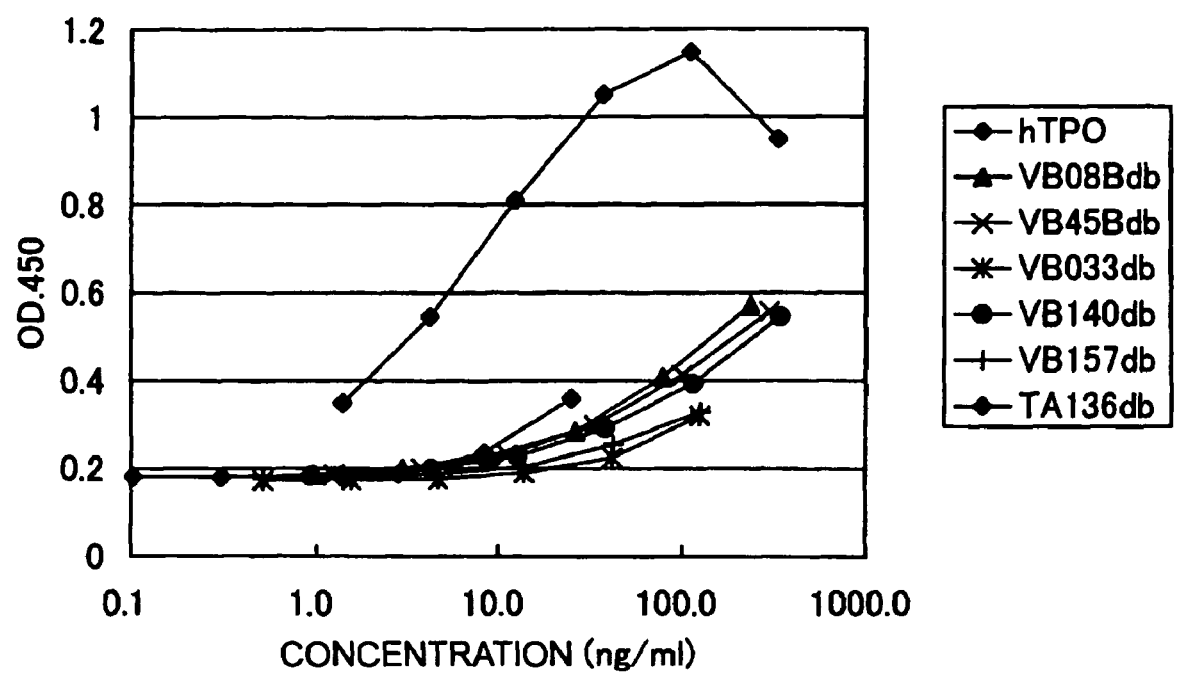
FIG. 6 is a diagram showing the agonistic activity of each of the diabodies and hTPO in hMPL(G305C)-Ba/F3. The vertical axis indicates O.D.450/655 nm and the horizontal axis indicates the concentration.

Assay for Diabody Dependency of Ba/F3 Cell Line pCOS2-HA-Ba/F3 cells, hMPL_Ba/F3 cells, and hMPL (G305C)-Ba/F3 cells were each diluted to $2.0\times10^5$ cells/ml with medium (RPMI1640 comprising 10% FBS, 100 unit/ml penicillin, and 100 µg/ml streptomycin). The cells were aliquoted (60 µl/well) into the wells of 96-well plates. hTPO (R&D) was diluted to a final concentration of 25 µg/ml with CHO-S-SFM II, and then aliquoted into the wells (40 µl/well). Each diabody/COS7 sup (VB08B db, VB45B db, VB033 db, VB140 db, VB 157 db, and TA136 db) was diluted 1, 3, 9, 27, 81, and 243 times using CHO-S-SFM II, and then aliquoted into the wells (40 µl/well). The plates were incubated for 24 hours, and then Cell Count Reagent (nacalai tesque) was added to each well (10 µl/well). The O.D.450/655 nm of each well was measured after two hours of culture. The result showed that the responsiveness of hMPL(G305C)-Ba/F3 cells to hTPO and other agonistic antibodies was markedly decreased. However. TA1 36 db (SEQ ID NO: 7) was found to exhibit strong agonistic activity to hMPL(G305C)-Ba/F3 cells, while it exhibited weak agonistic activity to hMPL_Ba/F3 cells expressing the normal receptor (FIGS. 4 to 6).

In SEQ ID NO: 8, the amino acid sequence from positions 49 to 54 corresponds to heavy chain CDR1; from 69 to 84 corresponds to heavy chain CDR2; from 117 to 123 corresponds to heavy chain CDR3; from 163 to 174 corresponds to light chain CDR1; from 190 to 196 corresponds to light chain CDR2; and from 229 to 237 corresponds to light chain CDR3.

EXAMPLE 5

Establishment of a Ba/F3 Cell Line (2)

Figure 7:
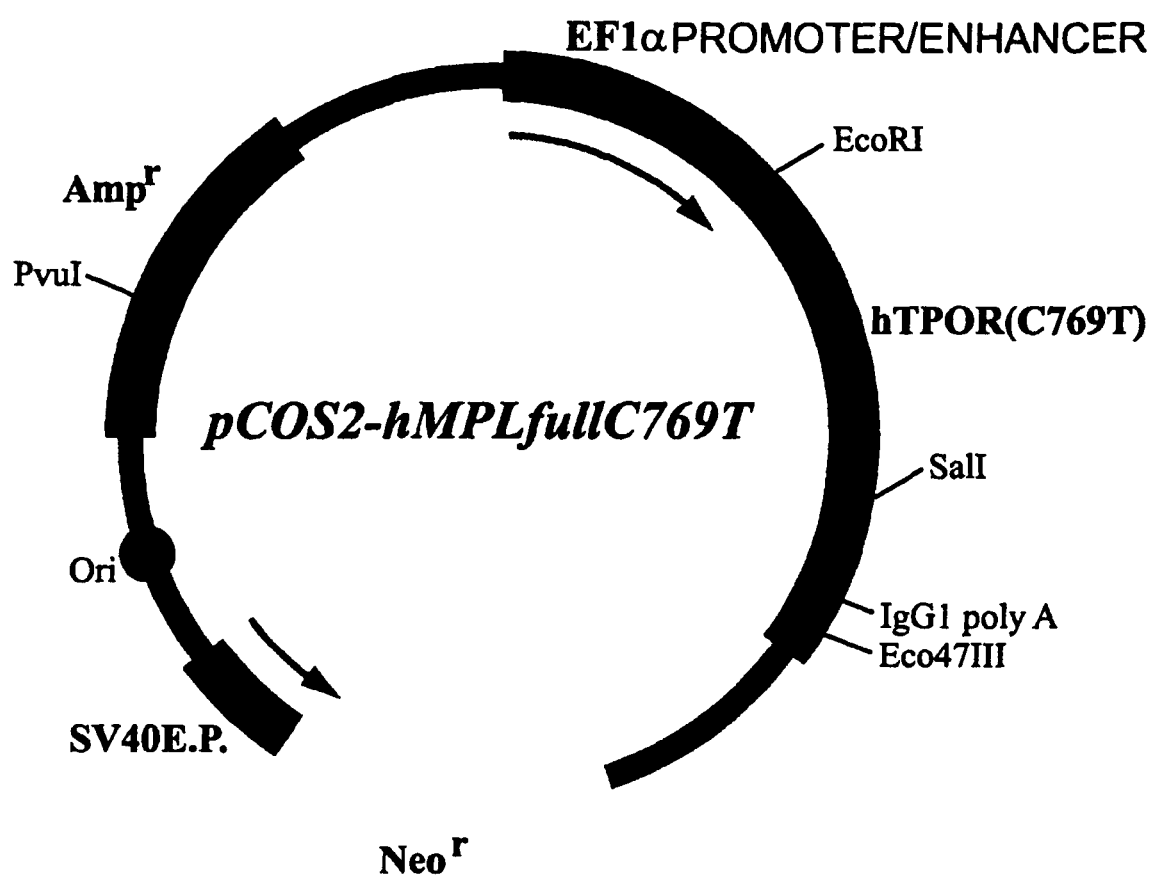
FIG. 7 is a diagram showing the structure of a pCOS2-hMPLfullC769T vector.
Figure 8:
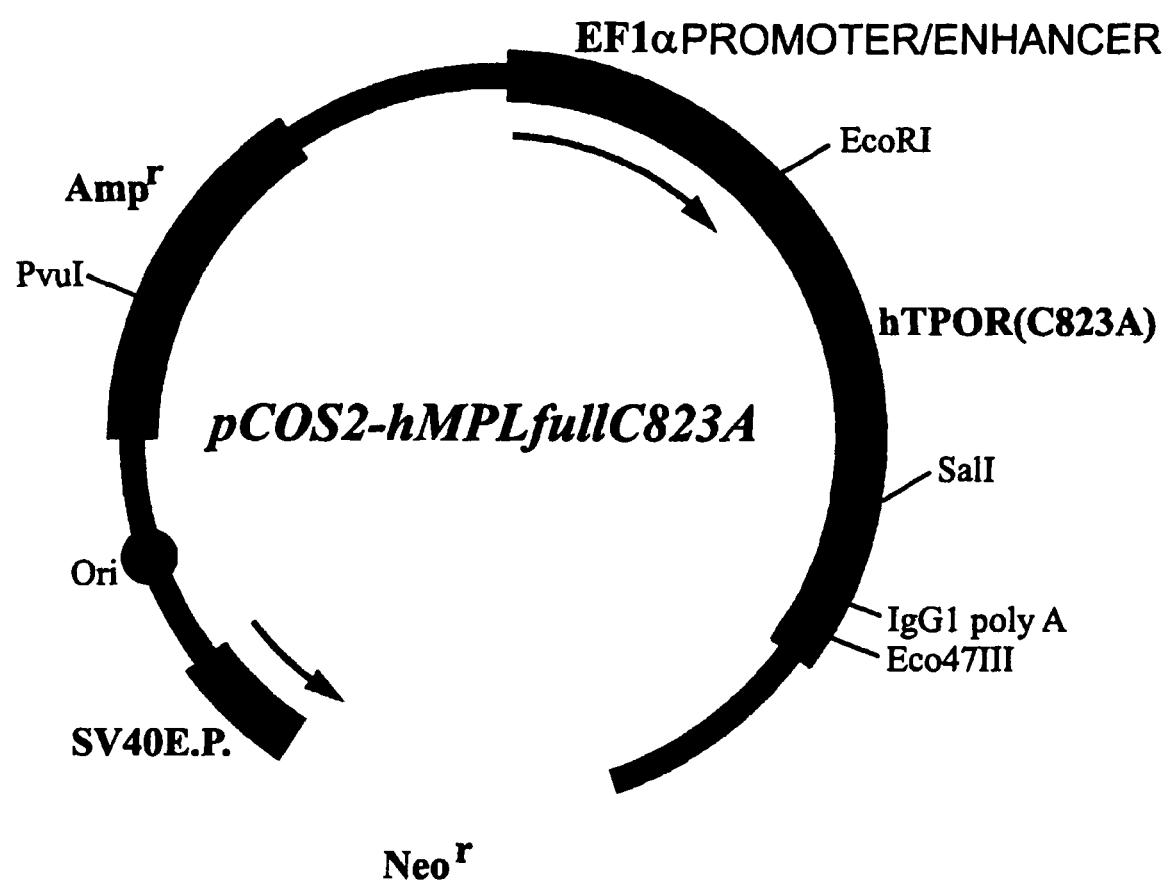
FIG. 8 is a diagram showing the structure of a pCOS2-hMPLfullC823A vector.

As in Example 1, expression vectors were constructed for each of the mutant thrombopoietin receptor genes carrying the C769T (R257C) mutation and the C823A (P275T) mutation, which were found in some CAMT patients. The constructs were introduced into Ba/F3 cells. Nucleotide T was substituted for the nucleotide C at position 769 from the initiation codon in the thrombopoietin receptor gene (SEQ ID NO: 1), to produce the gene of SEQ ID NO: 9; and nucleotide A was substituted for the nucleotide C at position 823, to produce the gene of SEQ ID NO: 11. These DNA fragments were digested with the restriction enzymes EcoRI and SalI, and introduced into the EcoRI-SalI site of the animal cell expression vector pCOS2-Ha to obtain pCOS2-hMPLfullC769T (FIG. 7) and pCOS2-hMPLfullC823A (FIG. 8), respectively.

After treating the plasmids pCOS2-hMPLfullC769T and pCOS2-hMPLfullC823A with PvuI, 20 µg of each of them was transfected into Ba/F3 cells under the conditions described below. The gene transfer was carried out by electroporation at a cell density of 1×10$^7$ cells/ml in PBS using GENE PULSER II (BIO-RAD) (Gene Pulser Cuvette 0.4 cm; 0.33 kV; 950 µF). The medium was then changed to RPMI1640 comprising 10% FBS, 1 ng/ml rmIL3 (Pepro tech), 500 µg/ml Geneticin (GIBCO), 100 units/ml penicillin, and 100 µg/ml streptomycin to select cells. As a result, hMPL (C769T)-Ba/F3 and hMPL(C823A)-Ba/F3 cell lines were respectively obtained from the vectors described above.

EXAMPLE 6

Preparation of Anti-Thrombopoietin Receptor Antibody sc(FV)2

Figure 9:
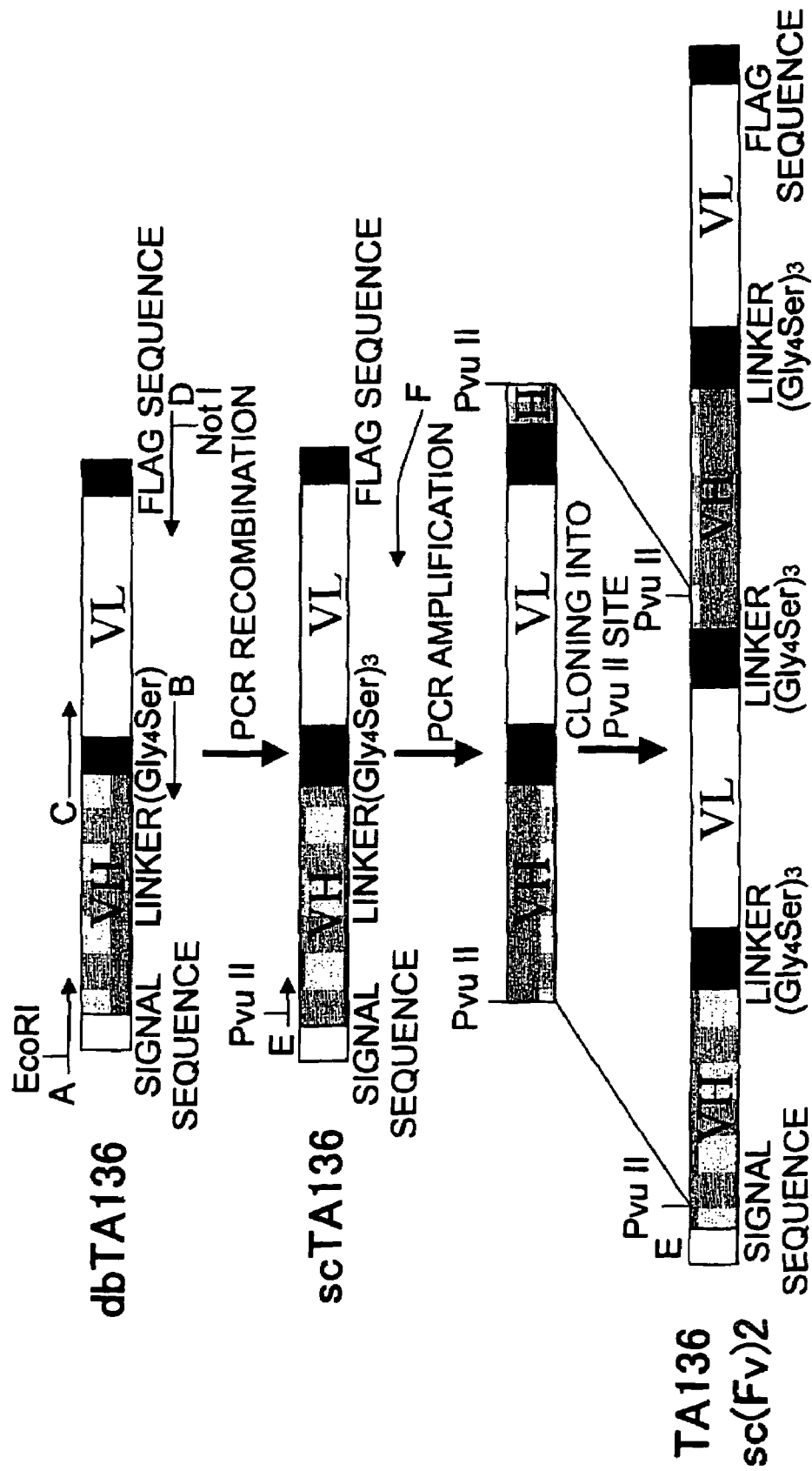
FIG. 9 is diagram showing the construction of a TA136 sc(Fv)2 gene.

TA136 sc(Fv)2 gene was constructed using pCXND3-TA136 db described above by the procedure described below (FIG. 9).

PCR was carried out using a combination of primer A (TAGAATTCCACCATGAGAGTGCTGATTCCTTTGT-GGCTGTTCACAGCCTTTCCTGGTACCCTGTCTGAT-GTGCAGCTGCAGG/SEQ ID NO: 15) and primer B (TGGGTGAGAACAATTTGCGATCCGCCACCACCCG-AACCACCACCACCCGAACCACCACCACCCTGAGGA-GACGGTGACTGAGG/SEQ ID NO: 16); and also a combination of primer C (CAGTCACCGTCTCCTCAGGTG-GTGGTGGTTCGGGTGGTGGTGGTTCGGGTGGTGGC GGATCGCAAATTGTTCTCACCCAGTC/SEQ ID NO: 17) and primer D (ATTGCGGCCGCTTATCACTTATCGTCGT-CATCCTTGTAGTCTTTGATTTCCAGCTTGGTG/SEQ ID NO: 18). The resulting PCR products were combined and used as a template in another PCR using primers A and D. The resulting DNA fragment of about 800 bp was digested using the restriction enzymes EcoRI and NotI, and cloned into pBacPAK9 (CLONTECH) to prepare pBacPAK9-scTA136.

PCR was then carried out using pBacPAK9-scTA136 as a template with primer E (GATGTGCAGCTGCAGGAGTC-GGGAC/SEQ ID NO: 19) and primer F (CCTGCAGCTG-CACATCCGATCCACCGCCTCCCGAACCACCACCAC-CCGATCCACCACCTCCTTTGATTTCCAGCTTGGT-GC/SEQ ID NO: 20). The resulting DNA fragment of approximately 800 bp was cloned into the pGEM-T Easy vector (Promega).

Figure 10:
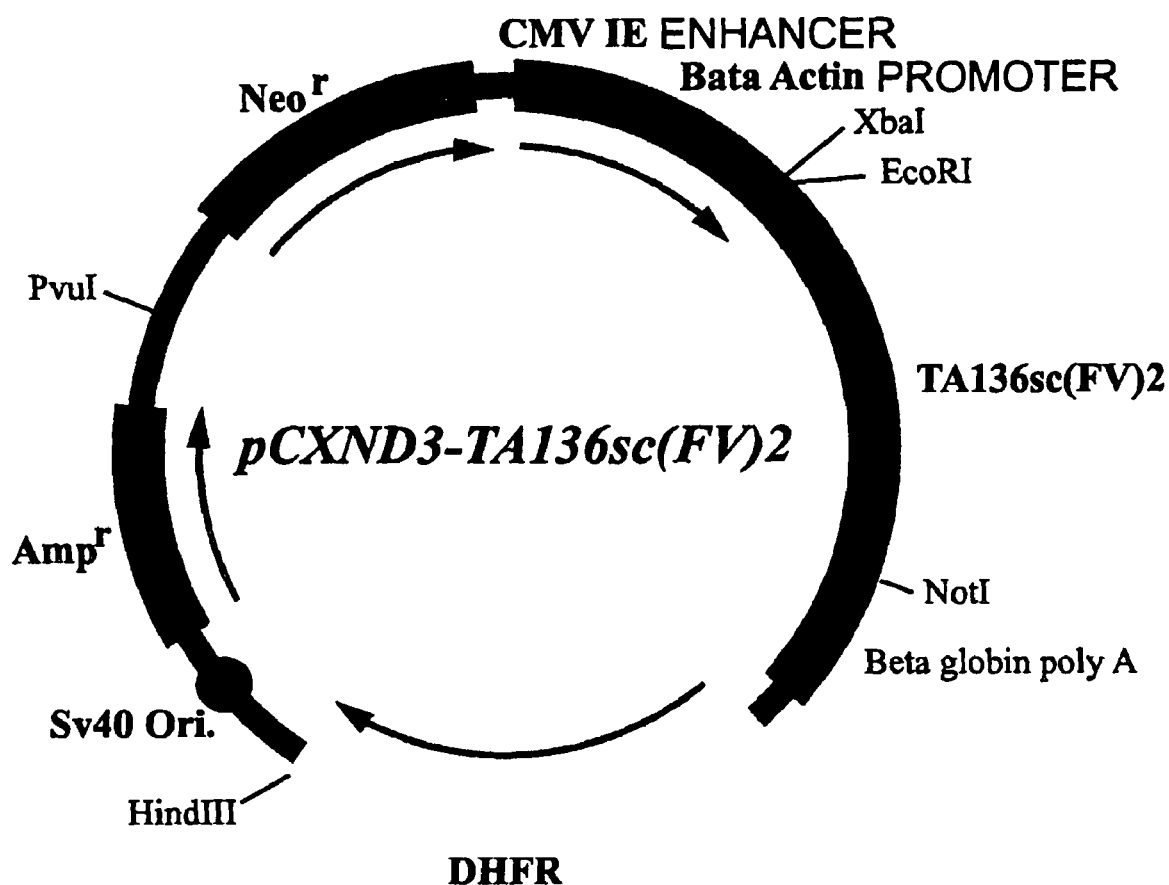
FIG. 10 is a diagram showing the structure of a pCXND3-TA136 sc(Fv)2 vector.

After confirming the nucleotide sequence, the DNA was digested with the restriction enzyme PvuII. The resulting DNA fragment of approximately 800 bp was inserted into the PvuII site of pBacPAK9-scTA136 to prepare pBacPAK9-TA136 sc(Fv)2. The prepared vector was digested with the restriction enzymes EcoRI and NotI. The resulting DNA fragment of approximately 1600 bp was cloned into the expression vector pCXND3 to prepare pCXND3-TA136 sc(Fv)2 (SEQ ID NO: 13; FIG. 10).

EXAMPLE 7

Evaluation of TPO-Like Agonistic Activities of TA1 36 db and TA1 36 sc(Fv)2

The DNA constructs pCXND3-TA136 db and pCXND3-TA136 sc(Fv)2 were introduced into COS7 cells. Their respective culture supernatants were collected after three days of culture. The diabody concentrations in the prepared culture supernatants were determined by BIAcore (Pharmacia) using M2 antibody (Sigma).

hMPL-Ba/F3 cells, hMPL(G305C)-Ba/F3 cells, hMPL (C769T)-Ba/F3 cells, and hMPL(C823A)-Ba/F3 cells were each diluted to 4.0×10$^5$cells/ml using medium (RPMI1640 comprising 10% FBS, 100 unit/ml penicillin, and 100 µg/ml streptomycin). The cells were aliquoted into the wells of 96 well plates (60 µl/well). 40 µl of hTPO (R&D) and the culture supernatant of the COS7 cells described above were added to each well, and the plate was incubated for 24 hours. 10 µl of Cell Count Reagent (Nacalai Tesque) was added to each well. O.D.450/655 nm was determined after incubating the plate for two hours.

Figure 11:
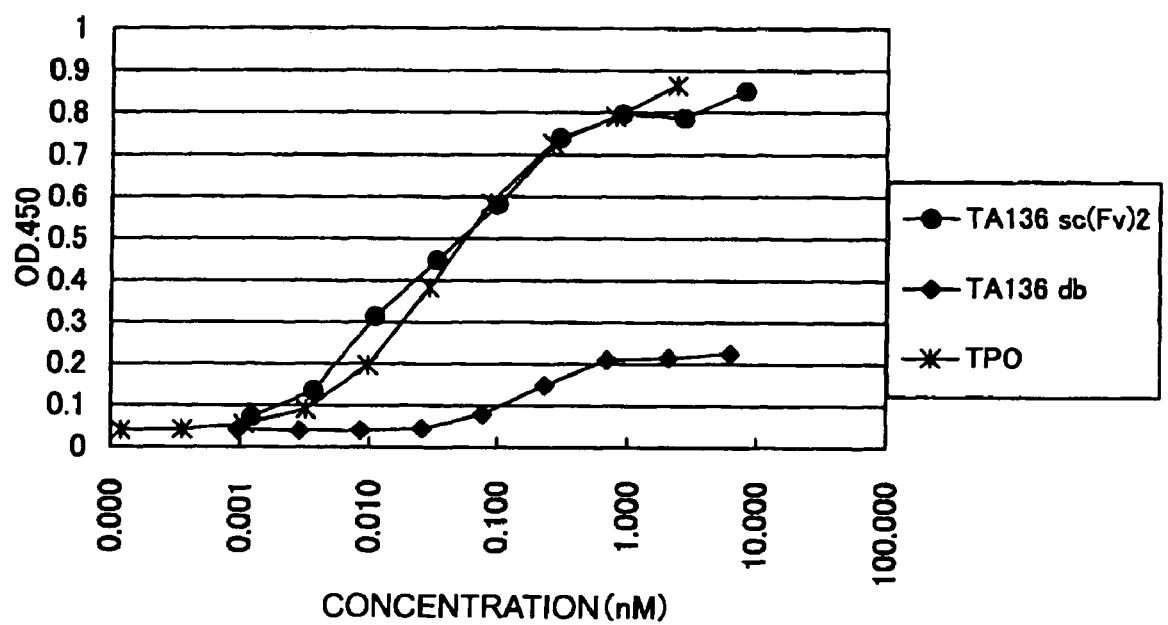
FIG. 11 is a diagram showing the agonistic activity of TA136 db and TA136 sc(Fv)2 in hMPL-Ba/F3 cells. The vertical axis indicates O.D.450/655 nm and the horizontal axis indicates the concentration.
Figure 12:
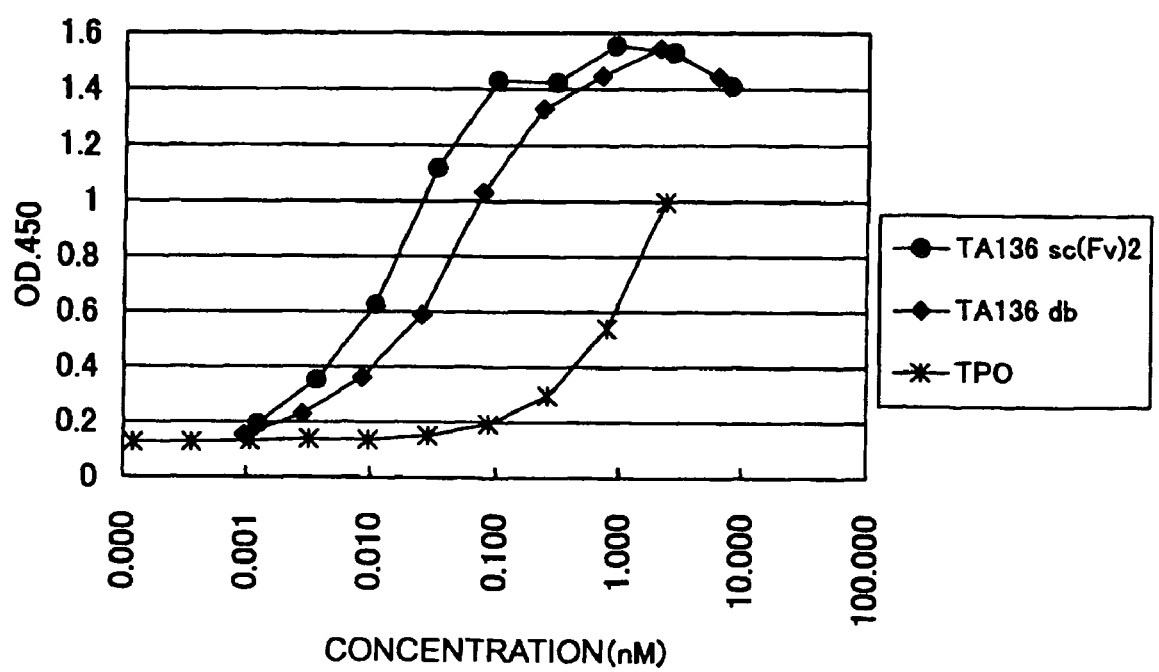
FIG. 12 is a diagram showing the agonistic activity of TA136 db and TA136 sc(Fv)2 in hMPL(G305C)-Ba/F3 cells. The vertical axis indicates O.D.450/655 nm and the horizontal axis indicates the concentration.
Figure 13:
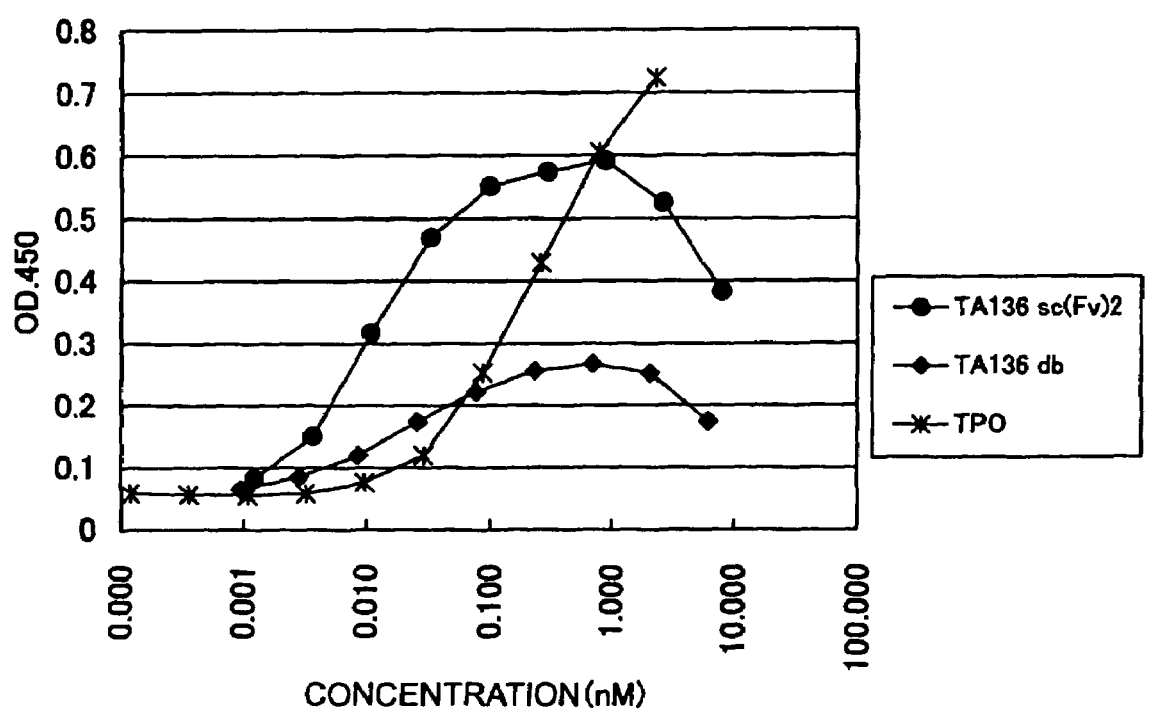
FIG. 13 is a diagram showing the agonistic activity of TA136 db and TA136 sc(Fv)2 in hMPL(C769T)-Ba/F3 cells. The vertical axis indicates O.D.450/655 nm and the horizontal axis indicates the concentration.
Figure 14:
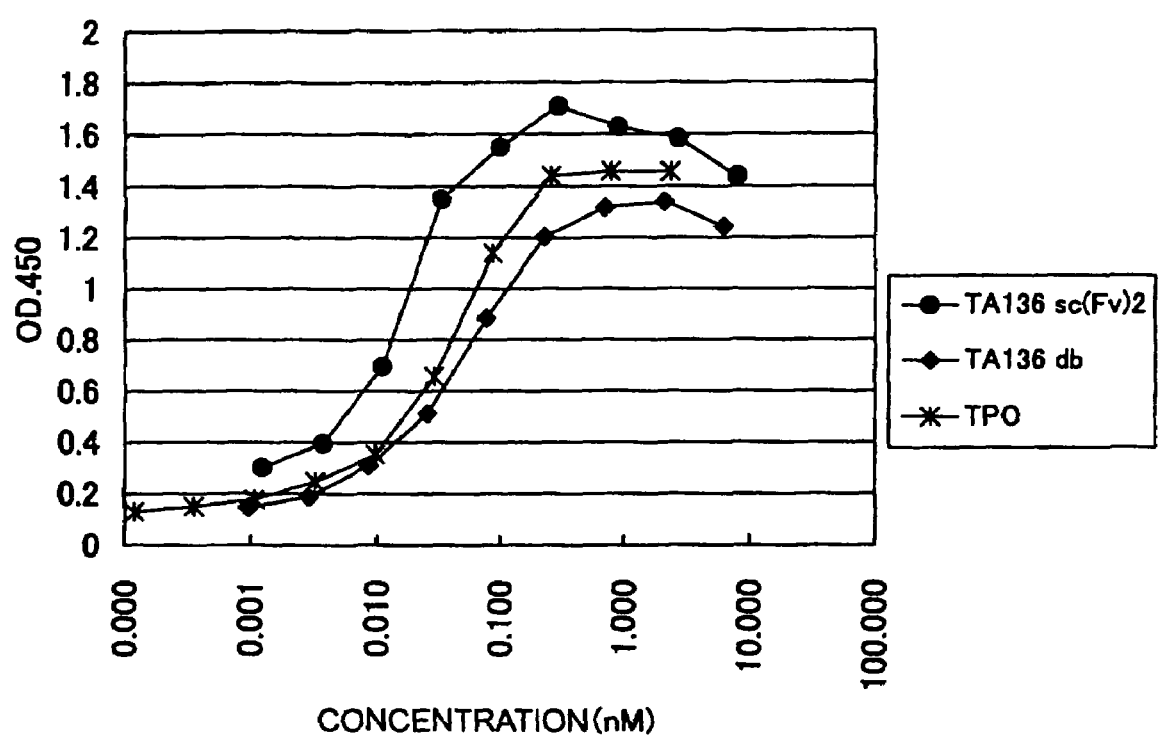
FIG. 14 is a diagram showing the agonistic activity of TA136 db and TA136 sc(Fv)2 in hMPL(C823A)-Ba/F3 cells. The vertical axis indicates O.D.450/655 nm and the horizontal axis indicates the concentration.

The results showed that, in all three mutant thrombopoietin receptor cell lines, TA136 sc(Fv)2 exhibited much stronger agonistic activity than hTPO and TA136 db (FIGS. 12 to 14). Furthermore, TA136 db was found to show agonistic activity comparable to that of the natural ligand hTPO when converted into sc(Fv)2, although in hMPL-Ba/F3 cells expressing normal thrombopoietin receptor, TA136 db exhibited weaker activity than that of hTPO (FIG. 11).

INDUSTRIAL APPLICABILITY

The present invention provides ligands (antibodies) to treat patients with diseases caused by mutant receptors, for example, CAMT; polynucleotides encoding these antibodies; vectors comprising the polynucleotides; host cells comprising the vectors; and methods for producing the antibodies. In addition, the present invention also provides methods for gene therapy using polynucleotides that encode the antibodies. The methods of the present invention provide methods for treating various genetic diseases caused by mutations in genes that encode cell membrane proteins. Henceforth, individualized genetic diagnosis is likely to become widely available for patients. The antibody engineering techniques of the present invention enable the development of pharmaceutical agents matched to individual genotypes.

The invention claimed is:

1. A minibody that acts as an agonist of a mutant human thrombopoietin receptor, the minibody comprising two or more antibody heavy chain variable regions (VH) and two or more antibody light chain variable regions (VL), each variable region being linked to at least one other variable region via a linker, wherein the minibody is a stronger agonist of the mutant receptor than is thrombopoietin, and wherein the mutant receptor includes at least one of the mutations R102P, R257C, and P275T in SEQ ID NO:2.

2. The minibody of claim 1, wherein the mutant human thrombopoietin receptor has less responsiveness to thrombopoietin than does the non-mutated thrombopoietin receptor.

3. The minibody of claim 1, wherein the mutant human thrombopoietin receptor causes a disease.

4. The minibody of claim 1, wherein the minibody is a diabody.

5. The minibody of claim 1, wherein the minibody is a sc(Fv)2.

6. The minibody of claim 1, wherein each variable region is linked to at least one other variable region via a peptide linker.

7. A pharmaceutical composition for treatment of a disease caused by a mutant human thrombopoietin receptor the composition comprising:
(a) a minibody that comprises two or more antibody heavy chain variable regions (VH) and two or more antibody light chain variable regions (VL), each variable region being linked to at least one other variable region via a linker, wherein the minibody is a stronger agonist of the mutant receptor than is thrombopoietin, and wherein the mutant receptor includes at least one of the mutations R102P, R257C, and P275T in SEQ ID NO:2; and
(b) a pharmaceutically acceptable carrier.

8. The pharmaceutical composition of claim 7, where the mutant human thrombopoietin receptor has less responsiveness to thrombopoietin than does the non-mutated thrombopoietin receptor.

9. The pharmaceutical composition of claim 7, wherein the disease is congenital amegakaryocytic thrombocytopenia.

10. The pharmaceutical composition of claim 7, wherein the minibody is a diabody.

11. The pharmaceutical composition of claim 7, wherein the minibody is a sc(Fv)2.

12. The pharmaceutical composition of claim 7, wherein each variable region is linked to at least one other variable region via a peptide linker.

13. An in vitro method comprising contacting the minibody of claim 1 with a cell expressing a mutant thrombopoietin receptor such that the minibody binds to and activates the mutant thrombopoietin receptor expressed on the cell.

14. The method of claim 13, wherein the minibody is human or humanized.

15. The method of claim 13, wherein the minibody is a diabody.

16. The method of claim 13, wherein the minibody is a sc(Fv)2.

17. The method of claim 16, wherein the sc(Fv)2 is human or humanized.

18. The method of claim 13, wherein each variable region of the minibody is linked to at least one other variable region via a peptide linker.

19. The method of claim 13, wherein the mutant thrombopoietin receptor expressed on the cell contains one or more of the mutations R102P, R257C, and P275T in SEQ ID NO:2.

20. The minibody of claim 1, wherein the mutant thrombopoietin receptor comprises the R102P mutation.

21. The minibody of claim 1, wherein the mutant thrombopoietin receptor comprises the R257C mutation.

22. The minibody of claim 1, wherein the mutant thrombopoietin receptor comprises the P275T mutation.

23. The minibody of claim 1, wherein the minibody is human or humanized.

24. The minibody of claim 4, wherein the minibody is human or humanized.

25. The minibody of claim 5, wherein the minibody is human or humanized.

26. The pharmaceutical composition of claim 7, wherein the minibody is human or humanized.

* * * * *

SEQUENCE LISTING

```
<160> NUMBER OF SEQ ID NOS: 20

<210> SEQ ID NO 1
<211> LENGTH: 1924
<212> TYPE: DNA
<213> ORGANISM: Homo sapiens
<220> FEATURE:
<221> NAME/KEY: CDS
<222> LOCATION: (11)..(1918)

<400> SEQUENCE: 1
gaattccacc atg ccc tcc tgg gcc ctc ttc atg gtc acc tcc tgc ctc         49
            Met Pro Ser Trp Ala Leu Phe Met Val Thr Ser Cys Leu
              1               5                  10 ctc ctg gcc cct caa aac ctg gcc caa gtc agc agc caa gat gtc tcc         97
Leu Leu Ala Pro Gln Asn Leu Ala Gln Val Ser Ser Gln Asp Val Ser
 15                  20                  25 ttg ctg gca tca gac tca gag ccc ctg aag tgt ttc tcc cga aca ttt        145
Leu Leu Ala Ser Asp Ser Glu Pro Leu Lys Cys Phe Ser Arg Thr Phe
 30                  35                  40                  45 gag gac ctc act tgc ttc tgg gat gag gaa gag gca gcg ccc agt ggg        193
Glu Asp Leu Thr Cys Phe Trp Asp Glu Glu Glu Ala Ala Pro Ser Gly
                     50                  55                  60 aca tac cag ctg ctg tat gcc tac ccg cgg gag aag ccc cgt gct tgc        241
Thr Tyr Gln Leu Leu Tyr Ala Tyr Pro Arg Glu Lys Pro Arg Ala Cys
                 65                  70                  75 ccc ctg agt tcc cag agc atg ccc cac ttt gga acc cga tac gtg tgc        289
Pro Leu Ser Ser Gln Ser Met Pro His Phe Gly Thr Arg Tyr Val Cys
             80                  85                  90 cag ttt cca gac cag gag gaa gtg cgt ctc ttc ttt ccg ctg cac ctc        337
Gln Phe Pro Asp Gln Glu Glu Val Arg Leu Phe Phe Pro Leu His Leu
         95                 100                 105 tgg gtg aag aat gtg ttc cta aac cag act cgg act cag cga gtc ctc        385
Trp Val Lys Asn Val Phe Leu Asn Gln Thr Arg Thr Gln Arg Val Leu
110                 115                 120                 125 ttt gtg gac agt gta ggc ctg ccg gct ccc ccc agt atc atc aag gcc        433
Phe Val Asp Ser Val Gly Leu Pro Ala Pro Pro Ser Ile Ile Lys Ala
                    130                 135                 140 atg ggt ggg agc cag cca ggg gaa ctt cag atc agc tgg gag gag cca        481
Met Gly Gly Ser Gln Pro Gly Glu Leu Gln Ile Ser Trp Glu Glu Pro
                145                 150                 155 gct cca gaa atc agt gat ttc ctg agg tac gaa ctc cgc tat ggc ccc        529
Ala Pro Glu Ile Ser Asp Phe Leu Arg Tyr Glu Leu Arg Tyr Gly Pro
            160                 165                 170 aga gat ccc aag aac tcc act ggt ccc acg gtc ata cag ctg att gcc        577
Arg Asp Pro Lys Asn Ser Thr Gly Pro Thr Val Ile Gln Leu Ile Ala
        175                 180                 185 aca gaa acc tgc tgc cct gct ctg cag aga cct cac tca gcc tct gct        625
Thr Glu Thr Cys Cys Pro Ala Leu Gln Arg Pro His Ser Ala Ser Ala
190                 195                 200                 205 ctg gac cag tct cca tgt gct cag ccc aca atg ccc tgg caa gat gga        673
Leu Asp Gln Ser Pro Cys Ala Gln Pro Thr Met Pro Trp Gln Asp Gly
                    210                 215                 220
```

-continued

| | |
|---|---|
| cca aag cag acc tcc cca agt aga gaa gct tca gct ctg aca gca gag<br>Pro Lys Gln Thr Ser Pro Ser Arg Glu Ala Ser Ala Leu Thr Ala Glu<br>               225                      230                      235 | 721 |
| ggt gga agc tgc ctc atc tca gga ctc cag cct ggc aac tcc tac tgg<br>Gly Gly Ser Cys Leu Ile Ser Gly Leu Gln Pro Gly Asn Ser Tyr Trp<br>         240                      245                      250 | 769 |
| ctg cag ctg cgc agc gaa cct gat ggg atc tcc ctc ggt ggc tcc tgg<br>Leu Gln Leu Arg Ser Glu Pro Asp Gly Ile Ser Leu Gly Gly Ser Trp<br>255                      260                      265 | 817 |
| gga tcc tgg tcc ctc cct gtg act gtg gac ctg cct gga gat gca gtg<br>Gly Ser Trp Ser Leu Pro Val Thr Val Asp Leu Pro Gly Asp Ala Val<br>270                      275                      280                      285 | 865 |
| gca ctt gga ctg caa tgc ttt acc ttg gac ctg aag aat gtt acc tgt<br>Ala Leu Gly Leu Gln Cys Phe Thr Leu Asp Leu Lys Asn Val Thr Cys<br>               290                      295                      300 | 913 |
| caa tgg cag caa cag gac cat gct agc tcc caa ggc ttc ttc tac cac<br>Gln Trp Gln Gln Gln Asp His Ala Ser Ser Gln Gly Phe Phe Tyr His<br>               305                      310                      315 | 961 |
| agc agg gca cgg tgc tgc ccc aga gac agg tac ccc atc tgg gag aac<br>Ser Arg Ala Arg Cys Cys Pro Arg Asp Arg Tyr Pro Ile Trp Glu Asn<br>         320                      325                      330 | 1009 |
| tgc gaa gag gaa gag aaa aca aat cca gga cta cag acc cca cag ttc<br>Cys Glu Glu Glu Glu Lys Thr Asn Pro Gly Leu Gln Thr Pro Gln Phe<br>335                      340                      345 | 1057 |
| tct cgc tgc cac ttc aag tca cga aat gac agc att att cac atc ctt<br>Ser Arg Cys His Phe Lys Ser Arg Asn Asp Ser Ile Ile His Ile Leu<br>350                      355                      360                      365 | 1105 |
| gtg gag gtg acc aca gcc ccg ggt act gtt cac agc tac ctg ggc tcc<br>Val Glu Val Thr Thr Ala Pro Gly Thr Val His Ser Tyr Leu Gly Ser<br>               370                      375                      380 | 1153 |
| cct ttc tgg atc cac cag gct gtg cgc ctc ccc acc cca aac ttg cac<br>Pro Phe Trp Ile His Gln Ala Val Arg Leu Pro Thr Pro Asn Leu His<br>         385                      390                      395 | 1201 |
| tgg agg gag atc tcc agt ggg cat ctg gaa ttg gag tgg cag cac cca<br>Trp Arg Glu Ile Ser Ser Gly His Leu Glu Leu Glu Trp Gln His Pro<br>400                      405                      410 | 1249 |
| tcg tcc tgg gca gcc caa gag acc tgt tat caa ctc cga tac aca gga<br>Ser Ser Trp Ala Ala Gln Glu Thr Cys Tyr Gln Leu Arg Tyr Thr Gly<br>               415                      420                      425 | 1297 |
| gaa ggc cat cag gac tgg aag gtg ctg gag ccg cct ctc ggg gcc cga<br>Glu Gly His Gln Asp Trp Lys Val Leu Glu Pro Pro Leu Gly Ala Arg<br>430                      435                      440                      445 | 1345 |
| gga ggg acc ctg gag ctg cgc ccg cga tct cgc tac cgt tta cag ctg<br>Gly Gly Thr Leu Glu Leu Arg Pro Arg Ser Arg Tyr Arg Leu Gln Leu<br>               450                      455                      460 | 1393 |
| cgc gcc agg ctc aac ggc ccc acc tac caa ggt ccc tgg agc tcg tgg<br>Arg Ala Arg Leu Asn Gly Pro Thr Tyr Gln Gly Pro Trp Ser Ser Trp<br>         465                      470                      475 | 1441 |
| tcg gac cca act agg gtg gag acc gcc acc gag acc gcc tgg atc tcc<br>Ser Asp Pro Thr Arg Val Glu Thr Ala Thr Glu Thr Ala Trp Ile Ser<br>               480                      485                      490 | 1489 |
| ttg gtg acc gct ctg cat cta gtg ctg ggc ctc agc gcc gtc ctg ggc<br>Leu Val Thr Ala Leu His Leu Val Leu Gly Leu Ser Ala Val Leu Gly<br>         495                      500                      505 | 1537 |
| ctg ctg ctg ctg agg tgg cag ttt cct gca cac tac agg aga ctg agg<br>Leu Leu Leu Leu Arg Trp Gln Phe Pro Ala His Tyr Arg Arg Leu Arg<br>510                      515                      520                      525 | 1585 |
| cat gcc ctg tgg ccc tca ctt cca gac ctg cac cgg gtc cta ggc cag<br>His Ala Leu Trp Pro Ser Leu Pro Asp Leu His Arg Val Leu Gly Gln<br>               530                      535                      540 | 1633 |

-continued

```
tac ctt agg gac act gca gcc ctg agc ccg ccc aag gcc aca gtc tca    1681
Tyr Leu Arg Asp Thr Ala Ala Leu Ser Pro Pro Lys Ala Thr Val Ser
            545                 550                 555 gat acc tgt gaa gaa gtg gaa ccc agc ctc ctt gaa atc ctc ccc aag    1729
Asp Thr Cys Glu Glu Val Glu Pro Ser Leu Leu Glu Ile Leu Pro Lys
        560                 565                 570 tcc tca gag agg act cct ttg ccc ctg tgt tcc cag gcc cag atg        1777
Ser Ser Glu Arg Thr Pro Leu Pro Leu Cys Ser Ser Gln Ala Gln Met
    575                 580                 585 gac tac cga aga ttg cag cct tct tgc ctg ggg acc atg ccc ctg tct    1825
Asp Tyr Arg Arg Leu Gln Pro Ser Cys Leu Gly Thr Met Pro Leu Ser
590                 595                 600                 605 gtg tgc cca ccc atg gct gag tca ggg tcc tgc tgt acc acc cac att    1873
Val Cys Pro Pro Met Ala Glu Ser Gly Ser Cys Cys Thr Thr His Ile
                610                 615                 620 gcc aac cat tcc tac cta cca cta agc tat tgg cag cag cct tga        1918
Ala Asn His Ser Tyr Leu Pro Leu Ser Tyr Trp Gln Gln Pro
                625                 630                 635 gtcgac                                                              1924

<210> SEQ ID NO 2
<211> LENGTH: 635
<212> TYPE: PRT
<213> ORGANISM: Homo sapiens

<400> SEQUENCE: 2

Met Pro Ser Trp Ala Leu Phe Met Val Thr Ser Cys Leu Leu Leu Ala
1               5                   10                  15

Pro Gln Asn Leu Ala Gln Val Ser Ser Gln Asp Val Ser Leu Leu Ala
            20                  25                  30

Ser Asp Ser Glu Pro Leu Lys Cys Phe Ser Arg Thr Phe Glu Asp Leu
        35                  40                  45

Thr Cys Phe Trp Asp Glu Glu Ala Ala Pro Ser Gly Thr Tyr Gln
    50                  55                  60

Leu Leu Tyr Ala Tyr Pro Arg Glu Lys Pro Arg Ala Cys Pro Leu Ser
65                  70                  75                  80

Ser Gln Ser Met Pro His Phe Gly Thr Arg Tyr Val Cys Gln Phe Pro
                85                  90                  95

Asp Gln Glu Glu Val Arg Leu Phe Phe Pro Leu His Leu Trp Val Lys
            100                 105                 110

Asn Val Phe Leu Asn Gln Thr Arg Thr Gln Arg Val Leu Phe Val Asp
        115                 120                 125

Ser Val Gly Leu Pro Ala Pro Pro Ser Ile Ile Lys Ala Met Gly Gly
    130                 135                 140

Ser Gln Pro Gly Glu Leu Gln Ile Ser Trp Glu Pro Ala Pro Glu
145                 150                 155                 160

Ile Ser Asp Phe Leu Arg Tyr Glu Leu Arg Tyr Gly Pro Arg Asp Pro
                165                 170                 175

Lys Asn Ser Thr Gly Pro Thr Val Ile Gln Leu Ile Ala Thr Glu Thr
            180                 185                 190

Cys Cys Pro Ala Leu Gln Arg Pro His Ser Ala Ser Ala Leu Asp Gln
        195                 200                 205

Ser Pro Cys Ala Gln Pro Thr Met Pro Trp Gln Asp Gly Pro Lys Gln
    210                 215                 220

Thr Ser Pro Ser Arg Glu Ala Ser Ala Leu Thr Ala Glu Gly Gly Ser
225                 230                 235                 240
```

```
Cys Leu Ile Ser Gly Leu Gln Pro Gly Asn Ser Tyr Trp Leu Gln Leu
            245                 250                 255

Arg Ser Glu Pro Asp Gly Ile Ser Leu Gly Gly Ser Trp Gly Ser Trp
            260                 265                 270

Ser Leu Pro Val Thr Val Asp Leu Pro Gly Asp Ala Val Ala Leu Gly
            275                 280                 285

Leu Gln Cys Phe Thr Leu Asp Leu Lys Asn Val Thr Cys Gln Trp Gln
            290                 295                 300

Gln Gln Asp His Ala Ser Ser Gln Gly Phe Phe Tyr His Ser Arg Ala
305                 310                 315                 320

Arg Cys Cys Pro Arg Asp Arg Tyr Pro Ile Trp Glu Asn Cys Glu Glu
                325                 330                 335

Glu Glu Lys Thr Asn Pro Gly Leu Gln Thr Pro Gln Phe Ser Arg Cys
            340                 345                 350

His Phe Lys Ser Arg Asn Asp Ser Ile Ile His Ile Leu Val Glu Val
                355                 360                 365

Thr Thr Ala Pro Gly Thr Val His Ser Tyr Leu Gly Ser Pro Phe Trp
370                 375                 380

Ile His Gln Ala Val Arg Leu Pro Thr Pro Asn Leu His Trp Arg Glu
385                 390                 395                 400

Ile Ser Ser Gly His Leu Glu Leu Glu Trp Gln His Pro Ser Ser Trp
                405                 410                 415

Ala Ala Gln Glu Thr Cys Tyr Gln Leu Arg Tyr Thr Gly Glu Gly His
                420                 425                 430

Gln Asp Trp Lys Val Leu Glu Pro Pro Leu Gly Ala Arg Gly Gly Thr
            435                 440                 445

Leu Glu Leu Arg Pro Arg Ser Arg Tyr Arg Leu Gln Leu Arg Ala Arg
            450                 455                 460

Leu Asn Gly Pro Thr Tyr Gln Gly Pro Trp Ser Ser Trp Ser Asp Pro
465                 470                 475                 480

Thr Arg Val Glu Thr Ala Thr Glu Thr Ala Trp Ile Ser Leu Val Thr
                485                 490                 495

Ala Leu His Leu Val Leu Gly Leu Ser Ala Val Leu Gly Leu Leu Leu
                500                 505                 510

Leu Arg Trp Gln Phe Pro Ala His Tyr Arg Arg Leu Arg His Ala Leu
            515                 520                 525

Trp Pro Ser Leu Pro Asp Leu His Arg Val Leu Gly Gln Tyr Leu Arg
            530                 535                 540

Asp Thr Ala Ala Leu Ser Pro Pro Lys Ala Thr Val Ser Asp Thr Cys
545                 550                 555                 560

Glu Glu Val Glu Pro Ser Leu Leu Glu Ile Leu Pro Lys Ser Ser Glu
                565                 570                 575

Arg Thr Pro Leu Pro Leu Cys Ser Ser Gln Ala Gln Met Asp Tyr Arg
                580                 585                 590

Arg Leu Gln Pro Ser Cys Leu Gly Thr Met Pro Leu Ser Val Cys Pro
            595                 600                 605

Pro Met Ala Glu Ser Gly Ser Cys Cys Thr Thr His Ile Ala Asn His
            610                 615                 620

Ser Tyr Leu Pro Leu Ser Tyr Trp Gln Gln Pro
625                 630                 635
```

<210> SEQ ID NO 3
<211> LENGTH: 1924
<212> TYPE: DNA
<213> ORGANISM: Homo sapiens
<220> FEATURE:
<221> NAME/KEY: CDS
<222> LOCATION: (11)..(1918)

<400> SEQUENCE: 3

```
gaattccacc atg ccc tcc tgg gcc ctc ttc atg gtc acc tcc tgc ctc         49
           Met Pro Ser Trp Ala Leu Phe Met Val Thr Ser Cys Leu
           1               5                   10 ctc ctg gcc cct caa aac ctg gcc caa gtc agc agc caa gat gtc tcc         97
Leu Leu Ala Pro Gln Asn Leu Ala Gln Val Ser Ser Gln Asp Val Ser
    15                  20                  25 ttg ctg gca tca gac tca gag ccc ctg aag tgt ttc tcc cga aca ttt        145
Leu Leu Ala Ser Asp Ser Glu Pro Leu Lys Cys Phe Ser Arg Thr Phe
30                  35                  40                  45 gag gac ctc act tgc ttc tgg gat gag gaa gag gca gcg ccc agt ggg        193
Glu Asp Leu Thr Cys Phe Trp Asp Glu Glu Glu Ala Ala Pro Ser Gly
                50                  55                  60 aca tac cag ctg ctg tat gcc tac ccg cgg gag aag ccc cgt gct tgc        241
Thr Tyr Gln Leu Leu Tyr Ala Tyr Pro Arg Glu Lys Pro Arg Ala Cys
            65                  70                  75 ccc ctg agt tcc cag agc atg ccc cac ttt gga acc cga tac gtg tgc        289
Pro Leu Ser Ser Gln Ser Met Pro His Phe Gly Thr Arg Tyr Val Cys
        80                  85                  90 cag ttt cca gac cag gag gaa gtg cct ctc ttc ttt ccg ctg cac ctc        337
Gln Phe Pro Asp Gln Glu Glu Val Pro Leu Phe Phe Pro Leu His Leu
    95                  100                 105 tgg gtg aag aat gtg ttc cta aac cag act cgg act cag cga gtc ctc        385
Trp Val Lys Asn Val Phe Leu Asn Gln Thr Arg Thr Gln Arg Val Leu
110                 115                 120                 125 ttt gtg gac agt gta ggc ctg ccg gct ccc ccc agt atc atc aag gcc        433
Phe Val Asp Ser Val Gly Leu Pro Ala Pro Pro Ser Ile Ile Lys Ala
                130                 135                 140 atg ggt ggg agc cag cca ggg gaa ctt cag atc agc tgg gag gag cca        481
Met Gly Gly Ser Gln Pro Gly Glu Leu Gln Ile Ser Trp Glu Glu Pro
            145                 150                 155 gct cca gaa atc agt gat ttc ctg agg tac gaa ctc cgc tat ggc ccc        529
Ala Pro Glu Ile Ser Asp Phe Leu Arg Tyr Glu Leu Arg Tyr Gly Pro
        160                 165                 170 aga gat ccc aag aac tcc act ggt ccc acg gtc ata cag ctg att gcc        577
Arg Asp Pro Lys Asn Ser Thr Gly Pro Thr Val Ile Gln Leu Ile Ala
    175                 180                 185 aca gaa acc tgc tgc cct gct ctg cag aga cct cac tca gcc tct gct        625
Thr Glu Thr Cys Cys Pro Ala Leu Gln Arg Pro His Ser Ala Ser Ala
190                 195                 200                 205 ctg gac cag tct cca tgt gct cag ccc aca atg ccc tgg caa gat gga        673
Leu Asp Gln Ser Pro Cys Ala Gln Pro Thr Met Pro Trp Gln Asp Gly
                210                 215                 220 cca aag cag acc tcc cca agt aga gaa gct tca gct ctg aca gca gag        721
Pro Lys Gln Thr Ser Pro Ser Arg Glu Ala Ser Ala Leu Thr Ala Glu
            225                 230                 235 ggt gga agc tgc ctc atc tca gga ctc cag cct ggc aac tcc tac tgg        769
Gly Gly Ser Cys Leu Ile Ser Gly Leu Gln Pro Gly Asn Ser Tyr Trp
        240                 245                 250 ctg cag ctg cgc agc gaa cct gat ggg atc tcc ctc ggt ggc tcc tgg        817
Leu Gln Leu Arg Ser Glu Pro Asp Gly Ile Ser Leu Gly Gly Ser Trp
    255                 260                 265
```

-continued

| | | |
|---|---|---|
| gga tcc tgg tcc ctc cct gtg act gtg gac ctg cct gga gat gca gtg<br>Gly Ser Trp Ser Leu Pro Val Thr Val Asp Leu Pro Gly Asp Ala Val<br>270                     275                  280                   285 | 865 |
| gca ctt gga ctg caa tgc ttt acc ttg gac ctg aag aat gtt acc tgt<br>Ala Leu Gly Leu Gln Cys Phe Thr Leu Asp Leu Lys Asn Val Thr Cys<br>                   290                   295                  300 | 913 |
| caa tgg cag caa cag gac cat gct agc tcc caa ggc ttc ttc tac cac<br>Gln Trp Gln Gln Gln Asp His Ala Ser Ser Gln Gly Phe Phe Tyr His<br>305                     310                  315 | 961 |
| agc agg gca cgg tgc tgc ccc aga gac agg tac ccc atc tgg gag aac<br>Ser Arg Ala Arg Cys Cys Pro Arg Asp Arg Tyr Pro Ile Trp Glu Asn<br>                   320                   325                  330 | 1009 |
| tgc gaa gag gaa gag aaa aca aat cca gga cta cag acc cca cag ttc<br>Cys Glu Glu Glu Glu Lys Thr Asn Pro Gly Leu Gln Thr Pro Gln Phe<br>335                     340                  345 | 1057 |
| tct cgc tgc cac ttc aag tca cga aat gac agc att att cac atc ctt<br>Ser Arg Cys His Phe Lys Ser Arg Asn Asp Ser Ile Ile His Ile Leu<br>350                     355                  360                  365 | 1105 |
| gtg gag gtg acc aca gcc ccg ggt act gtt cac agc tac ctg ggc tcc<br>Val Glu Val Thr Thr Ala Pro Gly Thr Val His Ser Tyr Leu Gly Ser<br>                   370                   375                  380 | 1153 |
| cct ttc tgg atc cac cag gct gtg cgc ctc ccc acc cca aac ttg cac<br>Pro Phe Trp Ile His Gln Ala Val Arg Leu Pro Thr Pro Asn Leu His<br>385                     390                  395 | 1201 |
| tgg agg gag atc tcc agt ggg cat ctg gaa ttg gag tgg cag cac cca<br>Trp Arg Glu Ile Ser Ser Gly His Leu Glu Leu Glu Trp Gln His Pro<br>                   400                   405                  410 | 1249 |
| tcg tcc tgg gca gcc caa gag acc tgt tat caa ctc cga tac aca gga<br>Ser Ser Trp Ala Ala Gln Glu Thr Cys Tyr Gln Leu Arg Tyr Thr Gly<br>415                     420                  425 | 1297 |
| gaa ggc cat cag gac tgg aag gtg ctg gag ccg cct ctc ggg gcc cga<br>Glu Gly His Gln Asp Trp Lys Val Leu Glu Pro Pro Leu Gly Ala Arg<br>430                     435                  440                  445 | 1345 |
| gga ggg acc ctg gag ctg cgc ccg cga tct cgc tac cgt tta cag ctg<br>Gly Gly Thr Leu Glu Leu Arg Pro Arg Ser Arg Tyr Arg Leu Gln Leu<br>                   450                   455                  460 | 1393 |
| cgc gcc agg ctc aac ggc ccc acc tac caa ggt ccc tgg agc tcg tgg<br>Arg Ala Arg Leu Asn Gly Pro Thr Tyr Gln Gly Pro Trp Ser Ser Trp<br>465                     470                  475 | 1441 |
| tcg gac cca act agg gtg gag acc gcc acc gag acc gcc tgg atc tcc<br>Ser Asp Pro Thr Arg Val Glu Thr Ala Thr Glu Thr Ala Trp Ile Ser<br>                   480                   485                  490 | 1489 |
| ttg gtg acc gct ctg cat cta gtg ctg ggc ctc agc gcc gtc ctg ggc<br>Leu Val Thr Ala Leu His Leu Val Leu Gly Leu Ser Ala Val Leu Gly<br>495                     500                  505 | 1537 |
| ctg ctg ctg ctg agg tgg cag ttt cct gca cac tac agg aga ctg agg<br>Leu Leu Leu Leu Arg Trp Gln Phe Pro Ala His Tyr Arg Arg Leu Arg<br>510                     515                  520                  525 | 1585 |
| cat gcc ctg tgg ccc tca ctt cca gac ctg cac cgg gtc cta ggc cag<br>His Ala Leu Trp Pro Ser Leu Pro Asp Leu His Arg Val Leu Gly Gln<br>                   530                   535                  540 | 1633 |
| tac ctt agg gac act gca gcc ctg agc ccg ccc aag gcc aca gtc tca<br>Tyr Leu Arg Asp Thr Ala Ala Leu Ser Pro Pro Lys Ala Thr Val Ser<br>545                     550                  555 | 1681 |
| gat acc tgt gaa gaa gtg gaa ccc agc ctc ctt gaa atc ctc ccc aag<br>Asp Thr Cys Glu Glu Val Glu Pro Ser Leu Leu Glu Ile Leu Pro Lys<br>                   560                   565                  570 | 1729 |
| tcc tca gag agg act cct ttg ccc ctg tgt tcc tcc cag gcc cag atg<br>Ser Ser Glu Arg Thr Pro Leu Pro Leu Cys Ser Ser Gln Ala Gln Met<br>575                     580                  585 | 1777 |

```
gac tac cga aga ttg cag cct tct tgc ctg ggg acc atg ccc ctg tct    1825
Asp Tyr Arg Arg Leu Gln Pro Ser Cys Leu Gly Thr Met Pro Leu Ser
590                 595                 600                 605 gtg tgc cca ccc atg gct gag tca ggg tcc tgc tgt acc acc cac att    1873
Val Cys Pro Pro Met Ala Glu Ser Gly Ser Cys Cys Thr Thr His Ile
                610                 615                 620 gcc aac cat tcc tac cta cca cta agc tat tgg cag cag cct tga        1918
Ala Asn His Ser Tyr Leu Pro Leu Ser Tyr Trp Gln Gln Pro
                625                 630                 635 gtcgac                                                             1924

<210> SEQ ID NO 4
<211> LENGTH: 635
<212> TYPE: PRT
<213> ORGANISM: Homo sapiens

<400> SEQUENCE: 4

Met Pro Ser Trp Ala Leu Phe Met Val Thr Ser Cys Leu Leu Ala
1               5                   10                  15

Pro Gln Asn Leu Ala Gln Val Ser Ser Gln Asp Val Ser Leu Leu Ala
                20                  25                  30

Ser Asp Ser Glu Pro Leu Lys Cys Phe Ser Arg Thr Phe Glu Asp Leu
            35                  40                  45

Thr Cys Phe Trp Asp Glu Glu Ala Ala Pro Ser Gly Thr Tyr Gln
50                  55                  60

Leu Leu Tyr Ala Tyr Pro Arg Glu Lys Pro Arg Ala Cys Pro Leu Ser
65                  70                  75                  80

Ser Gln Ser Met Pro His Phe Gly Thr Arg Tyr Val Cys Gln Phe Pro
                85                  90                  95

Asp Gln Glu Glu Val Pro Leu Phe Phe Pro Leu His Leu Trp Val Lys
                100                 105                 110

Asn Val Phe Leu Asn Gln Thr Arg Thr Gln Arg Val Leu Phe Val Asp
            115                 120                 125

Ser Val Gly Leu Pro Ala Pro Pro Ser Ile Ile Lys Ala Met Gly Gly
130                 135                 140

Ser Gln Pro Gly Glu Leu Gln Ile Ser Trp Glu Glu Pro Ala Pro Glu
145                 150                 155                 160

Ile Ser Asp Phe Leu Arg Tyr Glu Leu Arg Tyr Gly Pro Arg Asp Pro
                165                 170                 175

Lys Asn Ser Thr Gly Pro Thr Val Ile Gln Leu Ile Ala Thr Glu Thr
            180                 185                 190

Cys Cys Pro Ala Leu Gln Arg Pro His Ser Ala Ser Ala Leu Asp Gln
        195                 200                 205

Ser Pro Cys Ala Gln Pro Thr Met Pro Trp Gln Asp Gly Pro Lys Gln
210                 215                 220

Thr Ser Pro Ser Arg Glu Ala Ser Ala Leu Thr Ala Glu Gly Gly Ser
225                 230                 235                 240

Cys Leu Ile Ser Gly Leu Gln Pro Gly Asn Ser Tyr Trp Leu Gln Leu
                245                 250                 255

Arg Ser Glu Pro Asp Gly Ile Ser Leu Gly Gly Ser Trp Gly Ser Trp
            260                 265                 270

Ser Leu Pro Val Thr Val Asp Leu Pro Gly Asp Ala Val Ala Leu Gly
        275                 280                 285

Leu Gln Cys Phe Thr Leu Asp Leu Lys Asn Val Thr Cys Gln Trp Gln
290                 295                 300
```

```
Gln Gln Asp His Ala Ser Ser Gln Gly Phe Phe Tyr His Ser Arg Ala
305                 310                 315                 320

Arg Cys Cys Pro Arg Asp Arg Tyr Pro Ile Trp Glu Asn Cys Glu Glu
            325                 330                 335

Glu Glu Lys Thr Asn Pro Gly Leu Gln Thr Pro Gln Phe Ser Arg Cys
            340                 345                 350

His Phe Lys Ser Arg Asn Asp Ser Ile Ile His Ile Leu Val Glu Val
            355                 360                 365

Thr Thr Ala Pro Gly Thr Val His Ser Tyr Leu Gly Ser Pro Phe Trp
            370                 375                 380

Ile His Gln Ala Val Arg Leu Pro Thr Pro Asn Leu His Trp Arg Glu
385                 390                 395                 400

Ile Ser Ser Gly His Leu Glu Leu Glu Trp Gln His Pro Ser Ser Trp
            405                 410                 415

Ala Ala Gln Glu Thr Cys Tyr Gln Leu Arg Tyr Thr Gly Glu Gly His
            420                 425                 430

Gln Asp Trp Lys Val Leu Glu Pro Pro Leu Gly Ala Arg Gly Gly Thr
            435                 440                 445

Leu Glu Leu Arg Pro Arg Ser Arg Tyr Arg Leu Gln Leu Arg Ala Arg
450                 455                 460

Leu Asn Gly Pro Thr Tyr Gln Gly Pro Trp Ser Ser Trp Ser Asp Pro
465                 470                 475                 480

Thr Arg Val Glu Thr Ala Thr Glu Thr Ala Trp Ile Ser Leu Val Thr
            485                 490                 495

Ala Leu His Leu Val Leu Gly Leu Ser Ala Val Leu Gly Leu Leu Leu
            500                 505                 510

Leu Arg Trp Gln Phe Pro Ala His Tyr Arg Arg Leu Arg His Ala Leu
            515                 520                 525

Trp Pro Ser Leu Pro Asp Leu His Arg Val Leu Gly Gln Tyr Leu Arg
            530                 535                 540

Asp Thr Ala Ala Leu Ser Pro Pro Lys Ala Thr Val Ser Asp Thr Cys
545                 550                 555                 560

Glu Glu Val Glu Pro Ser Leu Leu Glu Ile Leu Pro Lys Ser Ser Glu
            565                 570                 575

Arg Thr Pro Leu Pro Leu Cys Ser Ser Gln Ala Gln Met Asp Tyr Arg
            580                 585                 590

Arg Leu Gln Pro Ser Cys Leu Gly Thr Met Pro Leu Ser Val Cys Pro
            595                 600                 605

Pro Met Ala Glu Ser Gly Ser Cys Cys Thr Thr His Ile Ala Asn His
            610                 615                 620

Ser Tyr Leu Pro Leu Ser Tyr Trp Gln Gln Pro
625                 630                 635
```

<210> SEQ ID NO 5
<211> LENGTH: 1506
<212> TYPE: DNA
<213> ORGANISM: Homo sapiens
<220> FEATURE:
<221> NAME/KEY: CDS
<222> LOCATION: (1)..(1506)

<400> SEQUENCE: 5

```
atg gta agc gct att gtt tta tat gtg ctt ttg gcg gcg gcg cat          48
Met Val Ser Ala Ile Val Leu Tyr Val Leu Leu Ala Ala Ala His
1               5                   10                  15
```

```
tct gcc ttt gcg gat ctg cat caa gat gtc tcc ttg ctg gca tca gac      96
Ser Ala Phe Ala Asp Leu His Gln Asp Val Ser Leu Leu Ala Ser Asp
            20                  25                  30 tca gag ccc ctg aag tgt ttc tcc cga aca ttt gag gac ctc act tgc     144
Ser Glu Pro Leu Lys Cys Phe Ser Arg Thr Phe Glu Asp Leu Thr Cys
        35                  40                  45 ttc tgg gat gag gaa gag gca gcg ccc agt ggg aca tac cag ctg ctg     192
Phe Trp Asp Glu Glu Glu Ala Ala Pro Ser Gly Thr Tyr Gln Leu Leu
    50                  55                  60 tat gcc tac ccg cgg gag aag ccc cgt gct tgc ccc ctg agt tcc cag     240
Tyr Ala Tyr Pro Arg Glu Lys Pro Arg Ala Cys Pro Leu Ser Ser Gln
65                  70                  75                  80 agc atg ccc cac ttt gga acc cga tac gtg tgc cag ttt cca gac cag     288
Ser Met Pro His Phe Gly Thr Arg Tyr Val Cys Gln Phe Pro Asp Gln
                85                  90                  95 gag gaa gtg cgt ctc ttc ttt ccg ctg cac ctc tgg gtg aag aat gtg     336
Glu Glu Val Arg Leu Phe Phe Pro Leu His Leu Trp Val Lys Asn Val
            100                 105                 110 ttc cta aac cag act cgg act cag cga gtc ctc ttt gtg gac agt gta     384
Phe Leu Asn Gln Thr Arg Thr Gln Arg Val Leu Phe Val Asp Ser Val
        115                 120                 125 ggc ctg ccg gct ccc ccc agt atc atc aag gcc atg ggt ggg agc cag     432
Gly Leu Pro Ala Pro Pro Ser Ile Ile Lys Ala Met Gly Gly Ser Gln
    130                 135                 140 cca ggg gaa ctt cag atc agc tgg gag gag cca gct cca gaa atc agt     480
Pro Gly Glu Leu Gln Ile Ser Trp Glu Glu Pro Ala Pro Glu Ile Ser
145                 150                 155                 160 gat ttc ctg agg tac gaa ctc cgc tat ggc ccc aga gat ccc aag aac     528
Asp Phe Leu Arg Tyr Glu Leu Arg Tyr Gly Pro Arg Asp Pro Lys Asn
                165                 170                 175 tcc act ggt ccc acg gtc ata cag ctg att gcc aca gaa acc tgc tgc     576
Ser Thr Gly Pro Thr Val Ile Gln Leu Ile Ala Thr Glu Thr Cys Cys
            180                 185                 190 cct gct ctg cag aga cct cac tca gcc tct gct ctg gac cag tct cca     624
Pro Ala Leu Gln Arg Pro His Ser Ala Ser Ala Leu Asp Gln Ser Pro
        195                 200                 205 tgt gct cag ccc aca atg ccc tgg caa gat gga cca aag cag acc tcc     672
Cys Ala Gln Pro Thr Met Pro Trp Gln Asp Gly Pro Lys Gln Thr Ser
    210                 215                 220 cca agt aga gaa gct tca gct ctg aca gca gag ggt gga agc tgc ctc     720
Pro Ser Arg Glu Ala Ser Ala Leu Thr Ala Glu Gly Gly Ser Cys Leu
225                 230                 235                 240 atc tca gga ctc cag cct ggc aac tcc tac tgg ctg cag ctg cgc agc     768
Ile Ser Gly Leu Gln Pro Gly Asn Ser Tyr Trp Leu Gln Leu Arg Ser
                245                 250                 255 gaa cct gat ggg atc tcc ctc ggt ggc tcc tgg gga tcc tgg tcc ctc     816
Glu Pro Asp Gly Ile Ser Leu Gly Gly Ser Trp Gly Ser Trp Ser Leu
            260                 265                 270 cct gtg act gtg gac ctg cct gga gat gca gtg gca ctt gga ctg caa     864
Pro Val Thr Val Asp Leu Pro Gly Asp Ala Val Ala Leu Gly Leu Gln
        275                 280                 285 tgc ttt acc ttg gac ctg aag aat gtt acc tgt caa tgg cag caa cag     912
Cys Phe Thr Leu Asp Leu Lys Asn Val Thr Cys Gln Trp Gln Gln Gln
    290                 295                 300 gac cat gct agc tcc caa ggc ttc ttc tac cac agc agg gca cgg tgc     960
Asp His Ala Ser Ser Gln Gly Phe Phe Tyr His Ser Arg Ala Arg Cys
305                 310                 315                 320 tgc ccc aga gac agg tac ccc atc tgg gag aac tgc gaa gag gaa gag    1008
Cys Pro Arg Asp Arg Tyr Pro Ile Trp Glu Asn Cys Glu Glu Glu Glu
                325                 330                 335
```

```
aaa aca aat cca gga cta cag acc cca cag ttc tct cgc tgc cac ttc       1056
Lys Thr Asn Pro Gly Leu Gln Thr Pro Gln Phe Ser Arg Cys His Phe
            340                 345                 350 aag tca cga aat gac agc att att cac atc ctt gtg gag gtg acc aca       1104
Lys Ser Arg Asn Asp Ser Ile Ile His Ile Leu Val Glu Val Thr Thr
        355                 360                 365 gcc ccg ggt act gtt cac agc tac ctg ggc tcc cct ttc tgg atc cac       1152
Ala Pro Gly Thr Val His Ser Tyr Leu Gly Ser Pro Phe Trp Ile His
    370                 375                 380 cag gct gtg cgc ctc ccc acc cca aac ttg cac tgg agg gag atc tcc       1200
Gln Ala Val Arg Leu Pro Thr Pro Asn Leu His Trp Arg Glu Ile Ser
385                 390                 395                 400 agt ggg cat ctg gaa ttg gag tgg cag cac cca tcg tcc tgg gca gcc       1248
Ser Gly His Leu Glu Leu Glu Trp Gln His Pro Ser Ser Trp Ala Ala
                405                 410                 415 caa gag acc tgt tat caa ctc cga tac aca gga gaa ggc cat cag gac       1296
Gln Glu Thr Cys Tyr Gln Leu Arg Tyr Thr Gly Glu Gly His Gln Asp
            420                 425                 430 tgg aag gtg ctg gag ccg cct ctc ggg gcc cga gga ggg acc ctg gag       1344
Trp Lys Val Leu Glu Pro Pro Leu Gly Ala Arg Gly Gly Thr Leu Glu
        435                 440                 445 ctg cgc ccg cga tct cgc tac cgt tta cag ctg cgc gcc agg ctc aac       1392
Leu Arg Pro Arg Ser Arg Tyr Arg Leu Gln Leu Arg Ala Arg Leu Asn
    450                 455                 460 ggc ccc acc tac caa ggt ccc tgg agc tcg tgg tcg gac cca act agg       1440
Gly Pro Thr Tyr Gln Gly Pro Trp Ser Ser Trp Ser Asp Pro Thr Arg
465                 470                 475                 480 gtg gag acc gcc acc gag acc gcc tgg gtc gac gga tcc gac tac aag       1488
Val Glu Thr Ala Thr Glu Thr Ala Trp Val Asp Gly Ser Asp Tyr Lys
                485                 490                 495 gac gac gat gac aag tga                                               1506
Asp Asp Asp Asp Lys
            500

<210> SEQ ID NO 6
<211> LENGTH: 501
<212> TYPE: PRT
<213> ORGANISM: Homo sapiens

<400> SEQUENCE: 6

Met Val Ser Ala Ile Val Leu Tyr Val Leu Leu Ala Ala Ala Ala His
1               5                   10                  15

Ser Ala Phe Ala Asp Leu His Gln Asp Val Ser Leu Leu Ala Ser Asp
            20                  25                  30

Ser Glu Pro Leu Lys Cys Phe Ser Arg Thr Phe Glu Asp Leu Thr Cys
        35                  40                  45

Phe Trp Asp Glu Glu Glu Ala Ala Pro Ser Gly Thr Tyr Gln Leu Leu
    50                  55                  60

Tyr Ala Tyr Pro Arg Glu Lys Pro Arg Ala Cys Pro Leu Ser Ser Gln
65                  70                  75                  80

Ser Met Pro His Phe Gly Thr Arg Tyr Val Cys Gln Phe Pro Asp Gln
                85                  90                  95

Glu Glu Val Arg Leu Phe Phe Pro Leu His Leu Trp Val Lys Asn Val
            100                 105                 110

Phe Leu Asn Gln Thr Arg Thr Gln Arg Val Leu Phe Val Asp Ser Val
        115                 120                 125

Gly Leu Pro Ala Pro Pro Ser Ile Ile Lys Ala Met Gly Gly Ser Gln
    130                 135                 140
```

Pro Gly Glu Leu Gln Ile Ser Trp Glu Glu Pro Ala Pro Glu Ile Ser
145                 150                 155                 160

Asp Phe Leu Arg Tyr Glu Leu Arg Tyr Gly Pro Arg Asp Pro Lys Asn
                165                 170                 175

Ser Thr Gly Pro Thr Val Ile Gln Leu Ile Ala Thr Glu Thr Cys Cys
            180                 185                 190

Pro Ala Leu Gln Arg Pro His Ser Ala Ser Ala Leu Asp Gln Ser Pro
        195                 200                 205

Cys Ala Gln Pro Thr Met Pro Trp Gln Asp Gly Pro Lys Gln Thr Ser
210                 215                 220

Pro Ser Arg Glu Ala Ser Ala Leu Thr Ala Glu Gly Gly Ser Cys Leu
225                 230                 235                 240

Ile Ser Gly Leu Gln Pro Gly Asn Ser Tyr Trp Leu Gln Leu Arg Ser
                245                 250                 255

Glu Pro Asp Gly Ile Ser Leu Gly Gly Ser Trp Gly Ser Trp Ser Leu
            260                 265                 270

Pro Val Thr Val Asp Leu Pro Gly Asp Ala Val Ala Leu Gly Leu Gln
        275                 280                 285

Cys Phe Thr Leu Asp Leu Lys Asn Val Thr Cys Gln Trp Gln Gln Gln
290                 295                 300

Asp His Ala Ser Ser Gln Gly Phe Phe Tyr His Ser Arg Ala Arg Cys
305                 310                 315                 320

Cys Pro Arg Asp Arg Tyr Pro Ile Trp Glu Asn Cys Glu Glu Glu Glu
                325                 330                 335

Lys Thr Asn Pro Gly Leu Gln Thr Pro Gln Phe Ser Arg Cys His Phe
            340                 345                 350

Lys Ser Arg Asn Asp Ser Ile Ile His Ile Leu Val Glu Val Thr Thr
        355                 360                 365

Ala Pro Gly Thr Val His Ser Tyr Leu Gly Ser Pro Phe Trp Ile His
370                 375                 380

Gln Ala Val Arg Leu Pro Thr Pro Asn Leu His Trp Arg Glu Ile Ser
385                 390                 395                 400

Ser Gly His Leu Glu Leu Glu Trp Gln His Pro Ser Ser Trp Ala Ala
                405                 410                 415

Gln Glu Thr Cys Tyr Gln Leu Arg Tyr Thr Gly Glu Gly His Gln Asp
            420                 425                 430

Trp Lys Val Leu Glu Pro Pro Leu Gly Ala Arg Gly Gly Thr Leu Glu
        435                 440                 445

Leu Arg Pro Arg Ser Arg Tyr Arg Leu Gln Leu Arg Ala Arg Leu Asn
450                 455                 460

Gly Pro Thr Tyr Gln Gly Pro Trp Ser Ser Trp Ser Asp Pro Thr Arg
465                 470                 475                 480

Val Glu Thr Ala Thr Glu Thr Ala Trp Val Asp Gly Ser Asp Tyr Lys
                485                 490                 495

Asp Asp Asp Asp Lys
            500

<210> SEQ ID NO 7
<211> LENGTH: 768
<212> TYPE: DNA
<213> ORGANISM: Mus musculus
<220> FEATURE:
<221> NAME/KEY: CDS
<222> LOCATION: (1)..(768)

<400> SEQUENCE: 7

```
atg aga gtg ctg att cct ttg tgg ctg ttc aca gcc ttt cct ggt acc      48
Met Arg Val Leu Ile Pro Leu Trp Leu Phe Thr Ala Phe Pro Gly Thr
1               5                   10                  15 ctg tct gat gtg cag ctg cag gag tcg gga cct ggc ctg gtg aaa cct      96
Leu Ser Asp Val Gln Leu Gln Glu Ser Gly Pro Gly Leu Val Lys Pro
            20                  25                  30 tct cag tct ctg tcc ctc acc tgc act gtc act ggc tac tca atc acc      144
Ser Gln Ser Leu Ser Leu Thr Cys Thr Val Thr Gly Tyr Ser Ile Thr
        35                  40                  45 agt gat tat gcc tgg agc tgg atc cga cag tta cca gga aac aaa ctg      192
Ser Asp Tyr Ala Trp Ser Trp Ile Arg Gln Leu Pro Gly Asn Lys Leu
    50                  55                  60 gag tgg atg ggc tac ata acg tac agt ggt tac tct atc tac aat cca      240
Glu Trp Met Gly Tyr Ile Thr Tyr Ser Gly Tyr Ser Ile Tyr Asn Pro
65                  70                  75                  80 tct ctc aaa agt cga atc tct atc agt cga gac aca tcc aag aac cag      288
Ser Leu Lys Ser Arg Ile Ser Ile Ser Arg Asp Thr Ser Lys Asn Gln
                85                  90                  95 ttg ttc ctg cag tta aat tct gtg acc act gag gac aca gcc aca tat      336
Leu Phe Leu Gln Leu Asn Ser Val Thr Thr Glu Asp Thr Ala Thr Tyr
            100                 105                 110 tac tgt gtg ggc ggg tat gac aat atg gac tat tgg ggt caa gga acc      384
Tyr Cys Val Gly Gly Tyr Asp Asn Met Asp Tyr Trp Gly Gln Gly Thr
        115                 120                 125 tca gtc acc gtc tcc tca ggt gga ggc gga tcg caa att gtt ctc acc      432
Ser Val Thr Val Ser Ser Gly Gly Gly Gly Ser Gln Ile Val Leu Thr
    130                 135                 140 cag tct cca gca atc atg tct gca tct cct ggg gag aag gtc acc ttg      480
Gln Ser Pro Ala Ile Met Ser Ala Ser Pro Gly Glu Lys Val Thr Leu
145                 150                 155                 160 acc tgc agt gcc agc tca agt gta agt tcc agc cac tta tac tgg tat      528
Thr Cys Ser Ala Ser Ser Ser Val Ser Ser Ser His Leu Tyr Trp Tyr
                165                 170                 175 cag cag aag cca ggg tcc tcc ccc aaa ctc tgg att tat agc aca tcc      576
Gln Gln Lys Pro Gly Ser Ser Pro Lys Leu Trp Ile Tyr Ser Thr Ser
            180                 185                 190 aac ctg gct tct gga gtc cct gct cgc ttc agt ggc agt ggg tct ggg      624
Asn Leu Ala Ser Gly Val Pro Ala Arg Phe Ser Gly Ser Gly Ser Gly
        195                 200                 205 acc tcc tat tct ctc aca atc agc aac atg gag act gaa gat gct gcc      672
Thr Ser Tyr Ser Leu Thr Ile Ser Asn Met Glu Thr Glu Asp Ala Ala
    210                 215                 220 tct tat ttc tgc cat cag tgg agt agt tac cca tgg acg ttc ggt ggg      720
Ser Tyr Phe Cys His Gln Trp Ser Ser Tyr Pro Trp Thr Phe Gly Gly
225                 230                 235                 240 ggc acc aag ctg gaa atc aaa gac tac aag gat gac gac gat aag tga      768
Gly Thr Lys Leu Glu Ile Lys Asp Tyr Lys Asp Asp Asp Asp Lys
                245                 250                 255
```

<210> SEQ ID NO 8
<211> LENGTH: 255
<212> TYPE: PRT
<213> ORGANISM: Mus musculus

<400> SEQUENCE: 8

```
Met Arg Val Leu Ile Pro Leu Trp Leu Phe Thr Ala Phe Pro Gly Thr
1               5                   10                  15

Leu Ser Asp Val Gln Leu Gln Glu Ser Gly Pro Gly Leu Val Lys Pro
            20                  25                  30
```

```
Ser Gln Ser Leu Ser Leu Thr Cys Thr Val Thr Gly Tyr Ser Ile Thr
        35                  40                  45
Ser Asp Tyr Ala Trp Ser Trp Ile Arg Gln Leu Pro Gly Asn Lys Leu
    50                  55                  60
Glu Trp Met Gly Tyr Ile Thr Tyr Ser Gly Tyr Ser Ile Tyr Asn Pro
65                  70                  75                  80
Ser Leu Lys Ser Arg Ile Ser Ile Ser Arg Asp Thr Ser Lys Asn Gln
                85                  90                  95
Leu Phe Leu Gln Leu Asn Ser Val Thr Thr Glu Asp Thr Ala Thr Tyr
            100                 105                 110
Tyr Cys Val Gly Gly Tyr Asp Asn Met Asp Tyr Trp Gly Gln Gly Thr
        115                 120                 125
Ser Val Thr Val Ser Ser Gly Gly Gly Ser Gln Ile Val Leu Thr
    130                 135                 140
Gln Ser Pro Ala Ile Met Ser Ala Ser Pro Gly Glu Lys Val Thr Leu
145                 150                 155                 160
Thr Cys Ser Ala Ser Ser Ser Val Ser Ser Ser His Leu Tyr Trp Tyr
                165                 170                 175
Gln Gln Lys Pro Gly Ser Ser Pro Lys Leu Trp Ile Tyr Ser Thr Ser
            180                 185                 190
Asn Leu Ala Ser Gly Val Pro Ala Arg Phe Ser Gly Ser Gly Ser Gly
        195                 200                 205
Thr Ser Tyr Ser Leu Thr Ile Ser Asn Met Glu Thr Glu Asp Ala Ala
    210                 215                 220
Ser Tyr Phe Cys His Gln Trp Ser Ser Tyr Pro Trp Thr Phe Gly Gly
225                 230                 235                 240
Gly Thr Lys Leu Glu Ile Lys Asp Tyr Lys Asp Asp Asp Lys
                245                 250                 255

<210> SEQ ID NO 9
<211> LENGTH: 1924
<212> TYPE: DNA
<213> ORGANISM: Homo sapiens
<220> FEATURE:
<221> NAME/KEY: CDS
<222> LOCATION: (11)..(1918)

<400> SEQUENCE: 9
gaattccacc atg ccc tcc tgg gcc ctc ttc atg gtc acc tcc tgc ctc        49
           Met Pro Ser Trp Ala Leu Phe Met Val Thr Ser Cys Leu
             1               5                  10 ctc ctg gcc cct caa aac ctg gcc caa gtc agc agc caa gat gtc tcc      97
Leu Leu Ala Pro Gln Asn Leu Ala Gln Val Ser Ser Gln Asp Val Ser
    15                  20                  25 ttg ctg gca tca gac tca gag ccc ctg aag tgt ttc tcc cga aca ttt     145
Leu Leu Ala Ser Asp Ser Glu Pro Leu Lys Cys Phe Ser Arg Thr Phe
30                  35                  40                  45 gag gac ctc act tgc ttc tgg gat gag gaa gag gca gcg ccc agt ggg     193
Glu Asp Leu Thr Cys Phe Trp Asp Glu Glu Glu Ala Ala Pro Ser Gly
                50                  55                  60 aca tac cag ctg ctg tat gcc tac ccg cgg gag aag ccc cgt gct tgc     241
Thr Tyr Gln Leu Leu Tyr Ala Tyr Pro Arg Glu Lys Pro Arg Ala Cys
            65                  70                  75 ccc ctg agt tcc cag agc atg ccc cac ttt gga acc cga tac gtg tgc     289
Pro Leu Ser Ser Gln Ser Met Pro His Phe Gly Thr Arg Tyr Val Cys
        80                  85                  90
```

-continued

| | |
|---|---|
| cag ttt cca gac cag gag gaa gtg cgt ctc ttc ttt ccg ctg cac ctc<br>Gln Phe Pro Asp Gln Glu Glu Val Arg Leu Phe Phe Pro Leu His Leu<br>95                    100                    105 | 337 |
| tgg gtg aag aat gtg ttc cta aac cag act cgg act cag cga gtc ctc<br>Trp Val Lys Asn Val Phe Leu Asn Gln Thr Arg Thr Gln Arg Val Leu<br>110                    115                    120                    125 | 385 |
| ttt gtg gac agt gta ggc ctg ccg gct ccc ccc agt atc atc aag gcc<br>Phe Val Asp Ser Val Gly Leu Pro Ala Pro Pro Ser Ile Ile Lys Ala<br>                  130                    135                    140 | 433 |
| atg ggt ggg agc cag cca ggg gaa ctt cag atc agc tgg gag gag cca<br>Met Gly Gly Ser Gln Pro Gly Glu Leu Gln Ile Ser Trp Glu Glu Pro<br>                  145                    150                    155 | 481 |
| gct cca gaa atc agt gat ttc ctg agg tac gaa ctc cgc tat ggc ccc<br>Ala Pro Glu Ile Ser Asp Phe Leu Arg Tyr Glu Leu Arg Tyr Gly Pro<br>160                    165                    170 | 529 |
| aga gat ccc aag aac tcc act ggt ccc acg gtc ata cag ctg att gcc<br>Arg Asp Pro Lys Asn Ser Thr Gly Pro Thr Val Ile Gln Leu Ile Ala<br>175                    180                    185 | 577 |
| aca gaa acc tgc tgc cct gct ctg cag aga cct cac tca gcc tct gct<br>Thr Glu Thr Cys Cys Pro Ala Leu Gln Arg Pro His Ser Ala Ser Ala<br>190                    195                    200                    205 | 625 |
| ctg gac cag tct cca tgt gct cag ccc aca atg ccc tgg caa gat gga<br>Leu Asp Gln Ser Pro Cys Ala Gln Pro Thr Met Pro Trp Gln Asp Gly<br>                  210                    215                    220 | 673 |
| cca aag cag acc tcc cca agt aga gaa gct tca gct ctg aca gca gag<br>Pro Lys Gln Thr Ser Pro Ser Arg Glu Ala Ser Ala Leu Thr Ala Glu<br>                  225                    230                    235 | 721 |
| ggt gga agc tgc ctc atc tca gga ctc cag cct gga aac tcc tac tgg<br>Gly Gly Ser Cys Leu Ile Ser Gly Leu Gln Pro Gly Asn Ser Tyr Trp<br>240                    245                    250 | 769 |
| ctg cag ctg tgc agc gaa cct gat ggg atc tcc ctc ggt ggc tcc tgg<br>Leu Gln Leu Cys Ser Glu Pro Asp Gly Ile Ser Leu Gly Gly Ser Trp<br>255                    260                    265 | 817 |
| gga tcc tgg tcc ctc cct gtg act gtg gac ctg cct gga gat gca gtg<br>Gly Ser Trp Ser Leu Pro Val Thr Val Asp Leu Pro Gly Asp Ala Val<br>270                    275                    280                    285 | 865 |
| gca ctt gga ctg caa tgc ttt acc ttg gac ctg aag aat gtt acc tgt<br>Ala Leu Gly Leu Gln Cys Phe Thr Leu Asp Leu Lys Asn Val Thr Cys<br>                  290                    295                    300 | 913 |
| caa tgg cag caa cag gac cat gct agc tcc caa ggc ttc ttc tac cac<br>Gln Trp Gln Gln Gln Asp His Ala Ser Ser Gln Gly Phe Phe Tyr His<br>305                    310                    315 | 961 |
| agc agg gca cgg tgc tgc ccc aga gac agg tac ccc atc tgg gag aac<br>Ser Arg Ala Arg Cys Cys Pro Arg Asp Arg Tyr Pro Ile Trp Glu Asn<br>320                    325                    330 | 1009 |
| tgc gaa gag gaa gag aaa aca aat cca gga cta cag acc cca cag ttc<br>Cys Glu Glu Glu Glu Lys Thr Asn Pro Gly Leu Gln Thr Pro Gln Phe<br>335                    340                    345 | 1057 |
| tct cgc tgc cac ttc aag tca cga aat gac agc att att cac atc ctt<br>Ser Arg Cys His Phe Lys Ser Arg Asn Asp Ser Ile Ile His Ile Leu<br>350                    355                    360                    365 | 1105 |
| gtg gag gtg acc aca gcc ccg ggt act gtt cac agc tac ctg ggc tcc<br>Val Glu Val Thr Thr Ala Pro Gly Thr Val His Ser Tyr Leu Gly Ser<br>                  370                    375                    380 | 1153 |
| cct ttc tgg atc cac cag gct gtg cgc ctc ccc acc cca aac ttg cac<br>Pro Phe Trp Ile His Gln Ala Val Arg Leu Pro Thr Pro Asn Leu His<br>                  385                    390                    395 | 1201 |
| tgg agg gag atc tcc agt ggg cat ctg gaa ttg gag tgg cag cac cca<br>Trp Arg Glu Ile Ser Ser Gly His Leu Glu Leu Glu Trp Gln His Pro<br>400                    405                    410 | 1249 |

```
tcg tcc tgg gca gcc caa gag acc tgt tat caa ctc cga tac aca gga      1297
Ser Ser Trp Ala Ala Gln Glu Thr Cys Tyr Gln Leu Arg Tyr Thr Gly
    415                 420                 425 gaa ggc cat cag gac tgg aag gtg ctg gag ccg cct ctc ggg gcc cga      1345
Glu Gly His Gln Asp Trp Lys Val Leu Glu Pro Pro Leu Gly Ala Arg
430                 435                 440                 445 gga ggg acc ctg gag ctg cgc ccg cga tct cgc tac gtt tta cag ctg      1393
Gly Gly Thr Leu Glu Leu Arg Pro Arg Ser Arg Tyr Arg Leu Gln Leu
                450                 455                 460 cgc gcc agg ctc aac ggc ccc acc tac caa ggt ccc tgg agc tcg tgg      1441
Arg Ala Arg Leu Asn Gly Pro Thr Tyr Gln Gly Pro Trp Ser Ser Trp
            465                 470                 475 tcg gac cca act agg gtg gag acc gcc acc gag acc gcc tgg atc tcc      1489
Ser Asp Pro Thr Arg Val Glu Thr Ala Thr Glu Thr Ala Trp Ile Ser
        480                 485                 490 ttg gtg acc gct ctg cat cta gtg ctg ggc ctc agc gcc gtc ctg ggc      1537
Leu Val Thr Ala Leu His Leu Val Leu Gly Leu Ser Ala Val Leu Gly
    495                 500                 505 ctg ctg ctg ctg agg tgg cag ttt cct gca cac tac agg aga ctg agg      1585
Leu Leu Leu Leu Arg Trp Gln Phe Pro Ala His Tyr Arg Arg Leu Arg
510                 515                 520                 525 cat gcc ctg tgg ccc tca ctt cca gac ctg cac cgg gtc cta ggc cag      1633
His Ala Leu Trp Pro Ser Leu Pro Asp Leu His Arg Val Leu Gly Gln
                530                 535                 540 tac ctt agg gac act gca gcc ctg agc ccg ccc aag gcc aca gtc tca      1681
Tyr Leu Arg Asp Thr Ala Ala Leu Ser Pro Pro Lys Ala Thr Val Ser
            545                 550                 555 gat acc tgt gaa gaa gtg gaa ccc agc ctc ctt gaa atc ctc ccc aag      1729
Asp Thr Cys Glu Glu Val Glu Pro Ser Leu Leu Glu Ile Leu Pro Lys
        560                 565                 570 tcc tca gag agg act cct ttg ccc ctg tgt tcc tcc cag gcc cag atg      1777
Ser Ser Glu Arg Thr Pro Leu Pro Leu Cys Ser Ser Gln Ala Gln Met
    575                 580                 585 gac tac cga aga ttg cag cct tct tgc ctg ggg acc atg ccc ctg tct      1825
Asp Tyr Arg Arg Leu Gln Pro Ser Cys Leu Gly Thr Met Pro Leu Ser
590                 595                 600                 605 gtg tgc cca ccc atg gct gag tca ggg tcc tgc tgt acc acc cac att      1873
Val Cys Pro Pro Met Ala Glu Ser Gly Ser Cys Cys Thr Thr His Ile
                610                 615                 620 gcc aac cat tcc tac cta cca cta agc tat tgg cag cag cct tga          1918
Ala Asn His Ser Tyr Leu Pro Leu Ser Tyr Trp Gln Gln Pro
            625                 630                 635 gtcgac                                                               1924

<210> SEQ ID NO 10
<211> LENGTH: 635
<212> TYPE: PRT
<213> ORGANISM: Homo sapiens

<400> SEQUENCE: 10

Met Pro Ser Trp Ala Leu Phe Met Val Thr Ser Cys Leu Leu Leu Ala
1               5                   10                  15

Pro Gln Asn Leu Ala Gln Val Ser Ser Gln Asp Val Ser Leu Leu Ala
            20                  25                  30

Ser Asp Ser Glu Pro Leu Lys Cys Phe Ser Arg Thr Phe Glu Asp Leu
        35                  40                  45

Thr Cys Phe Trp Asp Glu Glu Glu Ala Ala Pro Ser Gly Thr Tyr Gln
    50                  55                  60
```

-continued

```
Leu Leu Tyr Ala Tyr Pro Arg Glu Lys Pro Arg Ala Cys Pro Leu Ser
 65              70                  75                  80

Ser Gln Ser Met Pro His Phe Gly Thr Arg Tyr Val Cys Gln Phe Pro
             85                  90                  95

Asp Gln Glu Glu Val Arg Leu Phe Phe Pro Leu His Leu Trp Val Lys
        100                 105                 110

Asn Val Phe Leu Asn Gln Thr Arg Thr Gln Arg Val Leu Phe Val Asp
        115                 120                 125

Ser Val Gly Leu Pro Ala Pro Pro Ser Ile Ile Lys Ala Met Gly Gly
    130                 135                 140

Ser Gln Pro Gly Glu Leu Gln Ile Ser Trp Glu Glu Pro Ala Pro Glu
145                 150                 155                 160

Ile Ser Asp Phe Leu Arg Tyr Glu Leu Arg Tyr Gly Pro Arg Asp Pro
                165                 170                 175

Lys Asn Ser Thr Gly Pro Thr Val Ile Gln Leu Ile Ala Thr Glu Thr
            180                 185                 190

Cys Cys Pro Ala Leu Gln Arg Pro His Ser Ala Ser Ala Leu Asp Gln
        195                 200                 205

Ser Pro Cys Ala Gln Pro Thr Met Pro Trp Gln Asp Gly Pro Lys Gln
210                 215                 220

Thr Ser Pro Ser Arg Glu Ala Ser Ala Leu Thr Ala Glu Gly Gly Ser
225                 230                 235                 240

Cys Leu Ile Ser Gly Leu Gln Pro Gly Asn Ser Tyr Trp Leu Gln Leu
                245                 250                 255

Cys Ser Glu Pro Asp Gly Ile Ser Leu Gly Gly Ser Trp Gly Ser Trp
            260                 265                 270

Ser Leu Pro Val Thr Val Asp Leu Pro Gly Asp Ala Val Ala Leu Gly
        275                 280                 285

Leu Gln Cys Phe Thr Leu Asp Leu Lys Asn Val Thr Cys Gln Trp Gln
290                 295                 300

Gln Gln Asp His Ala Ser Ser Gln Gly Phe Phe Tyr His Ser Arg Ala
305                 310                 315                 320

Arg Cys Cys Pro Arg Asp Arg Tyr Pro Ile Trp Glu Asn Cys Glu Glu
                325                 330                 335

Glu Glu Lys Thr Asn Pro Gly Leu Gln Thr Pro Gln Phe Ser Arg Cys
            340                 345                 350

His Phe Lys Ser Arg Asn Asp Ser Ile Ile His Ile Leu Val Glu Val
        355                 360                 365

Thr Thr Ala Pro Gly Thr Val His Ser Tyr Leu Gly Ser Pro Phe Trp
370                 375                 380

Ile His Gln Ala Val Arg Leu Pro Thr Pro Asn Leu His Trp Arg Glu
385                 390                 395                 400

Ile Ser Ser Gly His Leu Glu Leu Glu Trp Gln His Pro Ser Ser Trp
                405                 410                 415

Ala Ala Gln Glu Thr Cys Tyr Gln Leu Arg Tyr Thr Gly Glu Gly His
            420                 425                 430

Gln Asp Trp Lys Val Leu Glu Pro Pro Leu Gly Ala Arg Gly Gly Thr
        435                 440                 445

Leu Glu Leu Arg Pro Arg Ser Arg Tyr Arg Leu Gln Leu Arg Ala Arg
450                 455                 460

Leu Asn Gly Pro Thr Tyr Gln Gly Pro Trp Ser Ser Trp Ser Asp Pro
465                 470                 475                 480
```

```
Thr Arg Val Glu Thr Ala Thr Glu Thr Ala Trp Ile Ser Leu Val Thr
            485                 490                 495

Ala Leu His Leu Val Leu Gly Leu Ser Ala Val Leu Gly Leu Leu Leu
        500                 505                 510

Leu Arg Trp Gln Phe Pro Ala His Tyr Arg Arg Leu Arg His Ala Leu
    515                 520                 525

Trp Pro Ser Leu Pro Asp Leu His Arg Val Leu Gly Gln Tyr Leu Arg
530                 535                 540

Asp Thr Ala Ala Leu Ser Pro Pro Lys Ala Thr Val Ser Asp Thr Cys
545                 550                 555                 560

Glu Glu Val Glu Pro Ser Leu Leu Glu Ile Leu Pro Lys Ser Ser Glu
                565                 570                 575

Arg Thr Pro Leu Pro Leu Cys Ser Ser Gln Ala Gln Met Asp Tyr Arg
            580                 585                 590

Arg Leu Gln Pro Ser Cys Leu Gly Thr Met Pro Leu Ser Val Cys Pro
        595                 600                 605

Pro Met Ala Glu Ser Gly Ser Cys Cys Thr Thr His Ile Ala Asn His
    610                 615                 620

Ser Tyr Leu Pro Leu Ser Tyr Trp Gln Gln Pro
625                 630                 635

<210> SEQ ID NO 11
<211> LENGTH: 1924
<212> TYPE: DNA
<213> ORGANISM: Homo sapiens
<220> FEATURE:
<221> NAME/KEY: CDS
<222> LOCATION: (11)..(1918)

<400> SEQUENCE: 11
gaattccacc atg ccc tcc tgg gcc ctc ttc atg gtc acc tcc tgc ctc         49
           Met Pro Ser Trp Ala Leu Phe Met Val Thr Ser Cys Leu
             1               5                  10 ctc ctg gcc cct caa aac ctg gcc caa gtc agc agc caa gat gtc tcc        97
Leu Leu Ala Pro Gln Asn Leu Ala Gln Val Ser Ser Gln Asp Val Ser
 15                  20                  25 ttg ctg gca tca gac tca gag ccc ctg aag tgt ttc tcc cga aca ttt       145
Leu Leu Ala Ser Asp Ser Glu Pro Leu Lys Cys Phe Ser Arg Thr Phe
 30                  35                  40                  45 gag gac ctc act tgc ttc tgg gat gag gaa gag gca gcg ccc agt ggg       193
Glu Asp Leu Thr Cys Phe Trp Asp Glu Glu Glu Ala Ala Pro Ser Gly
                 50                  55                  60 aca tac cag ctg ctg tat gcc tac ccg cgg gag aag ccc cgt gct tgc       241
Thr Tyr Gln Leu Leu Tyr Ala Tyr Pro Arg Glu Lys Pro Arg Ala Cys
             65                  70                  75 ccc ctg agt tcc cag agc atg ccc cac ttt gga acc cga tac gtg tgc       289
Pro Leu Ser Ser Gln Ser Met Pro His Phe Gly Thr Arg Tyr Val Cys
         80                  85                  90 cag ttt cca gac cag gag gaa gtg cgt ctc ttc ttt ccg ctg cac ctc       337
Gln Phe Pro Asp Gln Glu Glu Val Arg Leu Phe Phe Pro Leu His Leu
     95                 100                 105 tgg gtg aag aat gtg ttc cta aac cag act cgg act cag cga gtc ctc       385
Trp Val Lys Asn Val Phe Leu Asn Gln Thr Arg Thr Gln Arg Val Leu
110                 115                 120                 125 ttt gtg gac agt gta ggc ctg ccg gct ccc ccc agt atc atc aag gcc       433
Phe Val Asp Ser Val Gly Leu Pro Ala Pro Pro Ser Ile Ile Lys Ala
                130                 135                 140
```

```
atg ggt ggg agc cag cca ggg gaa ctt cag atc agc tgg gag gag cca      481
Met Gly Gly Ser Gln Pro Gly Glu Leu Gln Ile Ser Trp Glu Glu Pro
            145                 150                 155 gct cca gaa atc agt gat ttc ctg agg tac gaa ctc cgc tat ggc ccc      529
Ala Pro Glu Ile Ser Asp Phe Leu Arg Tyr Glu Leu Arg Tyr Gly Pro
        160                 165                 170 aga gat ccc aag aac tcc act ggt ccc acg gtc ata cag ctg att gcc      577
Arg Asp Pro Lys Asn Ser Thr Gly Pro Thr Val Ile Gln Leu Ile Ala
175                 180                 185 aca gaa acc tgc tgc cct gct ctg cag aga cct cac tca gcc tct gct      625
Thr Glu Thr Cys Cys Pro Ala Leu Gln Arg Pro His Ser Ala Ser Ala
190                 195                 200                 205 ctg gac cag tct cca tgt gct cag ccc aca atg ccc tgg caa gat gga      673
Leu Asp Gln Ser Pro Cys Ala Gln Pro Thr Met Pro Trp Gln Asp Gly
            210                 215                 220 cca aag cag acc tcc cca agt aga gaa gct tca gct ctg aca gca gag      721
Pro Lys Gln Thr Ser Pro Ser Arg Glu Ala Ser Ala Leu Thr Ala Glu
        225                 230                 235 ggt gga agc tgc ctc atc tca gga ctc cag cct ggc aac tcc tac tgg      769
Gly Gly Ser Cys Leu Ile Ser Gly Leu Gln Pro Gly Asn Ser Tyr Trp
    240                 245                 250 ctg cag ctg cgc agc gaa cct gat ggg atc tcc ctc ggt ggc tcc tgg      817
Leu Gln Leu Arg Ser Glu Pro Asp Gly Ile Ser Leu Gly Gly Ser Trp
255                 260                 265 gga tcc tgg tcc ctc act gtg act gtg gac ctg cct gga gat gca gtg      865
Gly Ser Trp Ser Leu Thr Val Thr Val Asp Leu Pro Gly Asp Ala Val
270                 275                 280                 285 gca ctt gga ctg caa tgc ttt acc ttg gac ctg aag aat gtt acc tgt      913
Ala Leu Gly Leu Gln Cys Phe Thr Leu Asp Leu Lys Asn Val Thr Cys
            290                 295                 300 caa tgg cag caa cag gac cat gct agc tcc caa ggc ttc ttc tac cac      961
Gln Trp Gln Gln Gln Asp His Ala Ser Ser Gln Gly Phe Phe Tyr His
        305                 310                 315 agc agg gca cgg tgc tgc ccc aga gac agg tac ccc atc tgg gag aac     1009
Ser Arg Ala Arg Cys Cys Pro Arg Asp Arg Tyr Pro Ile Trp Glu Asn
    320                 325                 330 tgc gaa gag gaa gag aaa aca aat cca gga cta cag acc cca cag ttc     1057
Cys Glu Glu Glu Glu Lys Thr Asn Pro Gly Leu Gln Thr Pro Gln Phe
335                 340                 345 tct cgc tgc cac ttc aag tca cga aat gac agc att att cac atc ctt     1105
Ser Arg Cys His Phe Lys Ser Arg Asn Asp Ser Ile Ile His Ile Leu
350                 355                 360                 365 gtg gag gtg acc aca gcc ccg ggt act gtt cac agc tac ctg ggc tcc     1153
Val Glu Val Thr Thr Ala Pro Gly Thr Val His Ser Tyr Leu Gly Ser
            370                 375                 380 cct ttc tgg atc cac cag gct gtg cgc ctc ccc acc cca aac ttg cac     1201
Pro Phe Trp Ile His Gln Ala Val Arg Leu Pro Thr Pro Asn Leu His
        385                 390                 395 tgg agg gag atc tcc agt ggg cat ctg gaa ttg gag tgg cag cac cca     1249
Trp Arg Glu Ile Ser Ser Gly His Leu Glu Leu Glu Trp Gln His Pro
    400                 405                 410 tcg tcc tgg gca gcc caa gag acc tgt tat caa ctc cga tac aca gga     1297
Ser Ser Trp Ala Ala Gln Glu Thr Cys Tyr Gln Leu Arg Tyr Thr Gly
415                 420                 425 gaa ggc cat cag gac tgg aag gtg ctg gag ccg cct ctc ggg gcc cga     1345
Glu Gly His Gln Asp Trp Lys Val Leu Glu Pro Pro Leu Gly Ala Arg
430                 435                 440                 445 gga ggg acc ctg gag ctg cgc ccg cga tct cgc tac cgt tta cag ctg     1393
Gly Gly Thr Leu Glu Leu Arg Pro Arg Ser Arg Tyr Arg Leu Gln Leu
            450                 455                 460
```

-continued

| | | |
|---|---|---|
| cgc gcc agg ctc aac ggc ccc acc tac caa ggt ccc tgg agc tcg tgg<br>Arg Ala Arg Leu Asn Gly Pro Thr Tyr Gln Gly Pro Trp Ser Ser Trp<br>              465                    470                    475 | 1441 |
| tcg gac cca act agg gtg gag acc gcc acc gag acc gcc tgg atc tcc<br>Ser Asp Pro Thr Arg Val Glu Thr Ala Thr Glu Thr Ala Trp Ile Ser<br>480                    485                    490 | 1489 |
| ttg gtg acc gct ctg cat cta gtg ctg ggc ctc agc gcc gtc ctg ggc<br>Leu Val Thr Ala Leu His Leu Val Leu Gly Leu Ser Ala Val Leu Gly<br>495                    500                    505 | 1537 |
| ctg ctg ctg ctg agg tgg cag ttt cct gca cac tac agg aga ctg agg<br>Leu Leu Leu Leu Arg Trp Gln Phe Pro Ala His Tyr Arg Arg Leu Arg<br>510                    515                    520                    525 | 1585 |
| cat gcc ctg tgg ccc tca ctt cca gac ctg cac cgg gtc cta ggc cag<br>His Ala Leu Trp Pro Ser Leu Pro Asp Leu His Arg Val Leu Gly Gln<br>                    530                    535                    540 | 1633 |
| tac ctt agg gac act gca gcc ctg agc ccg ccc aag gcc aca gtc tca<br>Tyr Leu Arg Asp Thr Ala Ala Leu Ser Pro Pro Lys Ala Thr Val Ser<br>545                    550                    555 | 1681 |
| gat acc tgt gaa gaa gtg gaa ccc agc ctc ctt gaa atc ctc ccc aag<br>Asp Thr Cys Glu Glu Val Glu Pro Ser Leu Leu Glu Ile Leu Pro Lys<br>560                    565                    570 | 1729 |
| tcc tca gag agg act cct ttg ccc ctg tgt tcc cag gcc cag atg<br>Ser Ser Glu Arg Thr Pro Leu Pro Leu Cys Ser Ser Gln Ala Gln Met<br>575                    580                    585 | 1777 |
| gac tac cga aga ttg cag cct tct tgc ctg ggg acc atg ccc ctg tct<br>Asp Tyr Arg Arg Leu Gln Pro Ser Cys Leu Gly Thr Met Pro Leu Ser<br>590                    595                    600                    605 | 1825 |
| gtg tgc cca ccc atg gct gag tca ggg tcc tgc tgt acc acc cac att<br>Val Cys Pro Pro Met Ala Glu Ser Gly Ser Cys Cys Thr Thr His Ile<br>                    610                    615                    620 | 1873 |
| gcc aac cat tcc tac cta cca cta agc tat tgg cag cag cct tga<br>Ala Asn His Ser Tyr Leu Pro Leu Ser Tyr Trp Gln Gln Pro<br>                    625                    630                    635 | 1918 |
| gtcgac | 1924 |

<210> SEQ ID NO 12
<211> LENGTH: 635
<212> TYPE: PRT
<213> ORGANISM: Homo sapiens

<400> SEQUENCE: 12

Met Pro Ser Trp Ala Leu Phe Met Val Thr Ser Cys Leu Leu Leu Ala
1                 5                    10                    15

Pro Gln Asn Leu Ala Gln Val Ser Ser Gln Asp Val Ser Leu Leu Ala
                    20                    25                    30

Ser Asp Ser Glu Pro Leu Lys Cys Phe Ser Arg Thr Phe Glu Asp Leu
               35                    40                    45

Thr Cys Phe Trp Asp Glu Glu Glu Ala Ala Pro Ser Gly Thr Tyr Gln
        50                    55                    60

Leu Leu Tyr Ala Tyr Pro Arg Glu Lys Pro Arg Ala Cys Pro Leu Ser
65               70                    75                    80

Ser Gln Ser Met Pro His Phe Gly Thr Arg Tyr Val Cys Gln Phe Pro
               85                    90                    95

Asp Gln Glu Glu Val Arg Leu Phe Phe Pro Leu His Leu Trp Val Lys
                    100                  105                  110

Asn Val Phe Leu Asn Gln Thr Arg Thr Gln Arg Val Leu Phe Val Asp
               115                    120                  125

-continued

```
Ser Val Gly Leu Pro Ala Pro Pro Ser Ile Ile Lys Ala Met Gly Gly
    130                 135                 140

Ser Gln Pro Gly Glu Leu Gln Ile Ser Trp Glu Glu Pro Ala Pro Glu
145                 150                 155                 160

Ile Ser Asp Phe Leu Arg Tyr Glu Leu Arg Tyr Gly Pro Arg Asp Pro
                165                 170                 175

Lys Asn Ser Thr Gly Pro Thr Val Ile Gln Leu Ile Ala Thr Glu Thr
                180                 185                 190

Cys Cys Pro Ala Leu Gln Arg Pro His Ser Ala Ser Ala Leu Asp Gln
                195                 200                 205

Ser Pro Cys Ala Gln Pro Thr Met Pro Trp Gln Asp Gly Pro Lys Gln
    210                 215                 220

Thr Ser Pro Ser Arg Glu Ala Ser Ala Leu Thr Ala Glu Gly Gly Ser
225                 230                 235                 240

Cys Leu Ile Ser Gly Leu Gln Pro Gly Asn Ser Tyr Trp Leu Gln Leu
                245                 250                 255

Arg Ser Glu Pro Asp Gly Ile Ser Leu Gly Gly Ser Trp Gly Ser Trp
                260                 265                 270

Ser Leu Thr Val Thr Val Asp Leu Pro Gly Asp Ala Val Ala Leu Gly
    275                 280                 285

Leu Gln Cys Phe Thr Leu Asp Leu Lys Asn Val Thr Cys Gln Trp Gln
    290                 295                 300

Gln Gln Asp His Ala Ser Ser Gln Gly Phe Phe Tyr His Ser Arg Ala
305                 310                 315                 320

Arg Cys Cys Pro Arg Asp Arg Tyr Pro Ile Trp Glu Asn Cys Glu Glu
                325                 330                 335

Glu Glu Lys Thr Asn Pro Gly Leu Gln Thr Pro Gln Phe Ser Arg Cys
                340                 345                 350

His Phe Lys Ser Arg Asn Asp Ser Ile Ile His Ile Leu Val Glu Val
                355                 360                 365

Thr Thr Ala Pro Gly Thr Val His Ser Tyr Leu Gly Ser Pro Phe Trp
    370                 375                 380

Ile His Gln Ala Val Arg Leu Pro Thr Pro Asn Leu His Trp Arg Glu
385                 390                 395                 400

Ile Ser Ser Gly His Leu Glu Leu Glu Trp Gln His Pro Ser Ser Trp
                405                 410                 415

Ala Ala Gln Glu Thr Cys Tyr Gln Leu Arg Tyr Thr Gly Glu Gly His
                420                 425                 430

Gln Asp Trp Lys Val Leu Glu Pro Pro Leu Gly Ala Arg Gly Gly Thr
                435                 440                 445

Leu Glu Leu Arg Pro Arg Ser Arg Tyr Arg Leu Gln Leu Arg Ala Arg
    450                 455                 460

Leu Asn Gly Pro Thr Tyr Gln Gly Pro Trp Ser Ser Trp Ser Asp Pro
465                 470                 475                 480

Thr Arg Val Glu Thr Ala Thr Glu Thr Ala Trp Ile Ser Leu Val Thr
                485                 490                 495

Ala Leu His Leu Val Leu Gly Leu Ser Ala Val Leu Gly Leu Leu Leu
                500                 505                 510

Leu Arg Trp Gln Phe Pro Ala His Tyr Arg Arg Leu Arg His Ala Leu
    515                 520                 525

Trp Pro Ser Leu Pro Asp Leu His Arg Val Leu Gly Gln Tyr Leu Arg
    530                 535                 540
```

```
Asp Thr Ala Ala Leu Ser Pro Pro Lys Ala Thr Val Ser Asp Thr Cys
545                 550                 555                 560

Glu Glu Val Glu Pro Ser Leu Leu Glu Ile Leu Pro Lys Ser Ser Glu
                565                 570                 575

Arg Thr Pro Leu Pro Leu Cys Ser Ser Gln Ala Gln Met Asp Tyr Arg
            580                 585                 590

Arg Leu Gln Pro Ser Cys Leu Gly Thr Met Pro Leu Ser Val Cys Pro
        595                 600                 605

Pro Met Ala Glu Ser Gly Ser Cys Cys Thr Thr His Ile Ala Asn His
    610                 615                 620

Ser Tyr Leu Pro Leu Ser Tyr Trp Gln Gln Pro
625                 630                 635

<210> SEQ ID NO 13
<211> LENGTH: 1560
<212> TYPE: DNA
<213> ORGANISM: Mus musculus
<220> FEATURE:
<221> NAME/KEY: CDS
<222> LOCATION: (1)..(1560)

<400> SEQUENCE: 13 atg aga gtg ctg att cct ttg tgg ctg ttc aca gcc ttt cct ggt acc      48
Met Arg Val Leu Ile Pro Leu Trp Leu Phe Thr Ala Phe Pro Gly Thr
1               5                   10                  15 ctg tct gat gtg cag ctg cag gag tcg gga cct ggc ctg gtg aaa cct      96
Leu Ser Asp Val Gln Leu Gln Glu Ser Gly Pro Gly Leu Val Lys Pro
                20                  25                  30 tct cag tct ctg tcc ctc acc tgc act gtc act ggc tac tca atc acc     144
Ser Gln Ser Leu Ser Leu Thr Cys Thr Val Thr Gly Tyr Ser Ile Thr
            35                  40                  45 agt gat tat gcc tgg agc tgg atc cga cag tta cca gga aac aaa ctg     192
Ser Asp Tyr Ala Trp Ser Trp Ile Arg Gln Leu Pro Gly Asn Lys Leu
        50                  55                  60 gag tgg atg ggc tac ata acg tac agt ggt tac tct atc tac aat cca     240
Glu Trp Met Gly Tyr Ile Thr Tyr Ser Gly Tyr Ser Ile Tyr Asn Pro
65                  70                  75                  80 tct ctc aaa agt cga atc tct atc agt cga gac aca tcc aag aac cag     288
Ser Leu Lys Ser Arg Ile Ser Ile Ser Arg Asp Thr Ser Lys Asn Gln
                85                  90                  95 ttg ttc ctg cag tta aat tct gtg acc act gag gac aca gcc aca tat     336
Leu Phe Leu Gln Leu Asn Ser Val Thr Thr Glu Asp Thr Ala Thr Tyr
            100                 105                 110 tac tgt gtg ggc ggg tat gac aat atg gac tat tgg ggt caa gga acc     384
Tyr Cys Val Gly Gly Tyr Asp Asn Met Asp Tyr Trp Gly Gln Gly Thr
        115                 120                 125 tca gtc acc gtc tcc tca ggt ggt ggt ggt tcg ggt ggt ggt tcg         432
Ser Val Thr Val Ser Ser Gly Gly Gly Gly Ser Gly Gly Gly Ser
    130                 135                 140 ggt ggt ggc gga tcg caa att gtt ctc acc cag tct cca gca atc atg     480
Gly Gly Gly Gly Ser Gln Ile Val Leu Thr Gln Ser Pro Ala Ile Met
145                 150                 155                 160 tct gca tct cct ggg gag aag gtc acc ttg acc tgc agt gcc agc tca     528
Ser Ala Ser Pro Gly Glu Lys Val Thr Leu Thr Cys Ser Ala Ser Ser
                165                 170                 175 agt gta agt tcc agc cac tta tac tgg tat cag cag aag cca ggg tcc     576
Ser Val Ser Ser Ser His Leu Tyr Trp Tyr Gln Gln Lys Pro Gly Ser
            180                 185                 190
```

```
tcc ccc aaa ctc tgg att tat agc aca tcc aac ctg gct tct gga gtc         624
Ser Pro Lys Leu Trp Ile Tyr Ser Thr Ser Asn Leu Ala Ser Gly Val
        195                 200                 205 cct gct cgc ttc agt ggc agt ggg tct ggg acc tcc tat tct ctc aca         672
Pro Ala Arg Phe Ser Gly Ser Gly Ser Gly Thr Ser Tyr Ser Leu Thr
    210                 215                 220 atc agc aac atg gag act gaa gat gct gcc tct tat ttc tgc cat cag         720
Ile Ser Asn Met Glu Thr Glu Asp Ala Ala Ser Tyr Phe Cys His Gln
225                 230                 235                 240 tgg agt agt tac cca tgg acg ttc ggt ggg ggc acc aag ctg gaa atc         768
Trp Ser Ser Tyr Pro Trp Thr Phe Gly Gly Gly Thr Lys Leu Glu Ile
                245                 250                 255 aaa gga ggt ggt gga tcg ggt ggt ggt tcg gga ggc ggt gga tcg             816
Lys Gly Gly Gly Gly Ser Gly Gly Gly Ser Gly Gly Gly Ser
            260                 265                 270 gat gtg cag ctg cag gag tcg gga cct ggc ctg gtg aaa cct tct cag         864
Asp Val Gln Leu Gln Glu Ser Gly Pro Gly Leu Val Lys Pro Ser Gln
            275                 280                 285 tct ctg tcc ctc acc tgc act gtc act ggc tac tca atc acc agt gat         912
Ser Leu Ser Leu Thr Cys Thr Val Thr Gly Tyr Ser Ile Thr Ser Asp
290                 295                 300 tat gcc tgg agc tgg atc cga cag tta cca gga aac aaa ctg gag tgg         960
Tyr Ala Trp Ser Trp Ile Arg Gln Leu Pro Gly Asn Lys Leu Glu Trp
305                 310                 315                 320 atg ggc tac ata acg tac agt ggt tac tct atc tac aat cca tct ctc        1008
Met Gly Tyr Ile Thr Tyr Ser Gly Tyr Ser Ile Tyr Asn Pro Ser Leu
                325                 330                 335 aaa agt cga atc tct atc agt cga gac aca tcc aag aac cag ttg ttc        1056
Lys Ser Arg Ile Ser Ile Ser Arg Asp Thr Ser Lys Asn Gln Leu Phe
                340                 345                 350 ctg cag tta aat tct gtg acc act gag gac aca gcc aca tat tac tgt        1104
Leu Gln Leu Asn Ser Val Thr Thr Glu Asp Thr Ala Thr Tyr Tyr Cys
            355                 360                 365 gtg ggc ggg tat gac aat atg gac tat tgg ggt caa gga acc tca gtc        1152
Val Gly Gly Tyr Asp Asn Met Asp Tyr Trp Gly Gln Gly Thr Ser Val
370                 375                 380 acc gtc tcc tca ggt ggt ggt ggt tcg ggt ggt ggt ggt tcg ggt ggt        1200
Thr Val Ser Ser Gly Gly Gly Gly Ser Gly Gly Gly Gly Ser Gly Gly
385                 390                 395                 400 ggc gga tcg caa att gtt ctc acc cag tct cca gca atc atg tct gca        1248
Gly Gly Ser Gln Ile Val Leu Thr Gln Ser Pro Ala Ile Met Ser Ala
                405                 410                 415 tct cct ggg gag aag gtc acc ttg acc tgc agt gcc agc tca agt gta        1296
Ser Pro Gly Glu Lys Val Thr Leu Thr Cys Ser Ala Ser Ser Ser Val
            420                 425                 430 agt tcc agc cac tta tac tgg tat cag cag aag cca ggg tcc tcc ccc        1344
Ser Ser Ser His Leu Tyr Trp Tyr Gln Gln Lys Pro Gly Ser Ser Pro
        435                 440                 445 aaa ctc tgg att tat agc aca tcc aac ctg gct tct gga gtc cct gct        1392
Lys Leu Trp Ile Tyr Ser Thr Ser Asn Leu Ala Ser Gly Val Pro Ala
    450                 455                 460 cgc ttc agt ggc agt ggg tct ggg acc tcc tat tct ctc aca atc agc        1440
Arg Phe Ser Gly Ser Gly Ser Gly Thr Ser Tyr Ser Leu Thr Ile Ser
465                 470                 475                 480 aac atg gag act gaa gat gct gcc tct tat ttc tgc cat cag tgg agt        1488
Asn Met Glu Thr Glu Asp Ala Ala Ser Tyr Phe Cys His Gln Trp Ser
                485                 490                 495
```

```
agt tac cca tgg acg ttc ggt ggg ggc acc aag ctg gaa atc aaa gac    1536
Ser Tyr Pro Trp Thr Phe Gly Gly Gly Thr Lys Leu Glu Ile Lys Asp
        500                 505                 510 tac aag gat gac gac gat aag tga                                    1560
Tyr Lys Asp Asp Asp Asp Lys
        515
```

<210> SEQ ID NO 14
<211> LENGTH: 519
<212> TYPE: PRT
<213> ORGANISM: Mus musculus

<400> SEQUENCE: 14

```
Met Arg Val Leu Ile Pro Leu Trp Leu Phe Thr Ala Phe Pro Gly Thr
1               5                   10                  15

Leu Ser Asp Val Gln Leu Gln Glu Ser Gly Pro Gly Leu Val Lys Pro
            20                  25                  30

Ser Gln Ser Leu Ser Leu Thr Cys Thr Val Thr Gly Tyr Ser Ile Thr
        35                  40                  45

Ser Asp Tyr Ala Trp Ser Trp Ile Arg Gln Leu Pro Gly Asn Lys Leu
    50                  55                  60

Glu Trp Met Gly Tyr Ile Thr Tyr Ser Gly Tyr Ser Ile Tyr Asn Pro
65                  70                  75                  80

Ser Leu Lys Ser Arg Ile Ser Ile Ser Arg Asp Thr Ser Lys Asn Gln
                85                  90                  95

Leu Phe Leu Gln Leu Asn Ser Val Thr Thr Glu Asp Thr Ala Thr Tyr
            100                 105                 110

Tyr Cys Val Gly Gly Tyr Asp Asn Met Asp Tyr Trp Gly Gln Gly Thr
        115                 120                 125

Ser Val Thr Val Ser Ser Gly Gly Gly Ser Gly Gly Gly Gly Ser
    130                 135                 140

Gly Gly Gly Gly Ser Gln Ile Val Leu Thr Gln Ser Pro Ala Ile Met
145                 150                 155                 160

Ser Ala Ser Pro Gly Glu Lys Val Thr Leu Thr Cys Ser Ala Ser Ser
                165                 170                 175

Ser Val Ser Ser Ser His Leu Tyr Trp Tyr Gln Gln Lys Pro Gly Ser
            180                 185                 190

Ser Pro Lys Leu Trp Ile Tyr Ser Thr Ser Asn Leu Ala Ser Gly Val
        195                 200                 205

Pro Ala Arg Phe Ser Gly Ser Gly Ser Gly Thr Ser Tyr Ser Leu Thr
    210                 215                 220

Ile Ser Asn Met Glu Thr Glu Asp Ala Ala Ser Tyr Phe Cys His Gln
225                 230                 235                 240

Trp Ser Ser Tyr Pro Trp Thr Phe Gly Gly Gly Thr Lys Leu Glu Ile
                245                 250                 255

Lys Gly Gly Gly Gly Ser Gly Gly Gly Gly Ser Gly Gly Gly Gly Ser
            260                 265                 270

Asp Val Gln Leu Gln Glu Ser Gly Pro Gly Leu Val Lys Pro Ser Gln
        275                 280                 285

Ser Leu Ser Leu Thr Cys Thr Val Thr Gly Tyr Ser Ile Thr Ser Asp
    290                 295                 300

Tyr Ala Trp Ser Trp Ile Arg Gln Leu Pro Gly Asn Lys Leu Glu Trp
305                 310                 315                 320

Met Gly Tyr Ile Thr Tyr Ser Gly Tyr Ser Ile Tyr Asn Pro Ser Leu
                325                 330                 335
```

-continued

```
Lys Ser Arg Ile Ser Ile Ser Arg Asp Thr Ser Lys Asn Gln Leu Phe
            340                 345                 350

Leu Gln Leu Asn Ser Val Thr Thr Glu Asp Thr Ala Thr Tyr Tyr Cys
        355                 360                 365

Val Gly Gly Tyr Asp Asn Met Asp Tyr Trp Gly Gln Gly Thr Ser Val
    370                 375                 380

Thr Val Ser Ser Gly Gly Gly Ser Gly Gly Gly Ser Gly Gly
385                 390                 395                 400

Gly Gly Ser Gln Ile Val Leu Thr Gln Ser Pro Ala Ile Met Ser Ala
            405                 410                 415

Ser Pro Gly Glu Lys Val Thr Leu Thr Cys Ser Ala Ser Ser Ser Val
        420                 425                 430

Ser Ser Ser His Leu Tyr Trp Tyr Gln Gln Lys Pro Gly Ser Ser Pro
    435                 440                 445

Lys Leu Trp Ile Tyr Ser Thr Ser Asn Leu Ala Ser Gly Val Pro Ala
    450                 455                 460

Arg Phe Ser Gly Ser Gly Ser Gly Thr Ser Tyr Ser Leu Thr Ile Ser
465                 470                 475                 480

Asn Met Glu Thr Glu Asp Ala Ala Ser Tyr Phe Cys His Gln Trp Ser
            485                 490                 495

Ser Tyr Pro Trp Thr Phe Gly Gly Gly Thr Lys Leu Glu Ile Lys Asp
        500                 505                 510

Tyr Lys Asp Asp Asp Asp Lys
            515

<210> SEQ ID NO 15
<211> LENGTH: 82
<212> TYPE: DNA
<213> ORGANISM: Artificial
<220> FEATURE:
<223> OTHER INFORMATION: an artificially synthesized primer sequence

<400> SEQUENCE: 15
tagaattcca ccatgagagt gctgattcct ttgtggctgt tcacagcctt tcctggtacc    60
ctgtctgatg tgcagctgca gg                                             82

<210> SEQ ID NO 16
<211> LENGTH: 82
<212> TYPE: DNA
<213> ORGANISM: Artificial
<220> FEATURE:
<223> OTHER INFORMATION: an artificially synthesized primer sequence

<400> SEQUENCE: 16
tgggtgagaa caatttgcga tccgccacca cccgaaccac caccccga accaccacca     60 cctgaggaga cggtgactga gg                                             82

<210> SEQ ID NO 17
<211> LENGTH: 82
<212> TYPE: DNA
<213> ORGANISM: Artificial
<220> FEATURE:
<223> OTHER INFORMATION: an artificially synthesized primer sequence

<400> SEQUENCE: 17
cagtcaccgt ctcctcaggt ggtggtggtt cgggtggtgg tggttcgggt ggtggcggat    60
cgcaaattgt tctcacccag tc                                             82
```

```
<210> SEQ ID NO 18
<211> LENGTH: 60
<212> TYPE: DNA
<213> ORGANISM: Artificial
<220> FEATURE:
<223> OTHER INFORMATION: an artificially synthesized primer sequence

<400> SEQUENCE: 18
attgcggccg cttatcactt atcgtcgtca tccttgtagt ctttgatttc cagcttggtg    60

<210> SEQ ID NO 19
<211> LENGTH: 25
<212> TYPE: DNA
<213> ORGANISM: Artificial
<220> FEATURE:
<223> OTHER INFORMATION: an artificially synthesized primer sequence

<400> SEQUENCE: 19
gatgtgcagc tgcaggagtc gggac                                          25

<210> SEQ ID NO 20
<211> LENGTH: 81
<212> TYPE: DNA
<213> ORGANISM: Artificial
<220> FEATURE:
<223> OTHER INFORMATION: an artificially synthesized primer sequence

<400> SEQUENCE: 20
cctgcagctg cacatccgat ccaccgcctc ccgaaccacc accaccgat ccaccacctc    60 ctttgatttc cagcttggtg c                                              81
```